(12) United States Patent
Sawada

(10) Patent No.: US 9,277,083 B2
(45) Date of Patent: Mar. 1, 2016

(54) IMAGE SENSOR MODULE FOR IMAGE READING APPARATUS WITH IMPROVED READING FLEXIBILITY

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 226 days.

(21) Appl. No.: 13/524,586

(22) Filed: Jun. 15, 2012

(65) Prior Publication Data

US 2012/0318961 A1 Dec. 20, 2012

(30) Foreign Application Priority Data

Jun. 17, 2011 (JP) .................................. 2011-135235
Jun. 29, 2011 (JP) .................................. 2011-143670
Sep. 15, 2011 (JP) .................................. 2011-201732
Sep. 15, 2011 (JP) .................................. 2011-201955
Apr. 10, 2012 (JP) .................................. 2012-89467

(51) Int. Cl.
*H04N 1/48* (2006.01)
*H04N 1/031* (2006.01)

(52) U.S. Cl.
CPC ............... *H04N 1/0318* (2013.01); *H04N 1/48* (2013.01); *H04N 2201/03112* (2013.01); *H04N 2201/03187* (2013.01)

(58) Field of Classification Search
CPC ....... H01L 27/14; H01L 31/12; H01L 31/125; H04N 3/155; H04N 5/335; H04N 1/1135; H04N 1/12; H04N 1/053; H04N 2201/0471; H04N 1/193; H04N 1/40056; H04N 3/1581; H04N 1/031; H04N 1/03; H04N 2201/03112; H04N 1/0795; H04N 1/024; H04N 1/028; H04N 1/0318; H04N 1/48; H04N 2201/03187; G02B 21/002; G02B 26/10; G02B 2006/0098; G03H 1/0005; G03H 1/26; G03H 1/265; G03H 1/22; G03H 1/268; G03H 2001/2685; G03H 2001/2692; G03H 1/04; G03H 1/00; G03H 1/06; G03H 1/02
USPC ............... 250/208.1, 234, 235; 358/482–484; 257/79; 359/17, 22, 23, 30
See application file for complete search history.

(56) References Cited

U.S. PATENT DOCUMENTS 6,166,376 A * 12/2000 Kamioka ........................ 250/235
7,385,169 B2 * 6/2008 Saitou et al. ............... 250/208.1

(Continued)

FOREIGN PATENT DOCUMENTS

| JP | 11-127322 | 5/1999 |
|---|---|---|
| JP | 2009-259277 | 11/2009 |
| JP | 2011-8952 | 1/2011 |

*Primary Examiner* — Renee D Chavez
(74) *Attorney, Agent, or Firm* — Hamre, Schumann, Mueller & Larson, P.C.

(57) ABSTRACT

An image sensor module includes: a sensor IC having light receivers arranged in a main scanning direction; a lens unit configured to form an image on the sensor IC with light transferred from a read target; a first light source unit having a first output surface extending along the main scanning direction and outputting a first linear light extending along the main scanning direction from the first output surface toward the read target, the first output surface being placed at a position spaced apart from the lens unit in a sub-scanning direction; and a second light source unit having a second output surface extending along the main scanning direction and outputting a second linear light extending along the main scanning direction from the second output surface toward the read target, the second output surface being placed between the lens unit and the first output surface in the sub-scanning direction.

21 Claims, 46 Drawing Sheets

(56) References Cited

U.S. PATENT DOCUMENTS

| | | | |
|---|---|---|---|
| 7,428,080 B2 * | 9/2008 | Koshimizu et al. | 358/474 |
| 7,719,012 B2 * | 5/2010 | Sugimoto et al. | 257/79 |
| 8,228,567 B2 * | 7/2012 | Kim | 358/475 |
| 2008/0099770 A1 * | 5/2008 | Mendendorp et al. | 257/79 |
| 2010/0046045 A1 * | 2/2010 | Nagao et al. | 358/474 |

* cited by examiner

FIG. 16
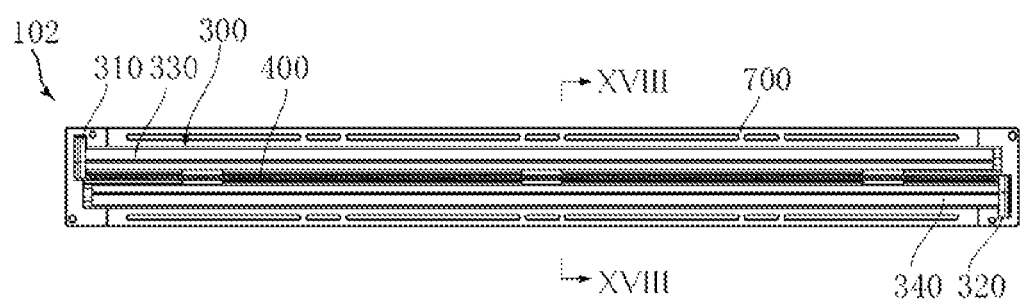
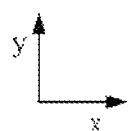

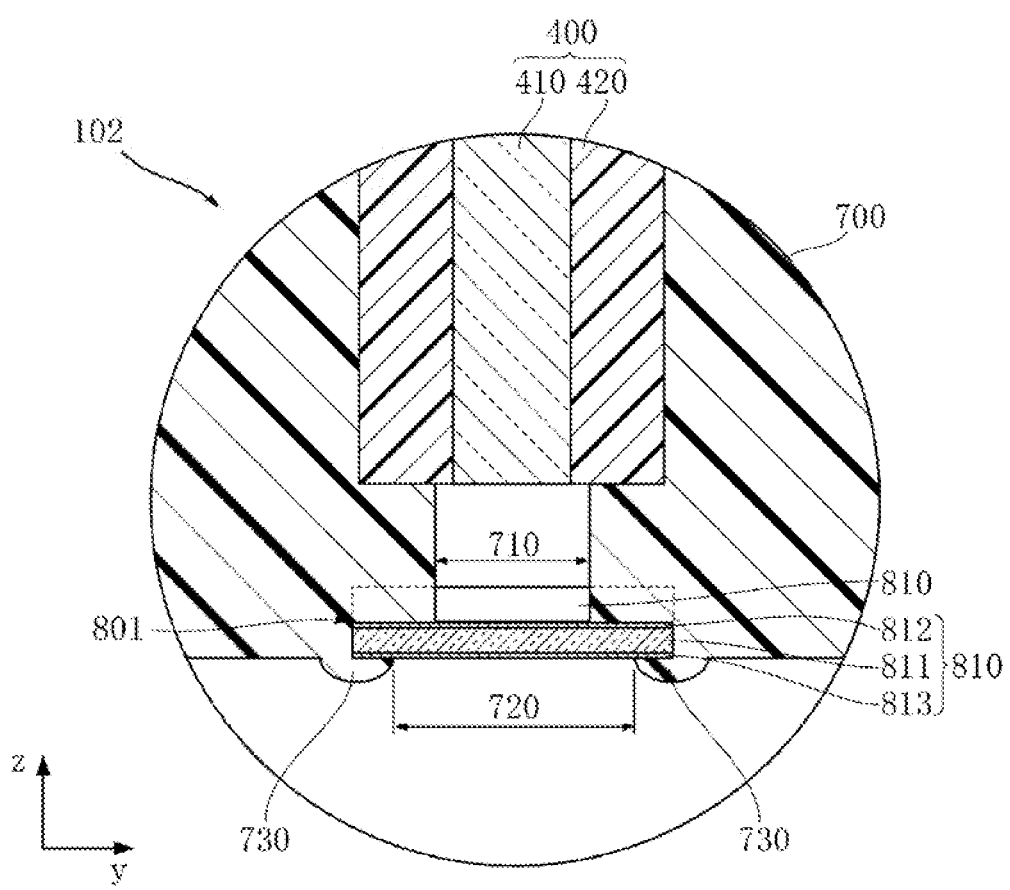

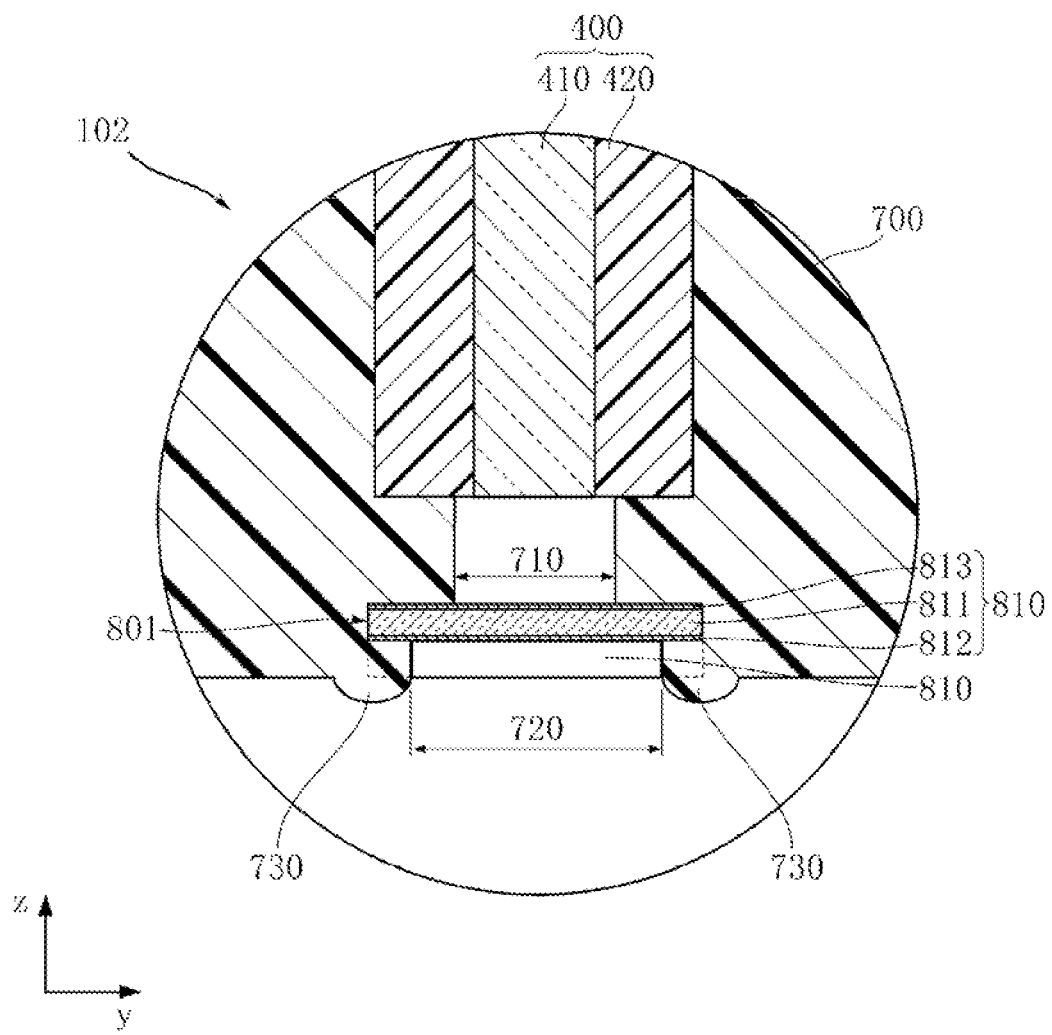

FIG. 24
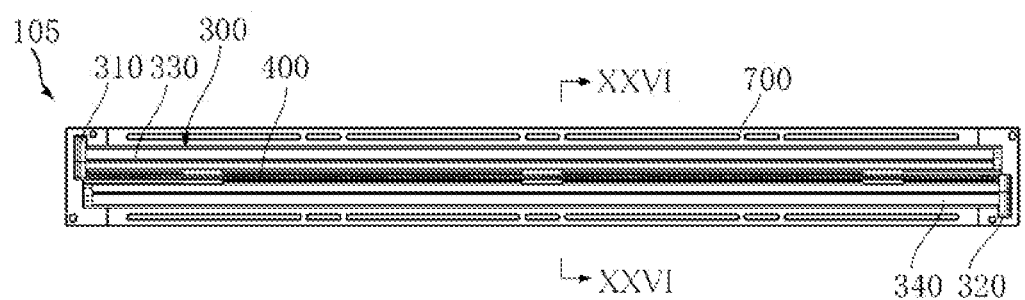
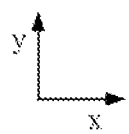

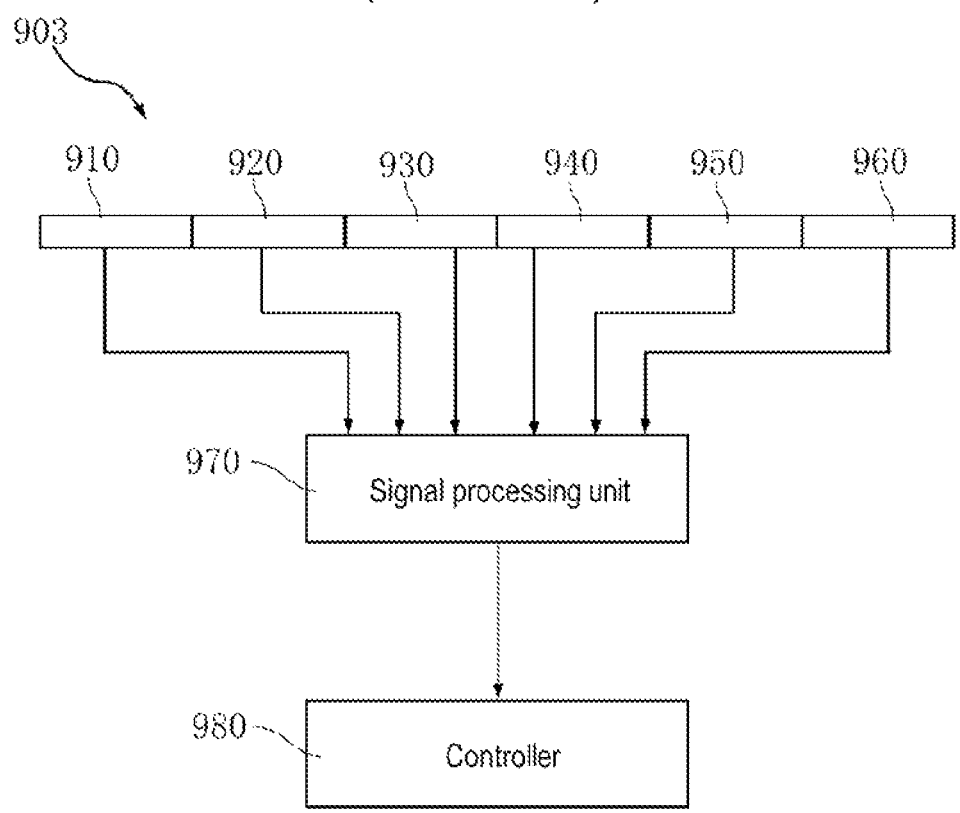

IMAGE SENSOR MODULE FOR IMAGE READING APPARATUS WITH IMPROVED READING FLEXIBILITY

CROSS-REFERENCE TO RELATED APPLICATION(S)

This application is based upon and claims the benefit of priority from Japanese Patent Application Nos. 2011-135235 filed on Jun. 17, 2011; 2011-143670 filed on Jun. 29, 2011; 2011-201732 filed on Sep. 15, 2011; 2011-201955 filed on Sep. 15, 2011; and 2012-89467 filed on Apr. 10, 2012, the entire contents of which are incorporated herein by reference.

TECHNICAL FIELD

The present disclosure relates to an image sensor module.

BACKGROUND

FIG. 44 illustrates an example of a conventional image sensor module that may be utilized in an image reading apparatus (not shown). The image sensor module 901 illustrated in FIG. 44 includes a case 91, two light source units 92 and 93, a lens unit 94, and a sensor IC (Integrated Circuit) 95. The light source unit 92 is installed at a lower portion of the case 91 and includes a cold cathode fluorescent lamp (CCFL). The light source unit 93 is installed at an upper portion of the case 91 and includes an LED (Light Emitting Diode) chip. Above the case 91, a read target 890' is transferred in a sub-scanning direction y. From the two light source units 92 and 93, linear lights extending along a main scanning direction are irradiated toward the read target 890'.

Positions of the two light source units 92 and 93 are substantially the same in the sub-scanning direction y, but different in a thickness direction z. Thus, incident angles of the linear lights from the two light source units 92 and 93 that reach the read target 890' are different from each other. Reflected lights from the read target 890' are collected on the sensor IC 95 via the lens unit 94. In a conventional image reading apparatus, which may include the image sensor module 901 for example, light emission timing of the light source units 92 and 93 are set to be different from each other, and thus the sensor IC 95 obtains data under different states, such as obtaining data under a state where the read target 890' is irradiated only by the light source unit 92 and data under another state where the read target 890' is irradiated only by the light source unit 93.

FIG. 45 illustrates another example of a conventional image sensor module. The image sensor module 902 illustrated in FIG. 45 includes a case 91, a lens unit 94, a sensor IC 95, a light source unit 96, a substrate 97, and a light transmission plate 98. The case 91 extends along the main scanning direction and accommodates therein or supports thereby the remaining elements. The light source unit 96 outputs linear lights extending along the main scanning direction toward the read target 890'. The lens unit 94 collects reflected light from the read target 890' on the sensor IC 95. The sensor IC 95 is mounted on the substrate 97 and has a photoelectric conversion function.

In some cases, it is necessary to discriminate between different types of light, e.g., ultraviolet (UV) light versus visible light. In some cases, a filter, such as a UV filter may be used to prevent, a certain type of light from reaching the sensor IC 95. However, if a UV filter is used as the preventive measure, an appropriate UV filter installation space is necessary in the case 91 and the UV filter needs to be integrated such that it is prevented from being improperly deformed or distorted.

FIG. 46 illustrates a schematic block diagram showing an image sensor module in which a plurality of photoelectric conversion elements are divided into six blocks 910 to 960 to execute a reading operation. The image sensor module 903 illustrated in FIG. 46 includes a signal processing unit 970 installed on, e.g., a sheet of substrate. The signal processing unit 970 is configured to process signals from the six blocks 910 to 960. In the image sensor module 903, the reading operation is executed in parallel with respect to the six blocks 910 to 960, and the signal processing unit 970 converts analog output signals from the blocks 910 to 960 into digital signals and transmit the same to the controller 980.

According to the configuration of the image sensor module 903, lengthening a read width cannot be effectively achieved by adding more blocks. Since the signal processing unit 970 is configured to process signals from the six blocks 910 to 960, the signal processing unit 970 is required to be re-designed according to the new number of blocks. Therefore, such situations often cannot be effectively accommodated in conventional image sensor modules due the lack of flexibly of current functionality, and requires the specification of the image sensor module 903 to be modified, which would take a long time to development.

Therefore, there is a need for an image sensor module that is customized to address one or more of the limitations described above.

SUMMARY

The present disclosure provides an image sensor module having a small thickness and capable of reading a hologram region.

The present disclosure further provides an image sensor module capable of preventing improper deformation or distortion of a filter.

The present disclosure further provides an image sensor module and an inspection apparatus capable of preventing ultraviolet (UV) light from reaching a light reception unit without requiring a filter in the casing.

The present disclosure further provides an image sensor module and an image reading apparatus having the same, the image sensor module having a configuration capable of flexibly coping with a change in specifications.

According to one aspect of the present disclosure, there is provided an image sensor module, including: a sensor IC having a plurality of light receivers arranged in a main scanning direction; a lens unit configured to form an image on the sensor IC with light transferred from a read target; a first light source unit having a first output surface extending in the main scanning direction and outputting a first linear light extending along the main scanning direction from the first output surface, toward the read target, the first output surface being placed at a position spaced apart from the lens unit in a sub-scanning direction; and a second light source unit having a second output surface extending along the main scanning direction and outputting a second linear light extending along the main scanning direction from the second output surface, toward the read target, the second output surface being placed between the lens unit and the first output surface in the sub-scanning direction.

In some embodiments, in a thickness direction perpendicular to both of the main scanning direction and the sub-scanning direction, the first output surface is disposed to be closer to the read target than the second output surface is.

In some embodiments, in the thickness direction, the lens unit and the first output surface overlap with each other.

In some embodiments, in the thickness direction, the lens unit and the second output surface overlap with each other.

In some embodiments, the first light source unit includes: a first LED module having one or more first LED chips, one or more first leads on which said one or more first LED chips are mounted, and a first resin package covering portions of said one or more first leads and having a first opening via which the first LED chips are exposed; and a first light guide extending along the main scanning direction and having a first incident surface facing the first opening and a first reflective surface reflecting light from the first incident surface. The first output surface may output light from the first reflective surface as the first linear light.

In some embodiments, the second light source unit includes a second LED module having one or more second LED chips, one or more second leads on which the one or more second LED chips are mounted, and a second resin package covering portions of said one or more second leads and having a second opening via which the second LED chips are exposed; and a second light guide extending along the main scanning direction and having a second incident surface facing the second opening and a second reflective surface reflecting light which has proceeded from the second incident surface. The second output surface may output light which has proceeded from the second reflective surface as the second linear light.

In some embodiments, each of said one or more first leads have a first terminal unit protruded from the first resin package in the thickness direction at a position retreated toward the lens unit with respect to the first opening in the sub-scanning direction.

In some embodiments, the image sensor module further includes: a substrate with the sensor IC mounted thereon, wherein each of said one or more second leads has a second terminal unit protruded from the second resin package in the thickness direction, and wherein both of the first and the second terminal unit are connected to the substrate.

In some embodiments, the substrate and at least a portion of the first light guide do not overlap with each other in the sub-scanning direction.

In some embodiments, in the thickness direction, the first LED module is disposed to be closer to the read target than the second LED module is.

In some embodiments, the first LED module is disposed at a more outer side in the main scanning direction than the second LED module is.

In some embodiments, in the sub-scanning direction, the first and the second LED module overlap with each other.

In some embodiments, in the thickness direction, the first and the second LED module overlap with each other.

In some embodiments, said one or more first LED chips of the first LED module includes two front first surface electrode LED chips, each of said two first front surface electrode LED chips having a pair of front surface electrodes disposed on the same surface thereof, and a first front/rear surface electrode LED chip having a front surface electrode and a rear surface electrode disposed on opposite surfaces of the first front/rear surface electrode LED chip to each other. The first LED module may include two first Zener diodes configured to prevent excessive voltages from being applied to said two first front surface electrode LED chips: Said two first front surface electrode LED chips may be bonded to said one or more first leads with a first insulating layer interposed therebetween. The first front/rear surface electrode LED chip and said two first Zener diodes may be bonded to said one or more first leads with a first conductive layer interposed therebetween. Said two first Zener diodes may be disposed between said two first front surface electrode LED chips and the first front/rear surface electrode LED chip.

In some embodiments, the first conductive layer includes Ag.

In some embodiments, the first insulating layer is transparent.

In some embodiments, a portion of the first conductive layer is interposed between said one or more first leads and a portion of the first insulating layer.

In some embodiments, said one or more second LED chips of the second LED module includes two second front surface electrode LED chips, each of said two second front electrode LED chips having a pair of front surface electrodes disposed on the same surface thereof, and a second front/rear surface electrode LED chip having a front surface electrode and a rear surface electrode disposed on opposite surfaces of the second front/rear surface electrode LED chip. The second module may include two second Zener diodes configured to prevent excessive voltages from being applied to said two second front surface electrode LED chips. Said two second front surface electrode LED chips may be bonded to said one or more second leads with a second insulating layer interposed therebetween. The second front/rear surface electrode LED chip and said two second Zener diodes may be bonded to said one or more second leads with a second conductive layer interposed therebetween. Said two second Zener diodes may be disposed between said two second front surface electrode LED chips and the second front/rear surface electrode LED chip.

In some embodiments, the second conductive layer includes Ag.

In some embodiments, the second insulating layer is transparent.

In some embodiments, a portion of the second conductive layer is interposed between said one or more second leads and a portion of the second insulating layer.

According to such a configuration, by arranging the first and the second output surface to be spaced apart from each another in sub-scanning direction, the incident angles of respective linear light beams to a read target can be made different without providing a great difference between positions of the first and the second output surface in the thickness direction. Through this configuration, the image sensor module can have a small thickness.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 16 is a plan view showing an image sensor module in accordance with a second embodiment of the present disclosure.

FIG. 19 is an enlarged cross-sectional view of a portion of the image sensor module of FIG. 16.

FIG. 20 is an enlarged cross-sectional view of a portion of the image sensor module of FIG. 16.

FIG. 24 is a plan view of an image sensor module in accordance with a fifth embodiment of the present disclosure.

FIG. 46 is a view showing a conventional image sensor unit.

DETAILED DESCRIPTION

Figure 1:
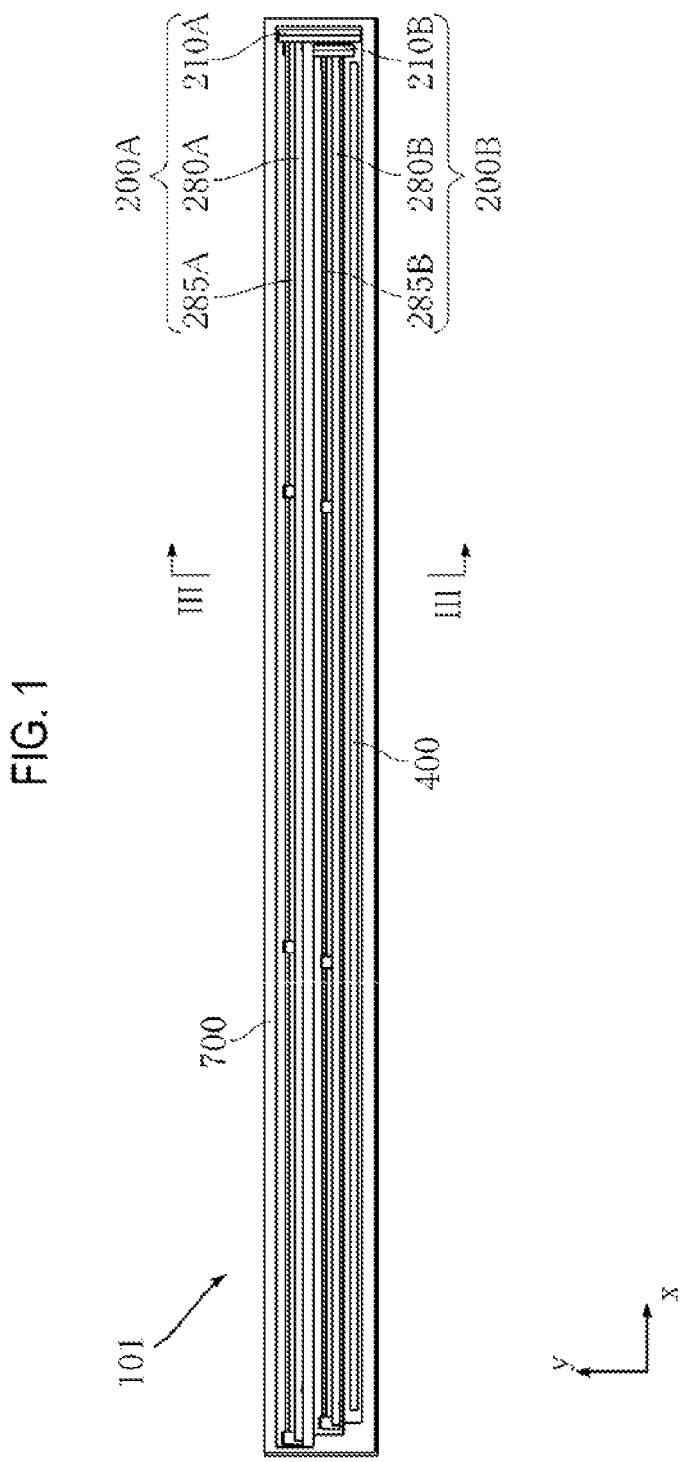
FIG. 1 is a plan view of a portion of an image sensor module in accordance with a first embodiment of the present disclosure.

Reference will now be made in detail to various embodiments, examples of which are illustrated in the accompanying drawings. In the following detailed description, numerous specific details are set forth in order to provide a thorough understanding of the inventive aspects of the present disclosure. However, it will be apparent to one of ordinary skill in the art that the inventive aspects of the present disclosure may be practiced without these specific details. In other instances, well-known methods, procedures, systems, and components have not been described in detail so as not to unnecessarily obscure aspects of the various embodiments. Also, the same or equal elements in the drawings are indicated by the same reference numerals, and their descriptions are not provided.

Figure 2:
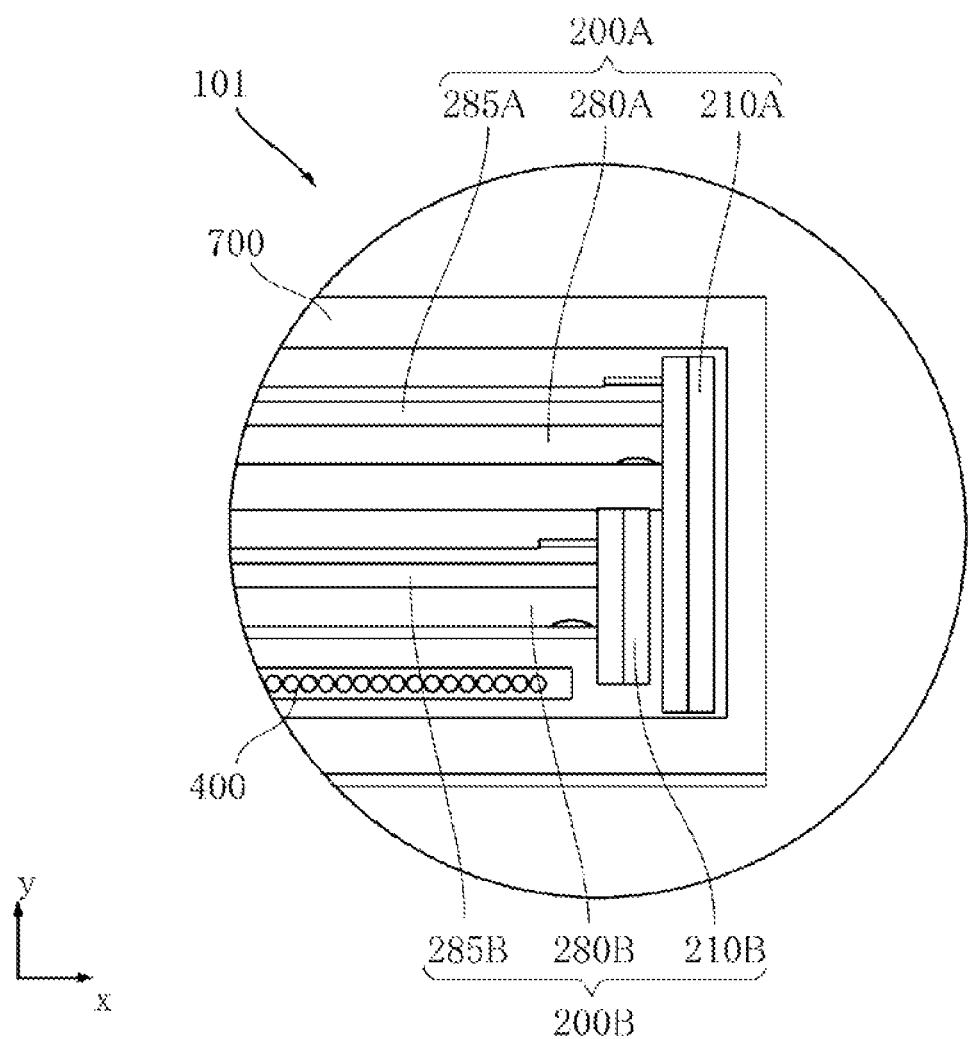
FIG. 2 is an enlarged plan view of the portion of the image sensor module of FIG. 1.
Figure 3:
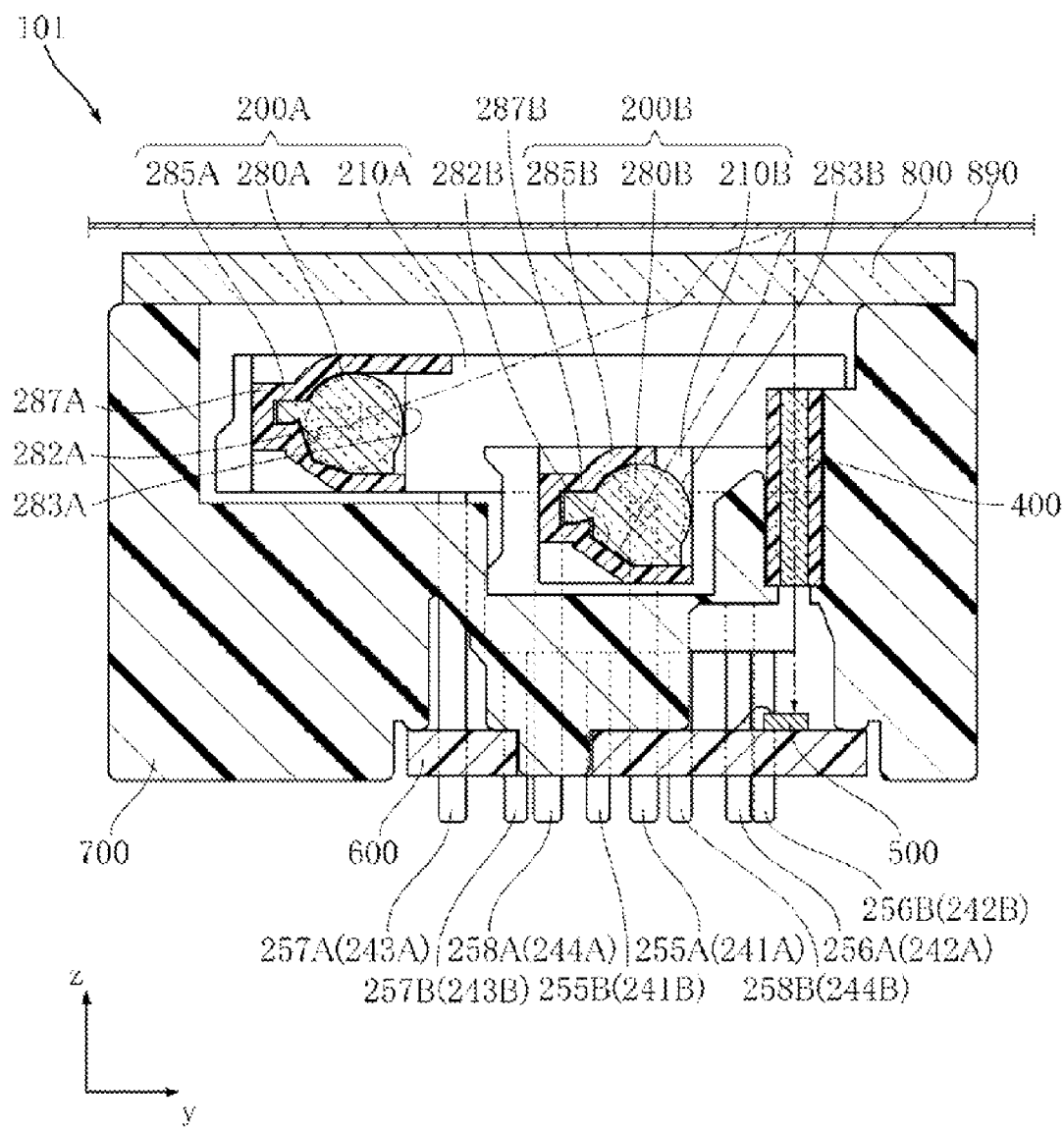
FIG. 3 is a cross-sectional view of the image sensor module along a line III-III shown in FIG. 1.

FIGS. 1 to 3 illustrate an example of an image sensor module 101 in accordance with a first embodiment of the present disclosure. The image sensor module 101 includes two light source units 200A and 200B, a lens unit 400, a sensor IC 500, a substrate 600, a case 700, and a light transmission plate 800. The image sensor module 101 is assembled in, for example, an image reading apparatus, and configured to read a hologram region provided on a read target 890. The read target 890 is the object to be scanned, for example a check, a bill, or any other object in a document form or in a form that can be scanned, and may include one or more hologram regions thereon. For the sake of understanding, the light transmission plate 800 is omitted in FIGS. 1 and 2.

The case 700 defines an outward form of the image sensor module 101 and accommodates therein the remaining components. The case 700 extends along the main scanning direction x, a section thereof defined by the sub-scanning direction y, and the thickness direction z, thus, resulting in the case 700 having a substantially rectangular shape. The case 700 may be made of a material, e.g., a liquid crystal polymer resin. A recess portion for accommodating the remaining components is appropriately formed in the case 700.

The substrate 600 includes an insulating material such as, for example, ceramics or a glass epoxy resin, and a wiring pattern (not shown) formed on the insulating material. The substrate 600 extends in the main scanning direction x to have a rectangular shape. The substrate 600 is accommodated at a lower portion of the case 700, and is fixed to the case 700 by, for example, an adhesive. The sensor IC 500 is mounted on the substrate 600.

The sensor IC 500 is an element having a photoelectric conversion function of converting received light into an electrical signal, and is mounted on the substrate 600. The sensor IC 500 includes a plurality of light receivers (not shown) arranged in the main scanning direction x. Light reflected from the read target 890 forms an image in the light receivers by the lens unit 400. The plurality of light receivers may be disposed in a row in the main scanning direction x or may be disposed in a plurality of rows. When the plurality of light receivers are disposed in a plurality of rows, for example, one of filters allowing for transmission of only red, green and blue may be installed in light receivers of the respective rows.

The transmission plate 800 may be a plate member made of, for example, a transparent material such as glass or the like, and mounted to cover the upper side of the case 700 in the thickness direction z.

The image sensor module 101 includes first light source 200A and second light source 200B. The light source unit 200A is configured to emit linear light for use in reading an image by the image sensor module 101, and includes an LED module 210A, a light guide 280A, and a reflector 285A.

Figure 4:
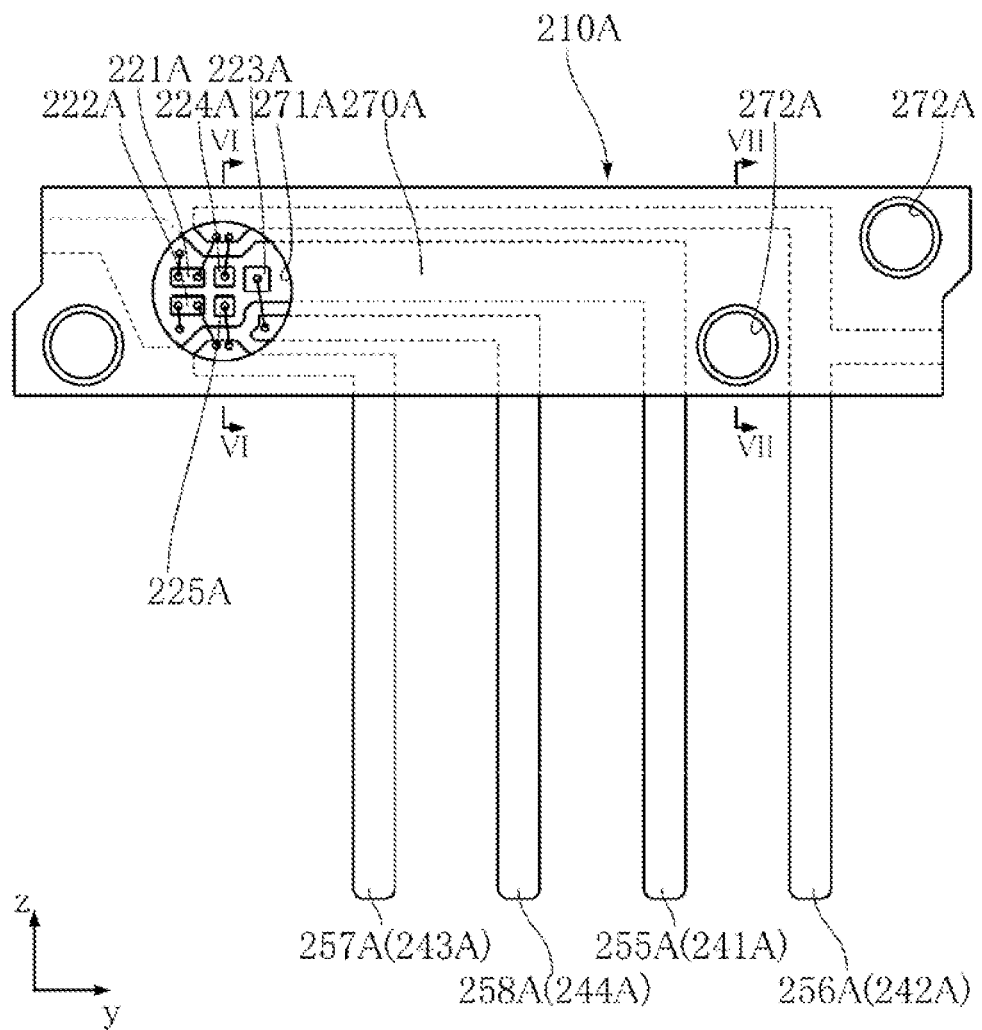
FIG. 4 is a front view of a first LED module of the image sensor module of FIG. 1.
Figure 5:
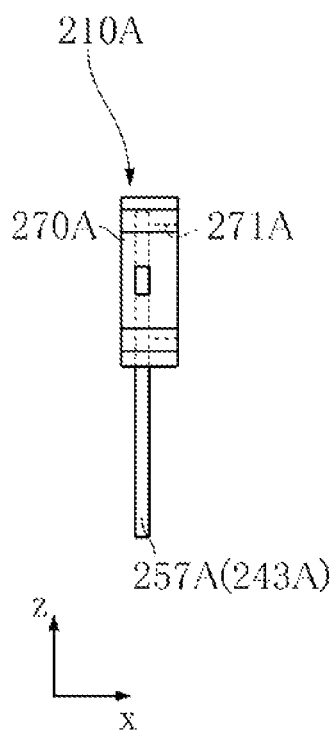
FIG. 5 is a side view of the first LED module of the image sensor module of FIG. 1.

The LED module 210A is configured to perform a light emitting function for the light source unit 200A, and as illustrated in FIGS. 4 and 5, includes LED chips 221A, 222A, and 223A, Zener diodes 224A and 225A, leads 241A, 242A, 243A, and 244A, and a resin package 270A. The LED module 210A may also be referred to as a first LED module.

The resin package 270A is made of a white resin such as, for example, a liquid crystal polymer resin or an epoxy resin, and covers portions of the leads 241A, 242A, 243A, and 244A. The resin package 270A has an opening 271A and a plurality of position determining holes 272A. The opening 271A is installed in the vicinity of one end of the resin package 270A in the sub-scanning direction y, and is circular in shape. The plurality of position determining holes 272A are installed at positions in avoidance of the leads 241A, 242A, 243A, and 244A, and to penetrate the resin package 270A, in some embodiments.

Figure 6:
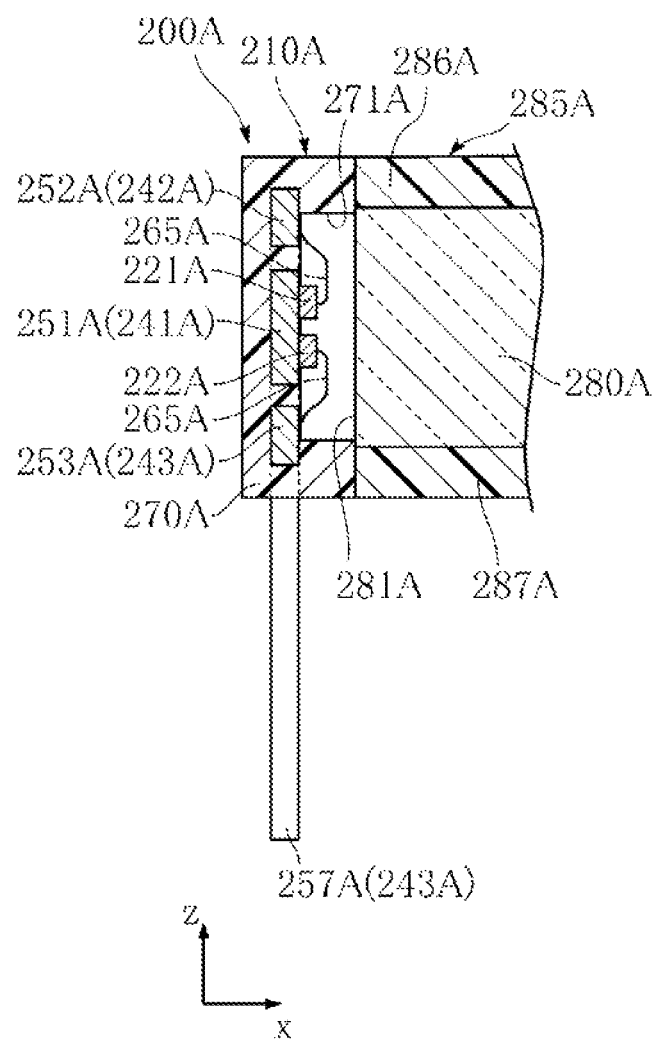
FIG. 6 is a cross-sectional view of a portion of a first light source unit taken along line VI-VI shown in FIG. 4.
Figure 8:
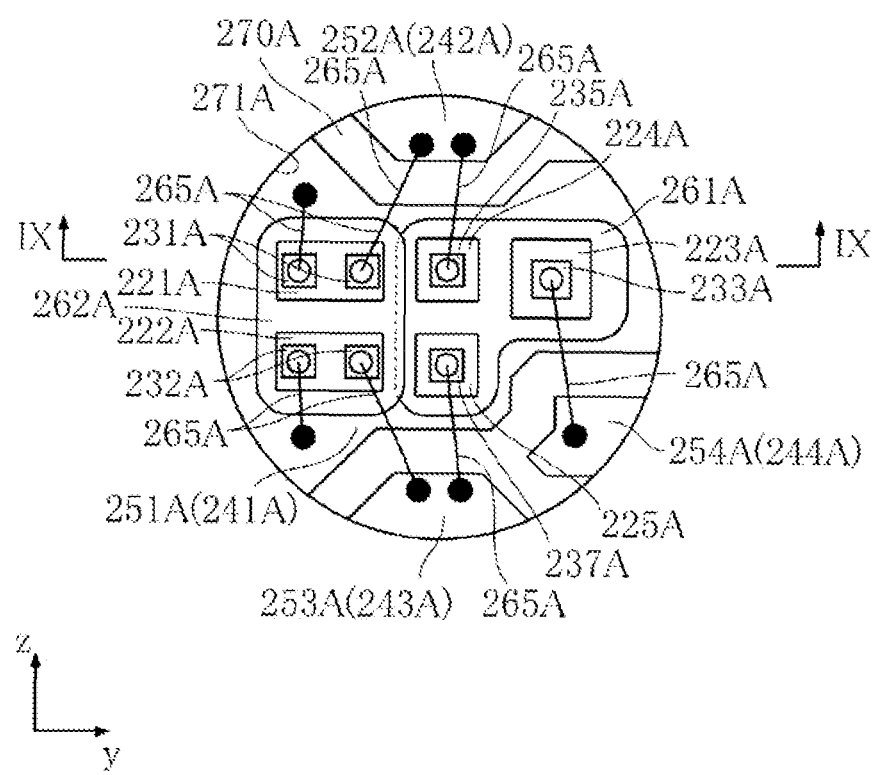
FIG. 8 is an enlarged front view of an opening of the first LED module of FIG. 4.

As illustrated in FIGS. 4, 6, and 8, the lead 241A may have a mounting unit 251A and a terminal unit 255A. The lead 241A has, as a whole, a portion extending in the sub-scanning direction y and a portion extending along the thickness direction z. The lead 241A may also be referred to as a first lead. The mounting unit 251A is installed in the vicinity of a left side of the portion extending in the sub-scanning direction y in FIG. 4, and mounts thereon the LED chips 221A, 222A, and 223A and the Zener diodes 224A and 225A. In some embodiment, the mounting unit 251A of the lead 241A is formed such that a dimension thereof in the thickness direction z is partially smaller and narrower than that of the peripheral portions. The mounting unit 251A is exposed from the opening 271A of the resin package 270A. The terminal unit 255A is protruded downwardly in the thickness direction z from the resin package 270A and connected to the substrate 600.

The lead 242A has a wire bonding unit 252A and a terminal unit 256A. The lead 242A has, as a whole, a portion extending in the sub-scanning direction y and a portion extending along the thickness direction z. The wire bonding unit 252A is installed in the vicinity of a left end of the portion extending in the sub-scanning direction y in FIG. 4. In some embodiments, the wire bonding unit 252A is protruded downwardly in the thickness direction z toward the mounting unit 251A of the lead 241A. The wire bonding unit 252A is exposed from the opening 271A of the resin package 270A. The terminal unit 256A is protruded downwardly in the thickness direction z from the resin package 270A and connected to the substrate 600.

The lead 243A has a wire bonding unit 253A and a terminal unit 257A. The lead 243A has, as a whole, a portion extending in the sub-scanning direction y and a portion extending in the thickness direction z. The wire bonding unit 253A is installed in the vicinity of a left end of the portion extending in the sub-scanning direction y in FIG. 4. In some embodiments, the wire bonding unit 253A is protruded upwardly in the thickness direction z toward the mounting unit 251A of the lead 241A. The wire bonding unit 253A is exposed from the opening 271A of the resin package 270A. The terminal unit 257A is protruded downwardly in the thickness direction z from the resin package 270A and connected to the substrate 600.

The lead 244A has a wire bonding unit 254A and a terminal unit 258A. The lead 244A has, as a whole, a portion extending in the sub-scanning direction y and a portion extending in the thickness direction z. The wire bonding unit 254A is installed in the vicinity of a left end of the portion extending in the sub-scanning direction y in FIG. 4. In some embodiments, the wire bonding unit 254A is positioned at a right lower portion of the mounting unit 251A and at a right portion of the wire bonding unit 253A as shown. The wire bonding unit 254A is exposed from the opening 271A of the resin package 270A. The terminal unit 258A is protruded downwardly in the thickness direction z from the resin package 270A and connected to the substrate 600.

Figure 9:
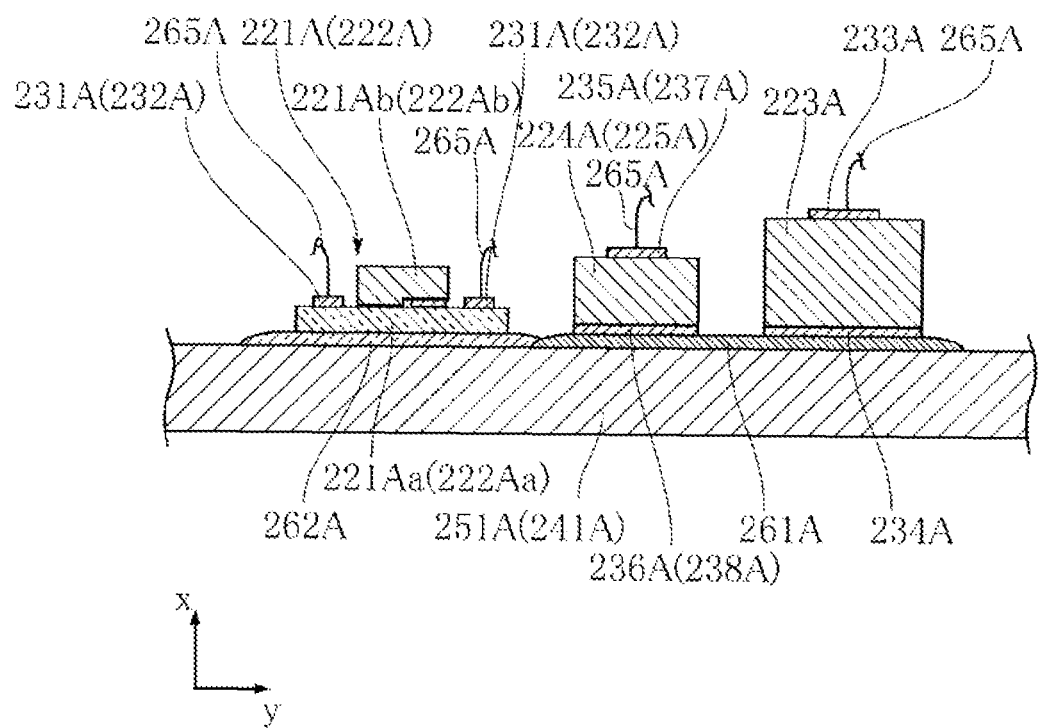
FIG. 9 is a cross-sectional view of a portion of the first LED module taken along line IX-IX shown in FIG. 8.

The LED chip 221A may also be referred to as a first front surface electrode LED chip, and configured to emit green light. As illustrated in FIGS. 8 and 9, the LED chip 221A has a submount substrate 221Aa, a semiconductor layer 221Ab, and a pair of front surface electrodes 231A. The submount substrate 221Aa is made of, for example, silicon (Si), and may be transparent. The semiconductor layer 221Ab is made of, for example, a GaN-based semiconductor and includes an n type semiconductor layer, a p type semiconductor layer, and an active layer interposed between the n type semiconductor layer and the p type semiconductor layer (all not shown). The pair of front surface electrodes 231A is formed on the submount substrate 221Aa and electrically connected with the n type semiconductor layer and the p type semiconductor layer.

The LED chip 222A may also be referred to as a first front surface electrode LED chip, and may be configured to emit a blue light. In FIG. 9, for the sake of understanding, reference numerals of elements of the LED chip 222A corresponding to the respective elements of the LED chip 221A are described in parentheses. The LED chip 222A has a submount substrate 222Aa, a semiconductor layer 222Ab, and a pair of front surface electrodes 232A. The submount substrate 222Aa is made of, for example, Si, and may be transparent. The semiconductor layer 222Ab is made of, for example, a GaN-based semiconductor and includes an n type semiconductor layer, a p type semiconductor layer, and an active layer interposed between the n type semiconductor layer and the p type semiconductor layer (all not shown). The pair of front surface electrodes 232A is formed on the submount substrate 222Aa and electrically connected with the n type semiconductor layer and the p type semiconductor layer.

The LED chip 223A may correspond to a first front/read surface electrode LED chip, and may be configured to emit red light, according to some embodiments. As illustrated in FIGS. 8 and 9, the LED chip 223A has a semiconductor layer made of, for example, a GaN-based semiconductor material, a front surface electrode 233A, and a rear surface electrode 234A. The semiconductor layer is made of an n type semiconductor layer, a p type semiconductor layer, and an active layer interposed between the n type semiconductor layer and the p type semiconductor layer (all not shown). The front surface electrode 233A is installed in the opposite side of the lead 241A of the LED chip 223A. The rear surface electrode 234A is installed in the lead 241A side of the LED chip 223A.

The Zener diode 224A may also be referred to as a first Zener diode, and may be configured for preventing an excessive voltage from being applied to the LED chip 221A. The Zener diode 224A has a front surface electrode 235A and a rear surface electrode 236A. The Zener diode 225A may also be referred to as a first Zener diode, and may be an element configured for preventing an excessive voltage from being applied to the LED chip 222A. The Zener diode 225A has a front surface electrode 237A and a rear surface electrode 238A.

As illustrated in FIG. 8, the LED, chips 221A and 222A are arranged in the thickness direction z and mounted on the mounting unit 251A of the lead 241A via an insulating layer 262A. The insulating layer 262A may also be referred to as a first insulating layer. In some embodiments, the insulating layer 262A is transparent and is made of, for example, a transparent resin. The Zener diodes 224A and 225A are arranged in the thickness direction z and disposed at the right side in the sub-scanning direction y with respect to the LED chips 221A and 222A. The LED chip 223A is disposed in the opposite side of the LED chips 221A and 222A while the Zener diodes 224A and 225A being placed therebetween. The LED chip 223A and the Zener diodes 224A and 225A are mounted on the mounting unit 251A of the lead 241A via a conductive layer 261A. More specifically, the rear surface electrode 234A of the LED chip 223A and the rear surface electrodes 236A and 238A of the Zener diodes the lead 241A through the conductive layer 261A. The conductive layer 261A is made of, for example, Ag.

A mounting process of the LED chips 221A, 222A and 223A and the Zener diodes 224A and 225A is executed in the following order. First, a conductive paste as a material of the conductive layer 261A is applied to the mounting unit 251A of the lead 241A. Then, the LED chip 223A and the Zener diodes 224A and 225A are bonded. When the conductive paste is, for example, baked to be cured, the conductive layer 261A is obtained. Next, a resin paste as a material of the insulating layer 262A is applied to the mounting unit 251A. Then, the LED chips 221A and 222A are bonded. The insulating layer 262A is formed by curing the resin paste.

According to the foregoing process order, the insulating layer 262A is formed after the conductive layer 261A is formed. Thus, if an application range of the conductive paste and that of the resin paste overlap, the conductive layer 261A is interposed between a portion of the insulating layer 262A and the mounting unit 251A of the lead 241A. In FIGS. 8 and 9, the conductive layer 261A and the insulating layer 262A formed according to such an application relationship are illustrated. Alternatively, the conductive layer 261A and the insulating layer 262A may be configured in such a manner that the application ranges thereof do not overlap. In such case, however, the insulating layer 262A is not interposed between the conductive layer 261A and the mounting unit 251A of the lead 241A.

One of the pair of front surface electrodes 231A of the LED chip 221A is connected to the mounting unit 251A of the lead 241A via a wire 265A, and the other is connected to the wire bonding unit 252A of the lead 242A via the wire 265A. One of the pair of front surface electrodes 232A of the LED chip 222A is connected to the mounting unit 251A of the lead 241A via the wire 265A, and the other is connected to the wire bonding unit 253A of the lead 243A via the wire 265A.

The front surface electrode 233A of the LED chip 223A is connected to the wire bonding unit 254A of the lead 244A via the wire 265A. The front surface electrode 235A of the Zener diode 224A is connected to the wire bonding unit 252A of the lead 242A via the wire 265A, and the front surface electrode 237A of the Zener diode 224A is connected to the wire bonding unit 253A of the lead 243A via the wire 265A.

The light guide 280A serves to convert light from the LED module 210A into a linear light extending along the main scanning direction x, and is made of, for example, a transparent acrylic resin such as poly methyl methacrylate (PMMA) or the like. The light guide 280A has a columnar shape extending along the main scanning direction x, and as illustrated in FIGS. 3 and 6, the light guide 280A has an incident surface 281A, a reflective surface 282A, and an output surface 283A. The light guide 280A may also be referred to as a first light guide.

The incident surface 281A may also be referred to as a first incident surface, and may be an end surface of the light guide 280A in the main scanning direction x. The incident surface 281A covers the opening 271A of the resin package 270A of the LED module 210A, and faces the LED chips 221A, 222A, and 223A. The reflective surface 282A may also be referred to as a first reflective surface, which extends thinly along the main scanning direction x. In FIG. 3, the reflective surface 282A may be formed at a left lower portion of the light guide 280A. The reflective surface 282A is a surface which reflects light having been made incident from the incident surface 281A and protruding through the light guide 280A. As a configuration of the reflective surface 282A, the reflective surface 282A may be a surface having fine protrusions and depressions formed thereon, a surface with white pigment coated thereon or the like. The output surface 283A may also be referred to as a first output surface, and it may extend thinly along the main scanning direction x. In some embodiments, a section of the output surface 283A has a partially arc shape. Light reflected by the reflective surface 282A is output as linear light extending along the main scanning direction x from the output surface 283A.

Figure 7:
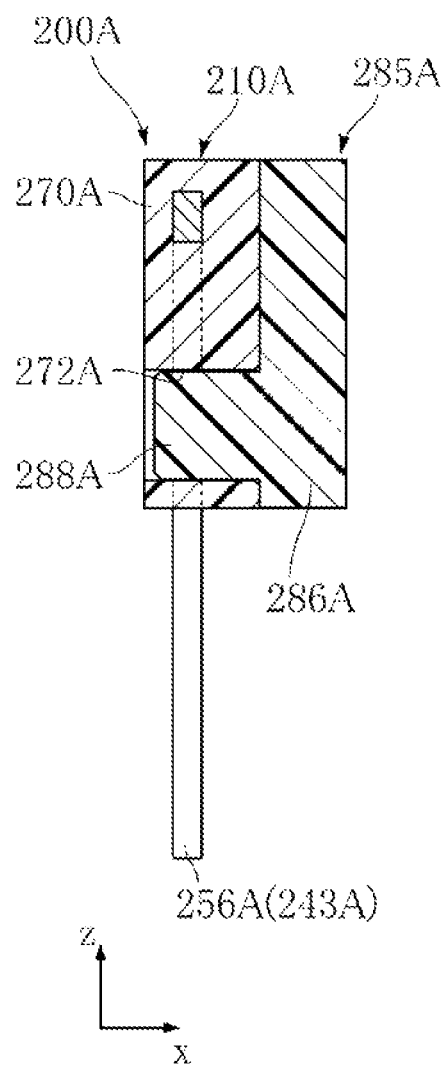
FIG. 7 is a cross-sectional view of the first light source unit taken along line VII-VII shown in FIG. 4.

The reflector 285A may function to determine a position of the light guide 280A with respect to the LED module 210A and to prevent light from being leaked improperly from the light guide 280A. The reflector 285A can be made of, for example, a white resin. The reflector 285A has a base unit 286A and a semicylindrical portion 287A. The base unit 286A is a rectangular plate portion having a size and a shape similar to the resin package 270A of the LED module 210A when viewed in the main scanning direction x. A plurality of protrusions 288A is formed on the base unit 286A. As illustrated in FIG. 7, the respective protrusions 288A are inserted into the position determining holes 272A of the resin package 270A of the LED module 210A. Accordingly, the position of the reflector 285A with respect to the LED module 210A is determined.

The semicylindrical portion 287A is a semi cylindrical portion extending along the main scanning direction x, and as illustrated in FIGS. 3 and 6, accommodates therein the light guide 280A. A portion of the semicylindrical portion 287A may be configured to face the reflective surface 282A of the light guide 280A, and serves to return light output from the reflective surface 282A to the light guide 280A. By being accommodated in the semicylindrical portion 287A, the light guide 280A can be fixed to the reflector 285A. Thus, the position of the light guide 280A is determined with respect to the LED module 210A together with the reflector 285A.

The light source unit 200B is a unit configured to emit linear light for use in reading an image by the image sensor module 101B and includes an LED module 210B, a light guide 280B, and a reflector 285B. The light source unit 200B may also be referred to as a second light source unit.

Figure 10:
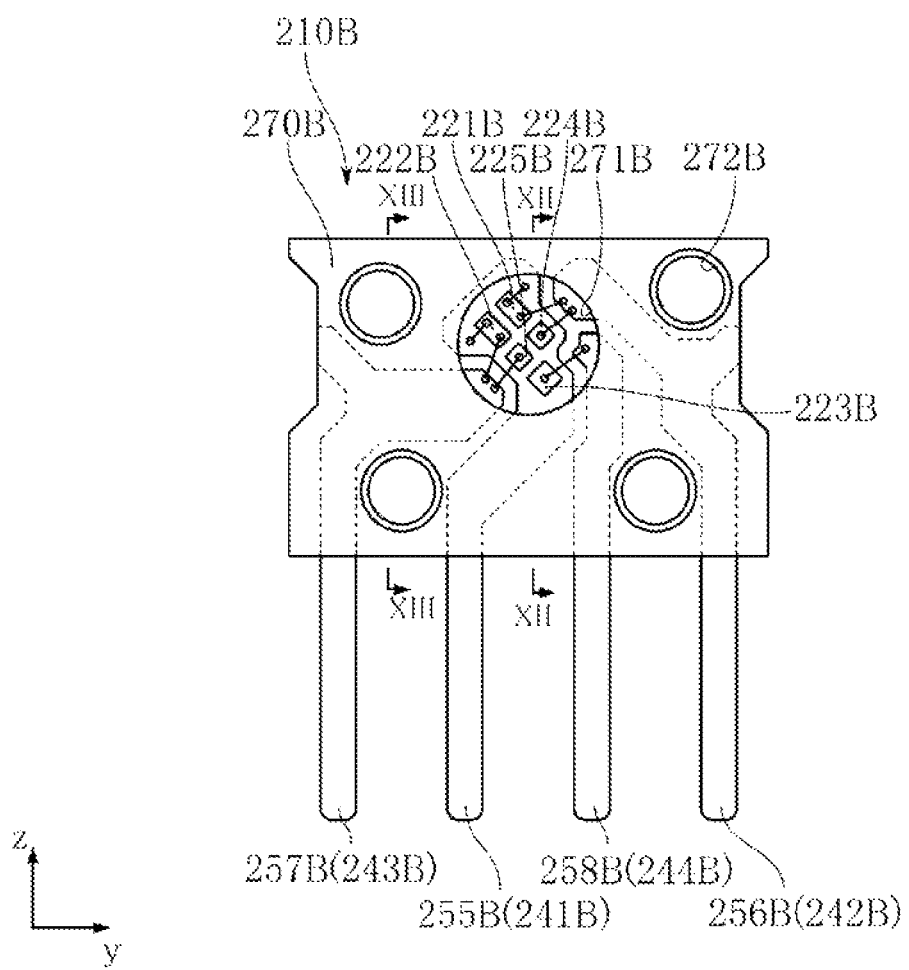
FIG. 10 is a front view of a second LED module of the image sensor module of FIG. 1.
Figure 11:
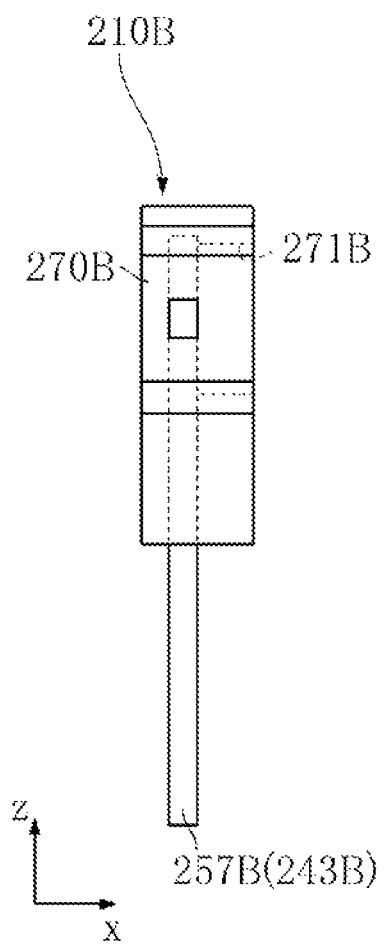
FIG. 11 is a side view of the second LED module of FIG. 10.

The LED module 210B is a module for performing a light emitting function of the light source unit 200B, and as illustrated in FIGS. 10 and 11, includes LED chips 221B, 222B, and 223B, Zener diodes 224B and 225B, leads 241B, 242B, 243B and 244B, and a resin package 270B. The LED module 210B may also be referred to as a second LED module.

The resin package 270B is made of a white resin such as, for example, a liquid crystal polymer resin or an epoxy resin, and covers portions of the leads 241B, 242B, 243B and 244B. The resin package 270B has an opening 271B and a plurality of position determining holes 272B. The opening 271B is provided in the vicinity of the center in the sub-scanning direction y, and may be circular in shape. The plurality of position determining holes 272B may be provided at positions to avoid the leads 241B, 242B, 243B and 244B, and in some embodiments, penetrate the resin package 270B.

Figure 12:
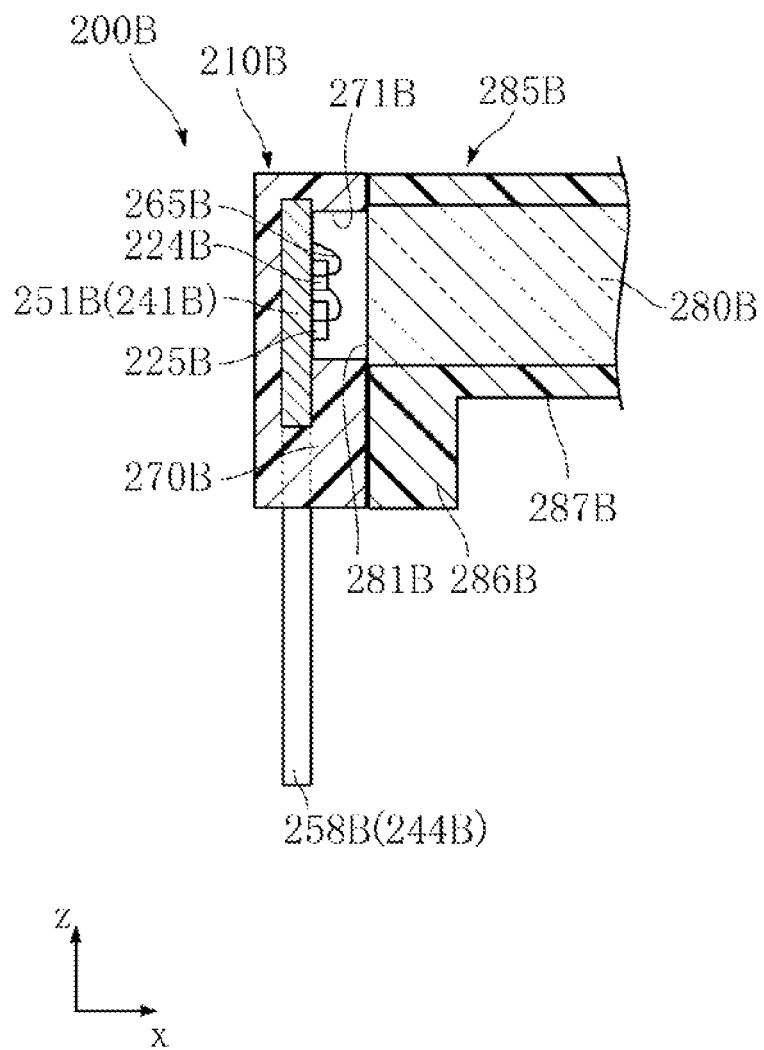
FIG. 12 is a cross-sectional view of a portion of a second light source unit taken along line XII-XII shown in FIG. 10.
Figure 14:
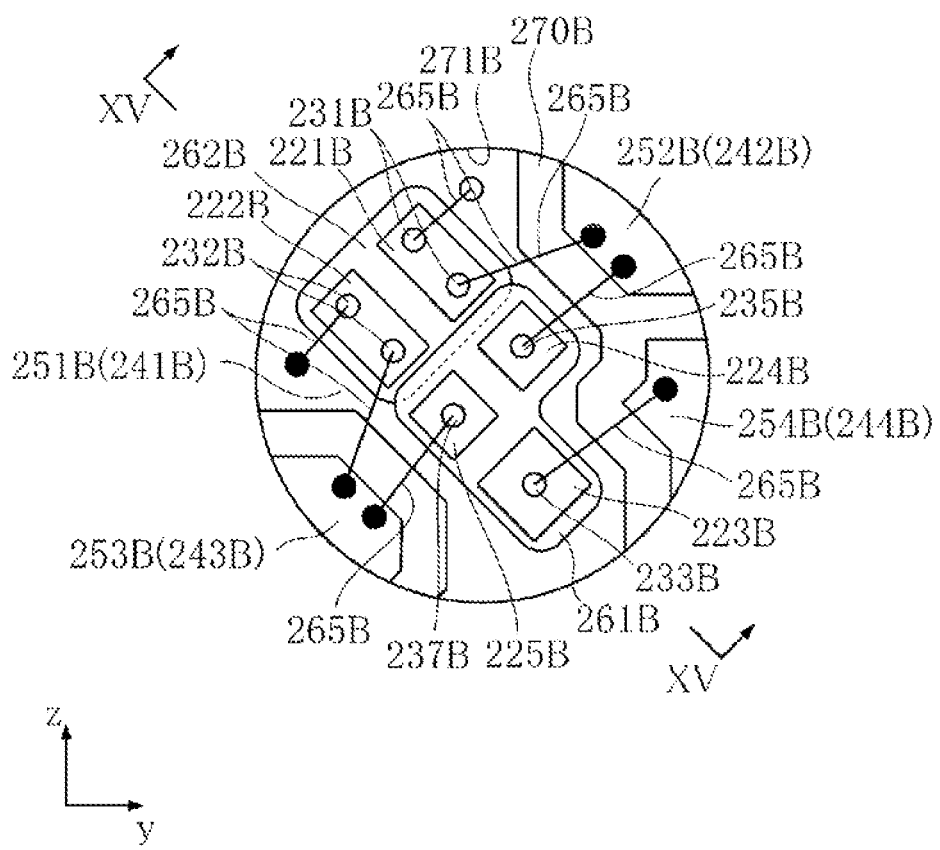
FIG. 14 is an enlarged front view of an opening of the second LED module of FIG. 10.

As illustrated in FIGS. 10, 12, and 14, the lead 241B has a mounting unit 251B and a terminal unit 255B. The lead 241B may also be referred to as a second lead. The mounting unit 251B is installed in the vicinity of an upper end of the lead 241B in the z direction and mounts thereon the LED chips 221B, 222B, and 223B and the Zener diodes 224B and 225B. The mounting unit 251B is exposed from the opening 271B of the resin package 270B. The terminal unit 255B is protruded downwardly in the thickness direction z from the resin package 270B and connected to the substrate 600.

The lead 242B has a wire bonding unit 252B and a terminal unit 256B. The wire bonding unit 252B is installed in the vicinity of a left upper end of the lead 242B in FIG. 10. In some embodiments, the wire bonding unit 252B is protruded in a left lower direction toward the mounting unit 251B of the lead 241B in FIG. 10. The wire bonding unit 252B is exposed from the opening 271B of the resin package 270B. The terminal unit 256B is protruded downwardly in the thickness direction z from the resin package 270B and connected to the substrate 600.

The lead 243B has a wire bonding unit 253B and a terminal unit 257B. The wire bonding unit 253B is installed in a portion protruded on the right side of the lead 243B in FIG. 10. In some embodiments, the wire bonding unit 253B is protruded in a right upper direction toward the mounting unit 251B of the lead 241B in FIG. 10. The wire bonding unit 253B is exposed from the opening 271B of the resin package 270B. The terminal unit 257B is protruded downwardly in the thickness direction z from the resin package 270B and connected to the substrate 600.

The lead 244B has a wire bonding unit 254B and a terminal unit 258B. The wire bonding unit 254B is installed in a portion protruded in the vicinity of an upper end of the lead 244B in FIG. 10. In some embodiments, the wire bonding unit 254B is positioned at a right side of the mounting unit 251B and at a lower side of the wire bonding portion 252B in the drawing. The wire bonding unit 254B is exposed from the opening 271B of the resin package 270B. The terminal unit 258B is protruded downwardly in the thickness direction z from the resin package 270B and connected to the substrate 600.

Figure 15:
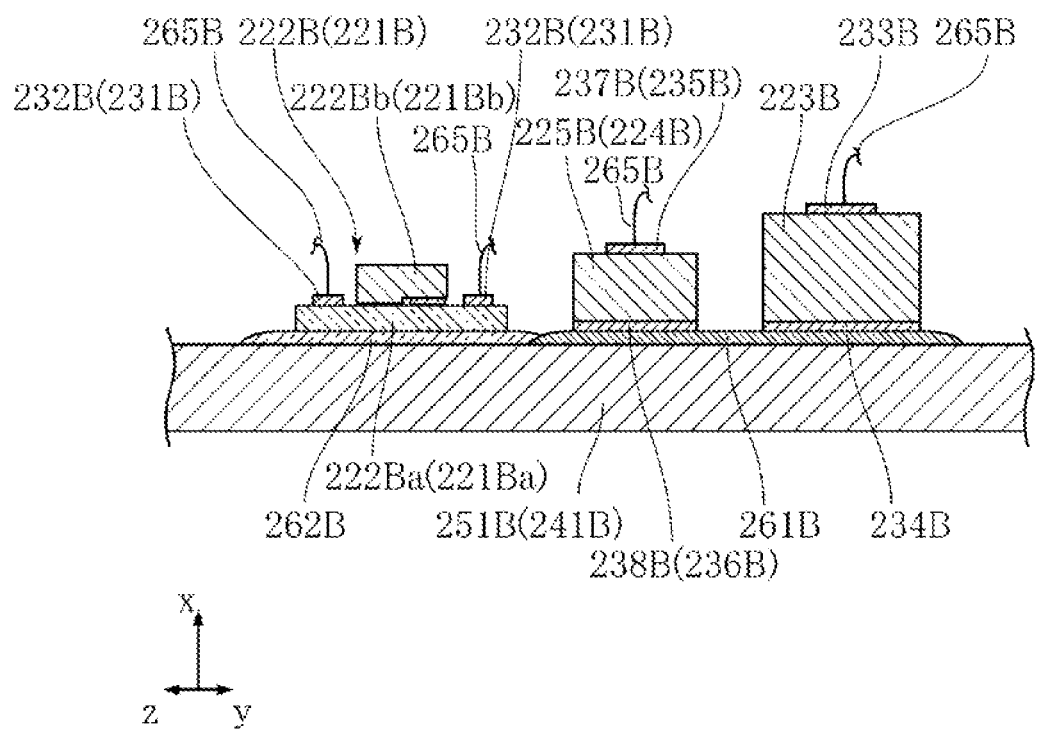
FIG. 15 is a cross-sectional view the opening of the second LED module taken along line XV-XV shown in FIG. 14.

The LED chip 222B may also be referred to as a second front surface electrode LED chip, and may be configured to emit a blue light. As illustrated in FIGS. 14 and 15, the LED chip 222B has a submount substrate 222Ba, a semiconductor layer 222Bb, and a pair of front surface electrodes 232B. The submount substrate 222Ba is made of, for example, Si, and may be transparent. The semiconductor layer 222Bb is made of, for example, a GaN-based semiconductor and includes an n type semiconductor layer, a p type semiconductor layer, and an active layer interposed between the n type semiconductor layer and the p type semiconductor layer (all not shown). The pair of front surface electrodes 232B is formed on the submount substrate 222Ba and electrically connected with the n type semiconductor layer and the p type semiconductor layer.

The LED chip 221B may also be referred to as a second front surface electrode LED chip, and may be configured to emit green light.

In FIG. 15, for the sake of understanding, reference numerals of the constituent elements of the LED chip 221B corresponding to the respective constituent elements of the LED chip 222B are described in parentheses. The LED chip 221B has a submount substrate 221Ba, a semiconductor layer 221Bb, and a pair of front surface electrodes 231B. The submount substrate 221Ba is made of, for example, Si, and may be transparent. The semiconductor layer 221Bb is made of, for example, a GaN-based semiconductor and includes an n type semiconductor layer, a p type semiconductor layer, and an active layer interposed between the n type semiconductor layer and the p type semiconductor layer (all not shown). The pair of front surface electrodes 231B is formed on the submount substrate 221Ba and electrically connected with the n type semiconductor layer and the p type semiconductor layer.

The LED chip 223B may also be referred to as a second front/rear surface electrode LED chip, and may be configured to emit red light. As illustrated in FIGS. 14 and 15, the LED chip 223B has a semiconductor layer made of, for example, a GaN-based semiconductor material, a front surface electrode 233B, and a rear surface electrode 234B. The semiconductor layer is made of an n type semiconductor layer, a p type semiconductor layer, and an active layer interposed between the n type semiconductor layer and the p type semiconductor layer (all not shown). The front surface electrode 233B is installed in the opposite side of the lead 241B of the LED chip 223B. The rear surface electrode 234B is installed in the lead 241B side of the LED chip 223B.

The Zener diode 224B may also be referred to as a second Zener diode, and may be an element for preventing an excessive voltage from being applied to the LED chip 221B. The Zener diode 224B has a front surface electrode 235B and a rear surface electrode 236B. The Zener diode 225B may also be referred to as a second Zener diode, and is an element for preventing an excessive voltage from being applied to the LED chip 222B. The Zener diode 225B has a front surface electrode 237B and a rear surface electrode 238B.

As illustrated in FIG. 14, the LED chips 221B and 222B are sloped in both of the sub-scanning direction y and the thickness direction z so as to be arranged in a direction extending from a left lower portion to a right upper portion in the drawing, and mounted on the mounting unit 251B of the lead 241B via an insulating layer 262B. The insulating layer 262B may also be referred to as a second insulating layer. The insulating layer 262B is transparent and is made of, for example, a transparent resin. The Zener diodes 224B and 225B are sloped in both of the sub-scanning direction y and the thickness direction z so as to be arranged in a direction extending from a left lower portion to a right upper portion in the drawing, and disposed at a right lower side with respect to the LED chips 221B and 222B in the drawing. The LED chip 223B is disposed in the opposite side of the LED chips 221B and 222B while the Zener diodes 224B and 225B being placed therebetween. The LED chip 223B and the Zener diodes 224B and 225B are mounted on the mounting unit 251B of the lead 241B via a conductive layer 261B. More specifically, a rear surface electrode 234B of the LED chip 223B and rear surface electrodes 236B and 238B of the Zener diodes 224B and 225B are electrically connected with the lead 241B through the conductive layer 261B. The conductive layer 261B is made of, for example, Ag.

A mounting process of the LED chips 221B, 222B and 223B and the Zener diodes 224B and 225B may be executed in the following order. First, a conductive paste as a material of the conductive layer 261B is applied to the mounting unit 251B of the lead 241B. Then, the LED chip 223B and the Zener diodes 224B and 225B are bonded. When the conductive paste is, for example, baked to be cured, the conductive layer 261B can be formed. Next, a resin paste as a material of the insulating layer 262B is applied to the mounting unit 251B. Then, the LED chips 221B and 222B are bonded. The insulating layer 262b can be formed by curing the resin paste.

According to the foregoing process order, the insulating layer 262B is formed after the conductive layer 261B is formed. Thus, when an application range of the conductive paste and that of the resin paste overlap, the conductive layer 261B is interposed between a portion of the insulating layer 262B and the mounting unit 251B of the lead 241B. In FIGS. 14 and 15, the conductive layer 261B and the insulating layer 262B formed according to such an application relationship are illustrated. Alternatively, the conductive layer 261B and the insulating layer 262B may be configured in such a manner that the application ranges thereof do not overlap. In this case, however, it does not happen that the insulating layer 262B is interposed between the conductive layer 261B and the mounting unit 251B of the lead 241B.

One of the pair of front surface electrodes 231B of the LED chip 221B is connected to the mounting unit 251B of the lead 241B via a wire 265B, and the other is connected to the wire bonding unit 252B of the lead 242B via the wire 265B. One of the pair of front surface electrodes 232B of the LED chip 222B is connected to the mounting unit 251B of the lead 241B via the wire 265B, and the other is connected to the wire bonding unit 253B of the lead 243B via the wire 265B.

The front surface electrode 233B of the LED chip 223B is connected to the wire bonding unit 254B of the lead 244B via the wire 265B. The front surface electrode 235B of the Zener diode 224B is connected to the wire bonding unit 252B of the lead 242B via the wire 265B, and the front surface electrode 237B of the Zener diode 225B is connected to the wire bonding unit 253B of the lead 243B via the wire 265B.

The light guide 280B serves to convert light from the LED module 210B into linear light extending along the main scanning direction x, and is made of, for example, a transparent acrylic resin such as poly methyl methacrylate (PMMA) or the like. The light guide 280B has a columnar shape extending along the main scanning direction x, and as illustrated in FIGS. 3 and 12, has an incident surface 281B, a reflective surface 282B, and an output surface 283B. The light guide 280B may also be referred to as a second light guide.

The incident surface 281B may also be referred to as a second incident surface, and may be an end surface of the light guide 280B in the main scanning direction x. The incident surface 281B covers the opening 271B of the resin package 270B of the LED module 210B, and may be configured to face the LED chips 221B, 222B, and 223B. The reflective surface 282B may also be referred to as a second reflective surface, and may be extended to be thin along the main scanning direction x. In FIG. 3, the reflective surface 282B may be formed at a left lower portion of the light guide 280B. The reflective surface 282B is a surface which reflects light having been made incident from the incident surface 281B and protruding through the light guide 280B. As a configuration of the reflective surface 282B, the reflective surface 282B may be a surface having fine protrusions and depressions formed thereon, a surface with white pigment coated thereon or the like. The output surface 283B may also be referred to as a second output surface, and may be extended thinly along the main scanning direction x. In some embodiments, a section of the output surface 283B has a partially arc shape. Light reflected by the reflective surface 282B is output as linear light extending along the main scanning direction x from the output surface 283B.

Figure 13:
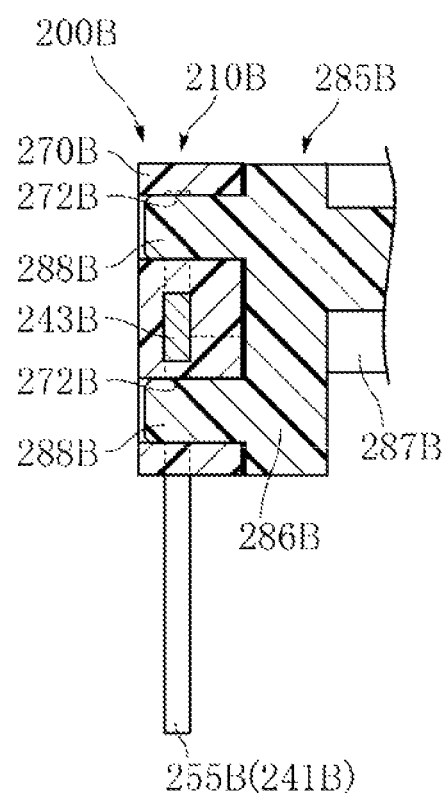
FIG. 13 is a cross-sectional view of the second light source unit taken along line XIII-XIII shown in FIG. 10.

The reflector 285B has a function of determining a position of the light guide 280B with respect to the LED module 210B and a function of preventing light from being leaked improperly from the light guide 280B. For example, the reflector 285B is made of a white resin. The reflector 285B has a base unit 286B and a semicylindrical portion 287B. The base unit 286B is a rectangular plate portion having a size and a shape similar to the resin package 270B of the LED module 210B when viewed in the main scanning direction x. A plurality of protrusions 288B is formed on the base unit 286B. As illustrated in FIG. 13, the respective protrusions 288B are inserted into the position determining holes 272B of the resin package 270B of the LED module 210B. Accordingly, the position of the reflector 285B with respect to the LED module 210B is determined.

The semicylindrical portion 287B is a semicylindrical portion extending along the main scanning direction x, and as illustrated in FIGS. 3 and 12, the semicylindrical portion 287B accommodates therein the light guide 280B. A portion of the semicylindrical portion 287B rightly facing the reflective surface 282B of the light guide 280B serves to return light output from the reflective surface 282B to the light guide 280B. By being accommodated in the semicylindrical portion 287B, the light guide 280B is fixed to the reflector 285B. Thus, the position of the light guide 280B is determined with respect to the LED module 210B together with the reflector 285B.

As illustrated in FIGS. 1, 2, and 3, the output surface 283A of the light source unit 200A is disposed to be more spaced apart from the lens unit 400 in the sub-scanning direction y than the output surface 283B of the light source unit 200B. In the thickness direction z, both of the output surfaces 283A and 283B are disposed at positions overlapping with the lens unit 400. The output surface 283A is disposed to be closer to the read target 890 than the output surface 283B is in the thickness direction z. Linear lights output from the output surfaces 283A and 283B are all output to the same site of the read target 890. In some embodiments, linear light output from the output surface 283A of the light source unit 200A makes an angle of about 20° with respect to the sub-scanning direction y. Linear light output from the output surface 283B of the light source unit 200B makes an angle of about 60° with respect to the sub-scanning direction y. Thus, the incident angles of the linear lights with respect to the read target 890 are different, and more particular, have a difference of about 40°.

As illustrated in FIG. 2, the LED module 210A is disposed at a more outer side than the LED module 210B is in the main scanning direction x. The LED module 210A and the LED module 210B overlap in the sub-scanning direction y, and in some embodiments, the LED module 210B is included in the LED module 210A in their relationship in the sub-scanning direction y.

As illustrated in FIGS. 3 and 4, the LED chips 221A, 222A and 223A and the light guide 280A are disposed at positions retreated to the left side from the terminal units 255A, 256A, 257A and 258A in the sub-scanning direction y. The substrate 600 is formed such that a dimension thereof in the sub-scanning direction y is connectable to the terminal units 255A, 256A, 257A and 258A, and no excessive extra space is allowed. Thus, the LED chips 221A, 222A and 223A and the light guide 280A are disposed at positions retreated to the left side in the sub-scanning direction y with respect to the substrate 600. In some embodiments, the light guide 280A and the substrate 600 are configured not to overlap at all in the sub-scanning direction y, but the present disclosure is not limited thereto and portions of the light guide 280A and the substrate 600 may overlap in the sub-scanning direction y. The LED chips 221B, 222B and 223B and the light guide 280B are disposed at positions overlapping with the substrate 600 in the sub-scanning direction y. The terminal units 255B, 256B, 257B and 258B extend downwardly from the resin package 270B of the LED module 210B in the thickness direction z and are connected to the substrate 600.

Referring again to FIG. 1, in an image reading apparatus using the image sensor module 101, light emission timing of the light source units 200A and 200B are set to be different from each other, and thus the sensor IC 500 obtains data under a state where the read target 890 is irradiated only by the light source unit 200A and data under a state where the read target 890 is irradiated only by the light source unit 200B. The read target 890 may include one or more hologram regions. In a hologram region, reflected light may be displayed by different colors (wavelengths) depending on incident angles thereof. In the above-described image reading apparatus, may determine whether or not there is a hologram region on the read target 890 or whether or not a hologram region on the read target 890 corresponds to a presumed hologram region, by comparing an image obtained under the state where the read target 890 is irradiated only by the light source unit 200A and an image obtained under the state where the read target 890 is irradiated only by the light source unit 200B.

When linear lights having different incident angles are irradiated to a hologram region, the light source units 200A and 200B are disposed as being spaced apart from each other in the thickness direction z. Thus, the dimension of the image sensor module 901 in the thickness direction z may be increased. However, it is desirable to have a slimmer image reading apparatus, and thus the image sensor module 101 also needs to become thinner.

Further, by selectively allowing the LED chips 221A, 222A and 223A of the light source unit 200A and the LED chips 221B, 222B and 223B of the light source unit 200B to emit light, monochromic light of red, green or blue light can be irradiated to a hologram region. In some cases, according to a configuration of the hologram region, a determination as to whether or not there is a hologram region on the read target 890 or whether or not a hologram region on the read target 890 corresponds to a presumed hologram region may be more accurately carried out by irradiating any one of monochromic lights.

Hereinafter, an operation of the image sensor module 101 will be described in more detail.

According to the present embodiment, by arranging the output surfaces 283A and 283B to be spaced apart from each another in the sub-scanning direction y, the incident angles of respective linear light beams to the read target 890 can be made different without providing a great difference between positions of the output surfaces 283A and 283B in the thickness direction z. Through this configuration, the image sensor module 101 can have a reduced thickness. By disposing the output surfaces 283A and 283B such that they overlap with the lens unit 400 in the thickness direction z, the reduction in the thickness of the image sensor module 101 can be further prompted.

By installing the LED chips 221A, 222A and 223A and the light guide 280A at retreated positions with respect to the terminal units 255A, 256A, 257A and 258A in the sub-scanning direction y, the output surface 283A can be spaced apart from the output surface 283B in the sub-scanning direction y without unnecessarily increasing the dimension of the substrate 600 in the sub-scanning direction y. By disposing the LED module 210A at a more outer side in the main scanning direction x than the LED module 210B is and exposing the LED module 210A from the LED module 210B in the sub-scanning direction y, light can be appropriately made incident to the light guides 280A and 280B having the output surfaces 283A and 283B arranged in the sub-scanning direction y.

In the LED module 210A, the LED chips 221A and 222A are mounted on the mounting unit 251A via the same insulating layer 262A, and the LED chip 223A and the Zener diodes 224A and 225A are mounted on the mounting unit 251A via the same conductive layer 261A. Thus, both of the insulating layer 262A and the conductive layer 261A are not configured to be divided into a plurality of smaller elements. Accordingly, the insulating layer 262A and the conductive layer 261A, and the LED chips 221A, 222A and 223A and the Zener diodes 224A and 225A mounted on the mounting unit 251A can be disposed with greater precision. Also, by disposing the Zener diodes 224A and 225A at positions adjacent to the LED chips 221A and 222A, signals from the plurality of wires 265A extending therefrom can be prevented from crossing each other. Thus, the LED module 210A can have a reduced size while avoiding interference between the wires 265A. Similarly, the LED module 210B can also have a reduced size.

The image sensor module in accordance with the present disclosure is not limited to the foregoing embodiments. A detailed configuration of each part of the image sensor module in accordance with the present disclosure may be variably modified in their design.

Hereinafter, second to a fourth embodiments of an image sensor module will be described in detail with reference to FIGS. 16 to 23.

FIGS. 16 to 21 illustrate an image sensor module 102 according to a second embodiment of the present disclosure. The image sensor module 102 includes a case 700, a substrate 600, a light emitting unit 300, a lens unit 400, a sensor IC 500, and a filter 801. The image sensor module 102 may be used for the purpose of reading a read target 890 such as, for example, a check or a bill on which special treatment may need to be conducted.

When the read target 890 is a check or a bill, special treatment may be performed on a surface of the read target 890 in order to determine truth or falsehood of the read target 890. A specially-treated portion of the read target 890 does not initially become exposed to the surface when irradiated by visible light, but when irradiated by, e.g., ultraviolet (UV) light, the specific portion emits visible light so as to become visible on the surface. Thus, in case of reading such a read target 890, the light source unit needs to output a different type of light, such as UV light. However, the sensor IC 500 may react to both UV light and visible light. Thus, in order to discriminate visible light emitted by the specially-treated portion and UV light reflected from the read target 890, a preventive measure for preventing UV light from reaching the sensor IC 500 may be required. In some cases, a UV filter may be used to prevent UV light from reaching the sensor IC 500. However, if a UV filter is used as the preventive measure, it requires an appropriate UV filter installation space in the case 700 and the UV filter may need to be integrated such that it is prevented from being improperly deformed or distorted.

In an image sensor module assembled in a scanner or a copier, such as image sensor module 101, a plurality of light receivers including, e.g., photoelectric conversion elements are arranged in the main scanning direction. The plurality of light receivers is connected to an IC chip. The image sensor module is configured such that, the plurality of photoelectric conversion elements receive light reflected from a document loaded into the scanner or the copier and a series of image signals having levels corresponding to the light receiving amount are output as an analog output signal.

In the image sensor module 101, with respect to reading and outputting an image one line at a time, e.g., one line of text from a page being scanned, if signals are received from the photoelectric conversion elements one by one in a specific order and there are a large number of photoelectric conversion elements, a long period of time is required to process the reading and outputting operation. Thus, in general, the photoelectric conversion elements may be divided into approximately two to twelve blocks and the reading and outputting of each block are processed in parallel, thereby shortening the process time.

The case 700 defines an outward form of the image sensor module 102 and accommodates therein the remaining components. The case 700 extends along the main scanning direction x, and a section thereof defined by the sub-scanning direction y and the thickness direction z has a substantially rectangular shape. The case 700 may be made of a material, for example, a liquid crystal polymer resin.

The substrate 600 has a long rectangular shape having the main scanning direction x as a length direction and the sub-scanning direction y as a width direction. The substrate 600 is made of, for example, a glass epoxy resin or ceramics. The sensor IC 500 is mounted on the substrate 600. The light emitting unit 300 is connected to the substrate 600.

Figure 17:
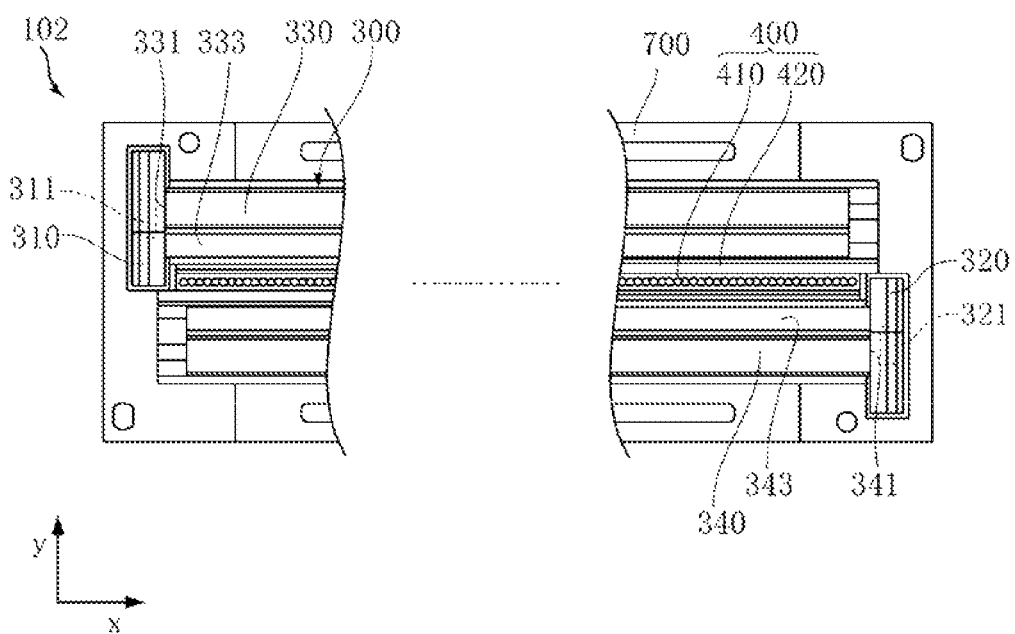
FIG. 17 is an enlarged plan view of a portion of the image sensor module of FIG. 16.
Figure 18:
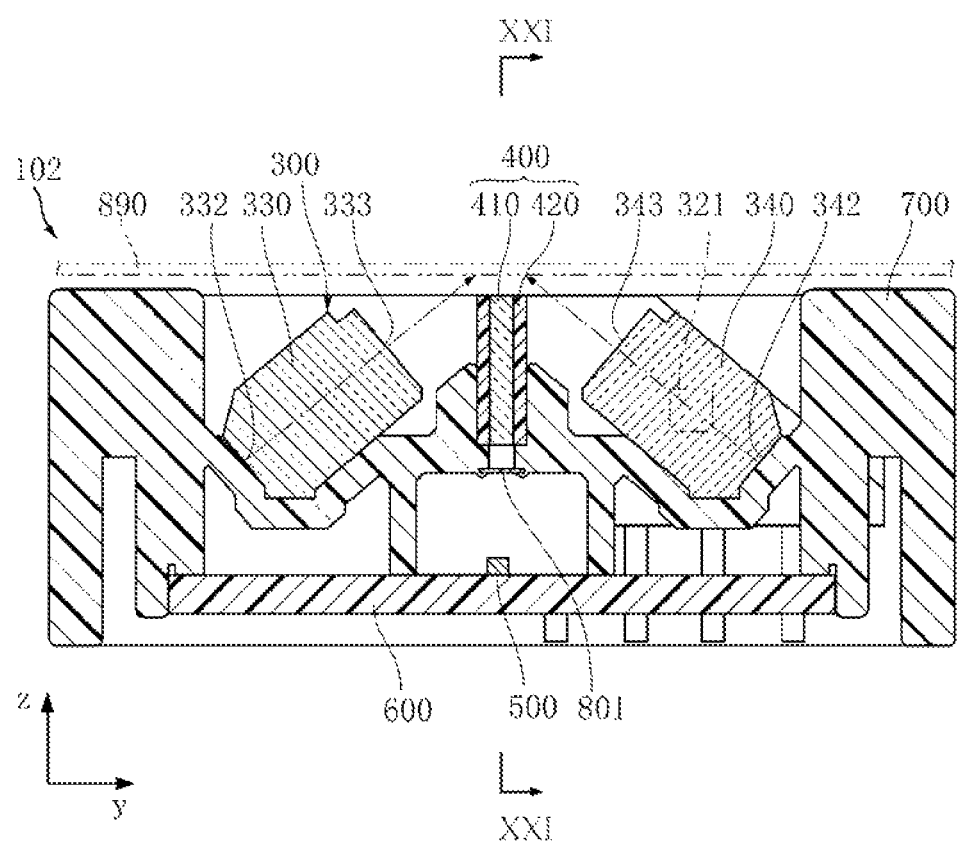
FIG. 18 is a cross-sectional view of the image sensor module taken along line XVIII-XVIII shown in FIG. 16.

The light emitting unit 300 includes LED modules 310 and 320 and light guides 330 and 340. In some embodiments, the light emitting unit 300 is configured to output two linear light beams. As illustrated in FIGS. 16 to 18, the LED modules 310 and 320 are disposed in the mutually opposite side with the lens unit 400 interposed therebetween in the sub-scanning direction y. Further, the light guides 330 and 340 are also disposed in the mutually opposite side with the lens unit 400 interposed therebetween in the sub-scanning direction y.

The LED module 310 may also be referred to as a first LED module, and may include an LED chip 311. The LED chip 311 emits, for example, UV light. As illustrated in FIGS. 16 and 17, the LED module 310 is accommodated in the vicinity of one end of the case 700 along the main scanning direction x (in the vicinity of the left side in the drawing). The light guide 330 may also be referred to as a first light guide, and has a bar-like shape extending along the main scanning direction x. As illustrated in FIGS. 16 to 18, the light guide 330 has an incident surface 331, a reflective surface 332, and an output surface 333. The light guide 330 is made of a transparent resin allowing UV light to be appropriately transmitted therethrough. Such a resin may be a cyclo olefin polymer resin (e.g., Zeon Corporation, Japan: ZEONEX 330R). The incident surface 331 is one end surface of the light guide 330 along the main scanning direction x and faces the LED chip 311 of the LED module 310. The reflective surface 332 extends along the main scanning direction x, and reflects UV light, which has been made incident from the incident surface 331 and protrudes through the light guide 330 toward a right slant upward side (indicated as a double-dot dashed line) in FIG. 18. The output surface 333 extends along the main scanning direction x and outputs UV light reflected by the reflective surface 332. Thus, the UV light acts as the linear light extending along the main scanning direction x.

The LED module 320 may also be referred to as a second LED module, and has an LED chip 321. The LED chip 321 emits, for example, light having a wavelength region other than UV light such as visible light, infrared light or the like. As illustrated in FIGS. 16 and 17, the LED module 320 is accommodated in the vicinity of the other end of the case 700 (e.g., in the vicinity of the side opposite to the LED module 310 as shown in FIGS. 16 and 17) along the main scanning direction x. The light guide 340 may also be referred to as a second light guide, and has a bar-like shape extending along the main scanning direction x. As illustrated in FIGS. 16 to 18, the light guide 340 has an incident surface 341, a reflective surface 342, and an output surface 343. The light guide 340 is made of a transparent resin allowing visible light or infrared light to be appropriately transmitted therethrough. Such a resin may be, for example, an acrylic resin. The incident surface 341 is on one end surface of the light guide 340 along the main scanning direction x and faces the LED chip 321 of the LED module 320. The reflective surface 342 extends along the main scanning direction x, and reflects light, which has been made incident from the incident surface 341, that protrudes through the light guide 340 toward a right slant upward side in FIG. 18. The output surface 343 extends along the main scanning direction x and outputs light reflected by the reflective surface 342. Thus, the UV light acts as the linear light extending along the main scanning direction x.

The lens unit 400 collects light, which has proceeded in the thickness direction z (which is perpendicular to both of the main scanning direction x and the sub-scanning direction y) from the read target 890, to form an erected image with the same magnification on the sensor IC 500. The lens unit 400 includes a plurality of lenses 410 and a lens holder 420. The plurality of lens 410 have optical axes following the thickness direction z, respectively, and are arranged in the main scanning direction x. The lens holder 420 is made of an opaque resin and holds the plurality of lenses 410.

The sensor IC 500 is an example of a light reception unit mounted on the substrate 600. The sensor IC 500 has a plurality of light receivers (not shown) arranged along the main scanning direction x. The sensor IC 500 has a photoelectric conversion function for outputting an electrical signal according to the light receiving amount of the plurality of light receivers.

The filter 801 is positioned between the lens unit 400 and the sensor IC 500 in the thickness direction z, and is disposed across a region in which the lens unit 400 and the sensor IC 500 exist in the main scanning direction x. As illustrated in FIGS. 19 to 21B, in the present embodiment, the filter 801 includes a plurality of small components 810. Each small component 810 includes a transparent base 811, a UV light filter layer 812, and a blue light filter layer 813.

The transparent base 811 may be made of, for example, transparent glass. A dimension of the transparent base 811 in the main scanning direction x is, for example, about 20 mm, and a dimension thereof in the sub-scanning direction y ranges from about 3 mm to about 5 mm, and a thickness thereof is about 0.3 mm. The UV light filter layer 812 selectively attenuates light having a wavelength within a UV region and allows light other than the UV region to be transmitted therethrough. The UV light filter layer 812 is formed on one surface of the transparent base 811. A wavelength region significantly attenuated by the UV light filter layer 812 is, for example, about 280 nm to about 400 nm. The blue light filter layer 813 is a layer selectively attenuating light of a blue region adjacent to the UV region and formed on the other surface of the transparent base 811. A wavelength region significantly attenuated by the blue light filter layer 813 is, for example, about 390 nm to about 430 nm. The plurality of small components 810 are fabricated by, for example, forming the UV light filter layer 812 and the blue light filter layer 813 on a large glass base and then dividing the glass base.

Figure 21A:
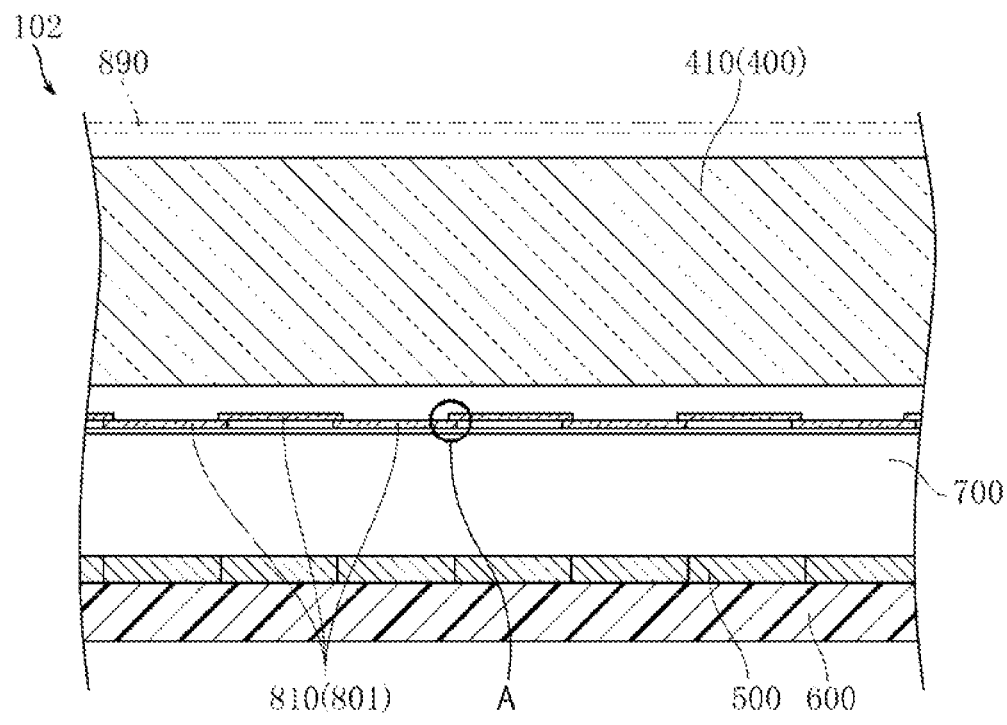
FIG. 21A is an enlarged cross-sectional view a portion of the image sensor module taken along line XXI-XXI shown in FIG. 18.
Figure 21B:
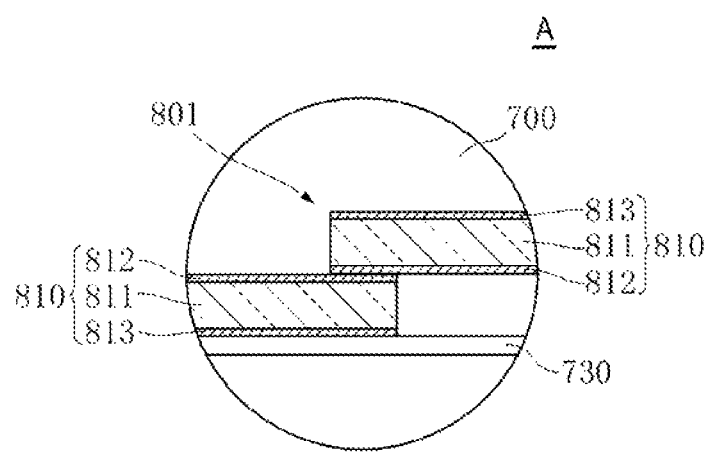
FIG. 21B is an enlarged view of a section A shown in FIG. 21A.

As illustrated in FIG. 21A, the plurality of small components 810 are arranged along the main scanning direction x. Portions of neighboring small components 810 overlap with each other. A dimension of the overlap portions in the main scanning direction x is, for example, about 1 mm. In some embodiments, the plurality of small components 810 is disposed in zigzags when viewed in the sub-scanning direction y. As illustrated in the partially enlarged view of FIG. 21B, the UV light filter layers 812 of the neighboring small components 810 face each other. More specifically, among the plurality of small components 810 disposed in zigzags, a small component 810 disposed in the vicinity of a lower side in the thickness direction z is configured such that the UV light filter layer 812 is formed on the surface of the transparent base 811 and the blue light filter layer 813 is formed on a lower surface of the transparent base 811. Additionally, among the plurality of small components 810 disposed in zigzags, a small component 810 disposed in the vicinity of an upper side in the thickness direction z is configured such that the UV light filter layer 812 is formed on a lower surface of the transparent base 811 and the blue light filter layer 813 is formed on the surface of the transparent base 811. Through this configuration, in some embodiments, portions of the UV light filter layers 812 of the neighboring small components 810 are in contact with each other.

As illustrated in FIGS. 19 and 20, the filter 801 including the plurality of small components 810 is integrated with the case 700. FIGS. 19 and 20 are different enlarged cross-sectional views of the filter 801 and small components 810 in the main scanning direction x. FIG. 19 is a cross-sectional view of the small component 810 disposed in the vicinity of a lower side in the thickness direction z, and FIG. 20 is a cross-sectional view of the small component 810 disposed in the vicinity of an upper side in the thickness direction z. As illustrated in FIGS. 19 and 20, both ends of the small component 810 in the sub-scanning direction y burrow into the case 700. The case 700 includes two pressing portions 730 for covering both ends of the small component 810 in the sub-scanning direction y from the thickness direction z. The respective pressing portions 730 extend in the main scanning direction x and has a convex shape gently protruded downwardly in the thickness direction z. Also, the case 700 has an incident side opening 710 and an output side opening 720. The incident side opening 710 allows an upper surface (an incident side surface) of the small component 810 to be exposed therethrough, and extends along the main scanning direction x. The output side opening 720 allows a lower surface (an output side surface) of the small component 810 to be exposed, and extends along the main scanning direction x. In some embodiments, a dimension of the output side opening 720 in the sub-scanning direction y is greater than a dimension of the incident side opening 710 in the sub-scanning direction y.

In a method for fabricating the image sensor module 102, the case 700 is formed by using the filter 810 and a mold made of a resin material. For example, the plurality of previously fabricated small components 810 are maintained by a mold such that they are disposed as illustrated in FIGS. 19 to 21B. Here, portions of the respective small components exposed from the incident side opening 710 and the output side opening 720 are used as portions for fixing the respective small components 810 by the mold.

Hereinafter, an operation of the image sensor module 102 will be described.

According to some embodiments, the filter 801 is formed integrated with the case 710. Thus, the filter 801 is fixed to the case 700. Accordingly, the filter 801 can be prevented from being misaligned or deformed, e.g., waved or bent to one side in the main scanning direction x.

The respective small components 810 forming the filter 801 have a relatively small size, so they are rarely deformed such as being waved or the like in the main scanning direction x. This is an advantage in comparison with a case where the filter 801 is configured by a sheet of glass, the filter 801 so that the filter 801 may be easily deformed, e.g., waved or bent to one side in the main scanning direction x. Since the neighboring small components 810 overlap with each other, a formation of a gap between the neighboring small components 810 can be avoided In particular, since the UV light filter layers 812 are in contact and face to each other, the UV light filter layers 812 of the plurality of small components 812 are all connected in the main scanning direction x without a gap therebetween. This is also appropriate to prevent UV light from improperly passing through the filter 801. Since the blue light filter layer 813 is provided, although the LED chip 311 of the LED module 310 emits UV light and light of a blue region adjacent to the UV region, the blue light can be appropriately shielded.

As illustrated in FIGS. 19 and 20, since the pressing portion 730 has a convex shape, an appropriate thickness required for fixing the small component 810 is secured. Since the dimension of the output side opening 720 in the sub-scanning direction y is relatively large, it can be reliably fixed along the small components 810 when the case 700 is formed by a mold. When the size of the region for fixing the small components 810 is not sufficient, force for fixing the small components is concentrated on a small region, which may result in damages to the small components. According to some embodiments, since the small components can be fixed with a relatively large area, the possibility in which the small components are damaged is reduced and the small components 810 can also be reduced in thickness.

Figure 22:
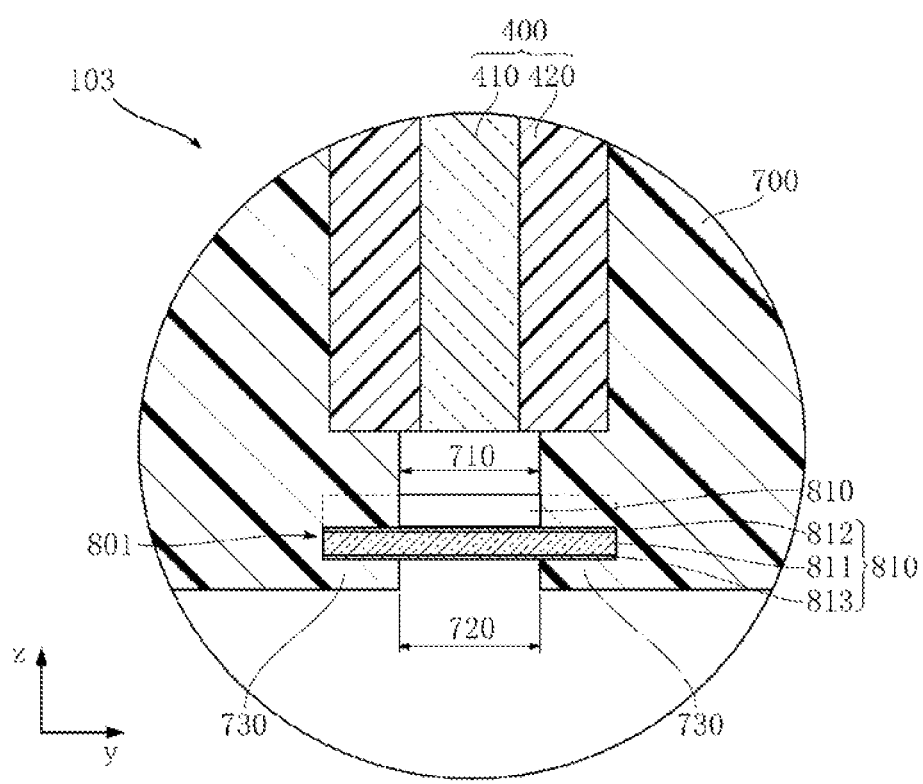
FIG. 22 is an enlarged cross-sectional view of an image sensor module in accordance with a third embodiment of the present disclosure.
Figure 23:
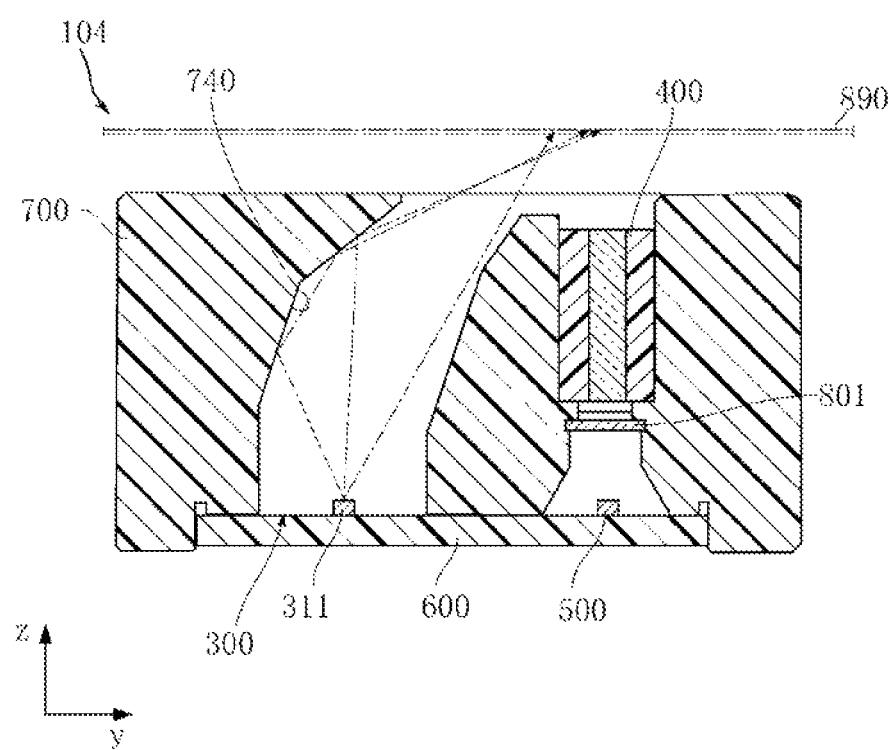
FIG. 23 is a cross-sectional view of an image sensor module in accordance with a fourth embodiment of the present disclosure.

FIGS. 22 and 23 illustrate other embodiments of an image sensor module. For these figures, the same reference numerals as those of the former embodiment are used for the same or similar elements as those of the former embodiment, in the interest of brevity.

FIG. 22 illustrates an image sensor module 103 in accordance with the third embodiment of the present disclosure. The image sensor module 103 includes the pressing portion 730 configured to be different from that of the foregoing embodiment. In some embodiments, rather than having a convex shape, the pressing portion 730 has a flat shape such that the pressing portion 730 is on the same plane as portions of the case 700 around the pressing portion 730, i.e., the pressing portion 730 has the same height as the portions of the case 700 therearound. Further, in some embodiments, the dimensions of the incident side opening 710 and the output side opening 720 in the sub-scanning direction y are substantially the same. Also, in some embodiments, the filter 801 can be prevented from being misaligned or deformed, e.g., being waved or bent to one side in the main scanning direction x.

FIG. 23 illustrates an image sensor module 104 according to the fourth embodiment of the present disclosure. In some embodiments, the case 700 and the light emitting unit 300 of the image sensor module 104 are configured to be different from those of the foregoing embodiment. In some embodiments, the light emitting unit 300 includes a plurality of LED chips 311. The plurality of LED chips 311 emit UV light and are mounted in a regular line on the substrate 600 in the main scanning direction x. The case 700 includes a guide surface 740. The guide surface 740 appropriately reflects light from the plurality of LED chips 311 to thereby convert it into linear light toward the read target 890. In some embodiments, the light emitting unit 300 is considered to be configured by the plurality of LED chips 311 and the guide surface 740. In addition, in some embodiments, the light emitting unit 300 outputs only UV light from one side of the lens unit 400. Also, according to this embodiment, the filter 801 can be prevented from being misaligned or deformed, e.g., being waved or bent to one side in the main scanning direction x.

The image sensor module of the present disclosure is not limited to the foregoing embodiments. A detailed configuration of each part of the image sensor module of the present disclosure can be variably modified in their design.

Aspects of Present Disclosure

Hereinafter, the preferred aspects of the present disclosure will be additionally stated.

[Addition 1]

An image sensor module, comprising:

a light emitting unit configured to output a linear UV light extending along a main scanning direction toward a read target;

a light reception unit having a plurality of light receivers arranged in the main scanning direction;

a lens unit configured to collect light from the read target on the light reception unit;

a case configure to accommodate therein the light emitting unit, the light reception unit and the lens unit; and a filter configured to selectively attenuate the linear UV light from the light emitting unit, the filter being disposed between the lens unit and the light reception unit and formed integrated with the case.

[Addition 2]

The image sensor module of Addition 1, wherein the filter includes a plurality of small components.

[Addition 3]

The image sensor module of Addition 2, wherein the plurality of small components are arranged along the main scanning direction.

[Addition 4]

The image sensor module of Addition 3, wherein portions of neighboring small components overlap with each other.

[Addition 5]

The image sensor module of Addition 4, wherein the plurality of small components are disposed in zigzags in a sub-scanning direction.

[Addition 6]

The image sensor module of Addition 4 or 5, wherein each of the small components has a transparent base configured to allow the linear UV light to be transmitted therethrough, and a UV light filter layer configured to selectively attenuate the linear UV light, the UV light filter being installed on one surface of the transparent base.

[Addition 7]

The image sensor module of Addition 6, wherein the neighboring small components are formed such that surfaces thereof on which the UV light filter layer is formed face each other.

[Addition 8]

The image sensor module of Addition 6 or 7, wherein each of the small components includes a blue light filter layer configured to selectively attenuate blue light, the blue light filter layer being installed on an opposite surface of the transparent base to the surface on which the UV light filter layer is installed.

[Addition 9]

The image sensor module of any one of Addition 1 to Addition 8, wherein the case includes an incident side opening configured to expose an incident side surface of the filter and extending along the main scanning direction, and an output side opening configured to expose an output side surface of the filter and extending along the main scanning direction.

[Addition 10]

The image sensor module of Addition 9, wherein a dimension of the output side opening in the sub-scanning direction is greater than that of the incident side opening in the sub-scanning direction.

[Addition 11]

The image sensor module of Addition 6 or 10, wherein the case includes pressing portions covering portions in the vicinity of both ends of the output side surface of the filter in the sub-scanning direction.

[Addition 12]

The image sensor module of Addition 11, wherein the pressing portions are convex in a direction toward which the output side surface of the filter faces.

[Addition 13]

The image sensor module of any one of Addition 1 to Addition 12, wherein the light emitting unit includes a first LED module having an LED chip configured to emit UV light and a first light guide extending along the main scanning direction, and the first light guide having an incident surface to which light from the first LED module is made incident, a reflective surface reflecting light proceeding from the incident surface and an output surface outputting light proceeding from the reflective surface as linear light extending along the main scanning direction.

[Addition 14]

The image sensor module of Addition 13, wherein the light emitting unit includes a second LED module having an LED chip configured to emit light other than in a UV region and a second light guide extending along the main scanning direction, the second light guide having an incident surface to which light from the second LED module is made incident, a reflective surface reflecting light proceeding from the incident surface and an output surface outputting light proceeding from the reflective surface as linear light extending along the main scanning direction, and wherein the first light guide and the second light guide are disposed in a mutually opposite side in the sub-scanning direction while the lens unit being placed therebetween.

[Addition 15]

The image sensor module of Addition 14, wherein the LED chip of the second LED module emits visible light.

Hereinafter, a fifth to a seventh embodiment of an image sensor module and an inspection apparatus of the present disclosure will be described in detail with reference to FIGS. 24 to 32.

Figure 25:
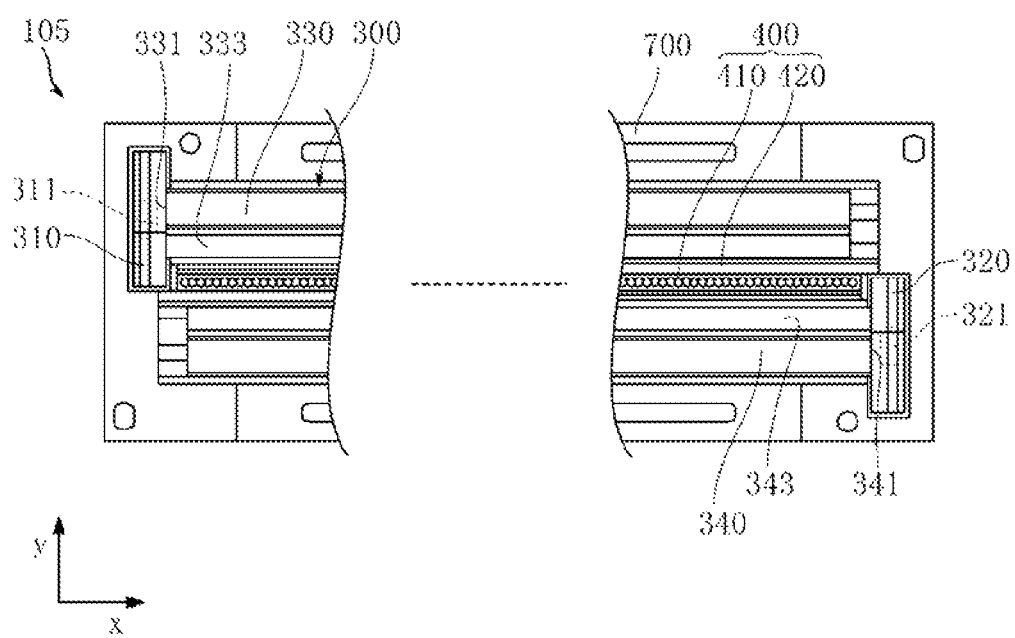
FIG. 25 is an enlarged plan view of a portion of the image sensor module of FIG. 24.
Figure 26:
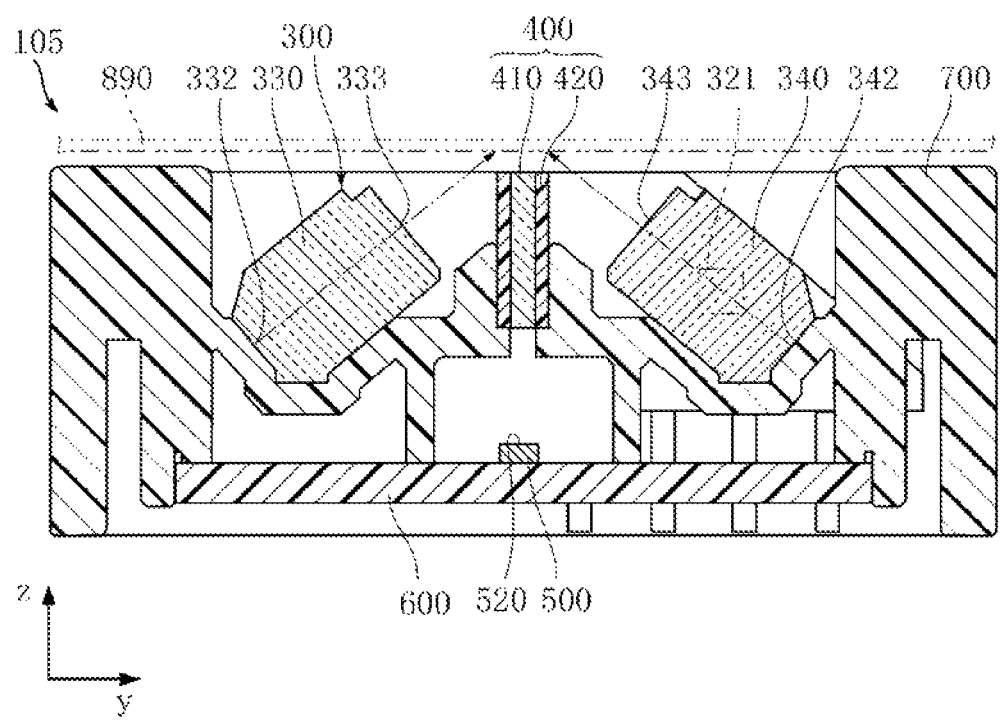
FIG. 26 is a cross-sectional view of the image sensor module taken along line XXVI-XXVI shown in FIG. 24.

FIGS. 24 to 26 illustrate an image sensor module 105 according to a fifth embodiment of the present disclosure. The image sensor module 105 includes the case 700, the substrate 600, the light emitting unit 300, the lens unit 400, and the sensor IC 500. The image sensor module 105 may be used for the purpose of reading the read target 890, such as, for example, a check or a bill on which special treatments have been conducted.

The case 700 defines an outward form of the image sensor module 105 and accommodates therein the remaining components. The case 700 extends along the main scanning direction x, and a section thereof defined by the sub-scanning direction y and the thickness direction z has a substantially rectangular shape. The case 700 may be made of a material, for example, a liquid crystal polymer resin.

The substrate 600 has a long rectangular shape having the main scanning direction x as a length direction and the sub-scanning direction y as a width direction. The substrate 600 is made of, for example, a glass epoxy resin or ceramics. The sensor IC 500 is mounted on the substrate 600. Also, the light emitting unit 300 is connected to the substrate 600.

The light emitting unit 300 includes LED modules 310 and 320 and light guides 330 and 340. In some embodiments, the light emitting unit 300 is configured to output two linear light beams. The LED modules 310 and 320 are disposed in the mutually opposite side with the lens unit 400 interposed therebetween in the sub-scanning direction y. Further, the light guides 330 and 340 are also disposed in the mutually opposite side with the lens unit 400 interposed therebetween in the sub-scanning direction y.

The LED module 310 may also be referred to as a first LED module, and includes an LED chip 311. The LED chip 311 emits UV light. As illustrated in FIGS. 24 and 25, the LED module 310 is accommodated in the vicinity of one end of the case 700 in the main scanning direction x (in the vicinity of the left side in the drawing). The light guide 330 may also be referred to as a first light guide, and has a bar-like shape extending along the main scanning direction x. The light guide 330 has an incident surface 331, a reflective surface 332, and an output surface 333. The light guide 330 is made of a transparent resin allowing UV light to be appropriately transmitted therethrough. Such a resin may be a cyclo olefin polymer resin (e.g., Zeon Corporation, Japan: ZEONEX 330R). The incident surface 331 is one end surface of the light guide 330 in the main scanning direction x and rightly faces the LED chip 311 of the LED module 310. The reflective surface 332 extends along the main scanning direction x, and reflects UV light, which has been made incident from the incident surface 331 and protruding through the light guide 330, toward a right slant upward side in FIG. 26. The output surface 333 extends along the main scanning direction x and outputs UV light reflected by the reflective surface 332, as linear light extending in the main scanning direction x.

The LED module 320 may also be referred to as a second LED module, and may include an LED chip 321. The LED chip 321 emits light having a wavelength region other than UV light. Light having a wavelength region other than UV light may be visible light or infrared light. In case of a configuration having three LED chips 321 for emitting red light, green light and blue light, respectively, these light beams are mixed to output white light from the LED module 320. Alternatively, the LED chip 321 may be configured to emit white light. As illustrated in FIGS. 24 and 25, the LED module 320 is accommodated in a portion in the vicinity of the other end of the case 700 (in the vicinity of the right side in the drawing) in the main scanning direction x. The light guide 340 may also be referred to as a second light guide, and has a bar-like shape extending along the main scanning direction x. The light guide 340 has the incident surface 341, the reflective surface 342, and the output surface 343. The light guide 340 is made of a transparent resin allowing visible light or infrared light to be appropriately transmitted therethrough. Such a resin may be, for example, an acrylic resin. The incident surface 341 is one end surface of the light guide 340 in the main scanning direction x and rightly faces the LED chip 321 of the LED module 320. The reflective surface 342 extends along the main scanning direction x, and reflects light, which has been made incident from the incident surface 341 and protruding through the light guide 340, toward a right slant upward side in FIG. 26. The output surface 343 extends along the main scanning direction x and outputs light reflected by the reflective surface 342, as linear light extending along the main scanning direction x.

The lens unit 400 collects light, which has proceeded in the thickness direction z (which is perpendicular to both of the main scanning direction x and the sub-scanning direction y) from the read target 890, to form an erected image with the same magnification on the sensor IC 500. The lens unit 400 includes a plurality of lenses 410 and a lens holder 420. The plurality of lens 410 have optical axes following the thickness direction z, respectively, and are arranged along the main scanning direction x. The lens holder 420 is made of an opaque resin and holds the plurality of lenses 410.

Figure 27:
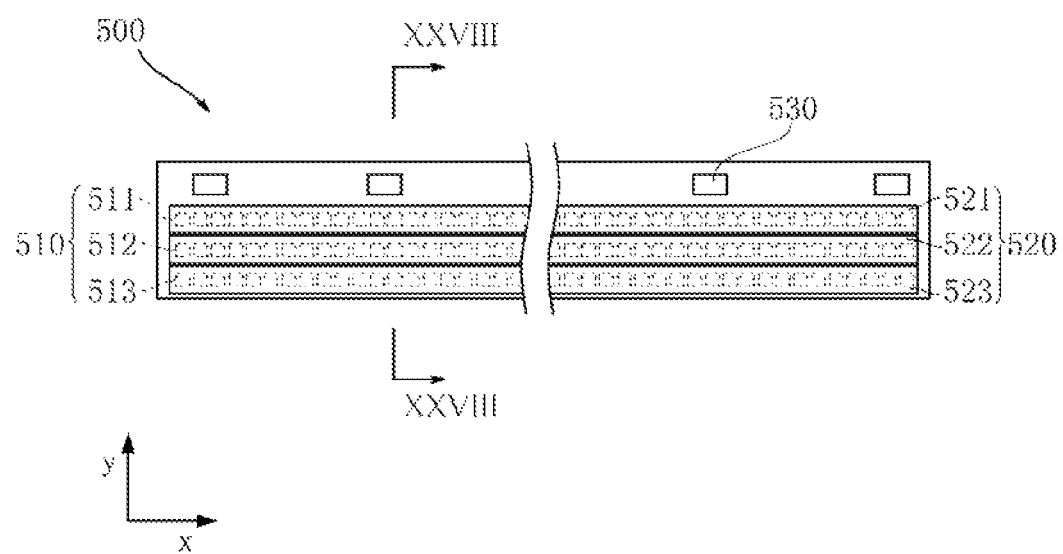
FIG. 27 is a plan view of a portion of a sensor IC of the image sensor module of FIG. 24.
Figure 28:
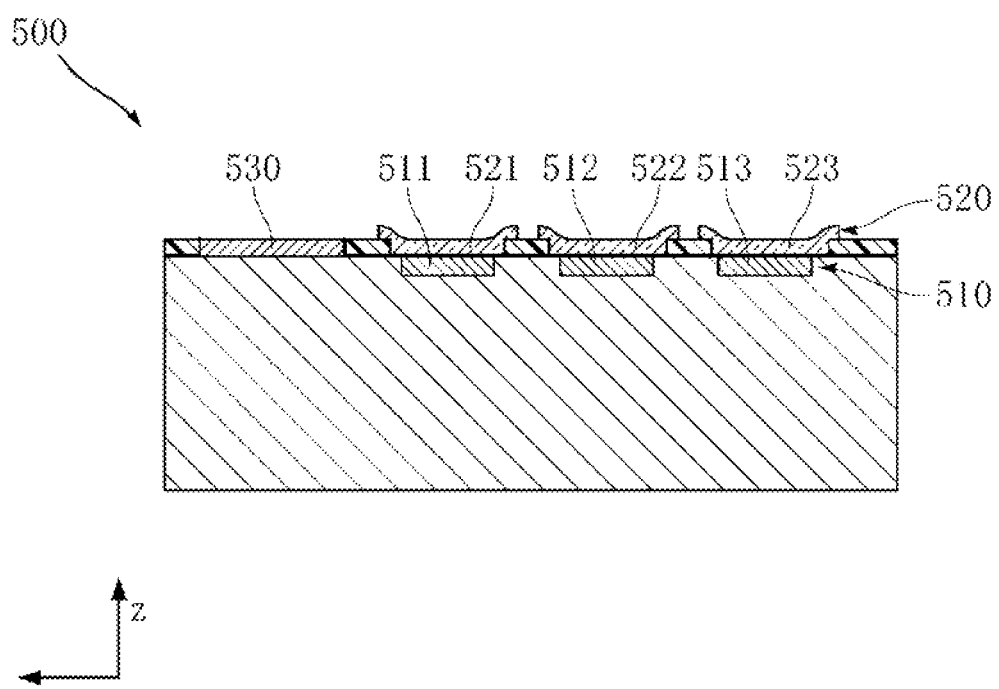
FIG. 28 is an enlarged sectional view the sensor IC taken along line XXVIII-XXVIII shown in FIG. 27.

The sensor IC 500 is an example of a light reception unit, and is mounted on the substrate 600. As illustrated in FIGS. 27 and 28, the sensor IC 500 includes a plurality of light receivers 510 and a plurality of filters 520. The plurality of filters 520 correspond to an example of a UV light attenuation unit.

The plurality of filters 520 includes a first filter 521, a second filter 522, and a third filter 523. These first to the third filter 521, 522 and 523 have a band-like shape extending along the main scanning direction x, respectively, and are disposed to be parallel at intervals in the sub-scanning direction y. In some embodiments, the first filter 521 allows red light to be selectively transmitted therethrough and attenuates visible light other than red light and UV light. The second filter 522 allows green light to be selectively transmitted therethrough and attenuates visible light other than green light and UV light. The third filter 523 allows blue light to be selectively transmitted therethrough and attenuates visible light other than blue light and UV light.

The plurality of light receivers 510 are divided into a first group 511, a second group 512, and a third group 513. The first to the third group 511 to 513 are arranged in the main scanning direction x, respectively. Further, the first to the third group 511 to 513 are disposed to be parallel at an interval in the sub-scanning direction y. The first group 511 is covered by the first filter 521, the second group 512 is covered by the second filter 522, and the third group 513 is covered by the third filter 523.

Light collected by the lens unit 400 transmits through the first to the third filter 521, 522 and 523, and is received by the first to the third group 511 to 513. The first group 511 receives a red component of the collected light, the second group 512 receives a green component of the collected light, and the third group 513 receives a blue component of the collected light. The sensor IC 500 has a photoelectric conversion function of outputting an electrical signal having a strength according to intensity of light received, from, e.g., a pad 530, in each of the first to the third group 511 to 513.

Hereinafter, an operation of the image sensor module 105 will be described.

According to the present embodiment, as illustrated in FIGS. 27 and 28, the filters 520 as UV light attenuation units for attenuating UV light is mounted in the sensor IC 500. Accordingly, there is no need to secure a space for installing the UV light filters, for example, in the case 700. Thus, the size of the image sensor module 105 can be reduced. In addition, since the filters 520 are mounted in the sensor IC 500, a possibility in which the filters 520 are slanted or misaligned is advantageously reduced in comparison a case in which the UV light filters are mounted in the case 700 at positions spaced apart from the sensor IC 500.

UV light output from the LED module 310 of the light emitting unit 300 is converted into linear light by the light guide 330 and then irradiated to the read target 890. When the read target 890 is a note on which special treatments have been conducted, the specially-treated portion thereof may emit visible light having a particular wavelength upon receiving UV light. In general, the light having a particular wavelength is different for each type of notes. In order to allow red light, green light and blue light to be selectively transmitted therethrough, the first to the third filters 521, 522 and 532 may verify intensity of light received by the first to the third group 511 to 513 based on an output signal from the sensor IC 500 to thereby specify a wavelength region of the received light. Accordingly, the image sensor module 105 may be used to perform a process to determine whether or not a note is true or false based on the color and form of the specially-treated portion exposed by UV light.

A shape or characters printed on a note by a general method can be read by irradiating visible light output from the LED module 320 to the read target 890, e.g., a note. The LED modules 310 and 320 or the light guides 330 and 340 are disposed to be spaced apart from each another with the lens unit 400 interposed therebetween, so that UV light and visible light can be appropriately irradiated to a portion of the read target 890 positioned at a front side in the thickness direction z with respect to the lens unit 400. Since the LED module 310 and the LED module 320 are mounted in the same case 700, irradiation regions of the LED modules 310 and 320 can be accurately determined at desired positions on the read target 890. Also, since the light emitting unit 300 configured to collectively output light beams having a plurality of wavelength regions is provided with respect to the single sensor IC 500, the size of the image sensor module 105 can be reduced in comparison to a configuration in which a plurality of sensor ICs 500 corresponding to light beams having the respective wavelength regions are provided.

When light received from the read target 890 and having the foregoing particular wavelength is read by using UV light as a light source, the UV light may be a noise. Also, the light source for emitting UV light may emit blue light together with UV light in many cases. Thus, in general, a method of allowing light, which is to reach the sensor IC 500, to be transmitted through a filter for shielding UV light and blue light is employed. In this case, the sensor IC 500 does not receive noise light of UV light or blue light. Additionally, in some embodiments, the first and the second group 511 and 512 do not receive UV light and blue light, while the third group 513 receives at least blue light through the third filter 523. Thus, the third group 513 may be used for the purpose of monitoring a ratio of intensity of light emitted from the LED modules 310 and 320.

Figure 29:
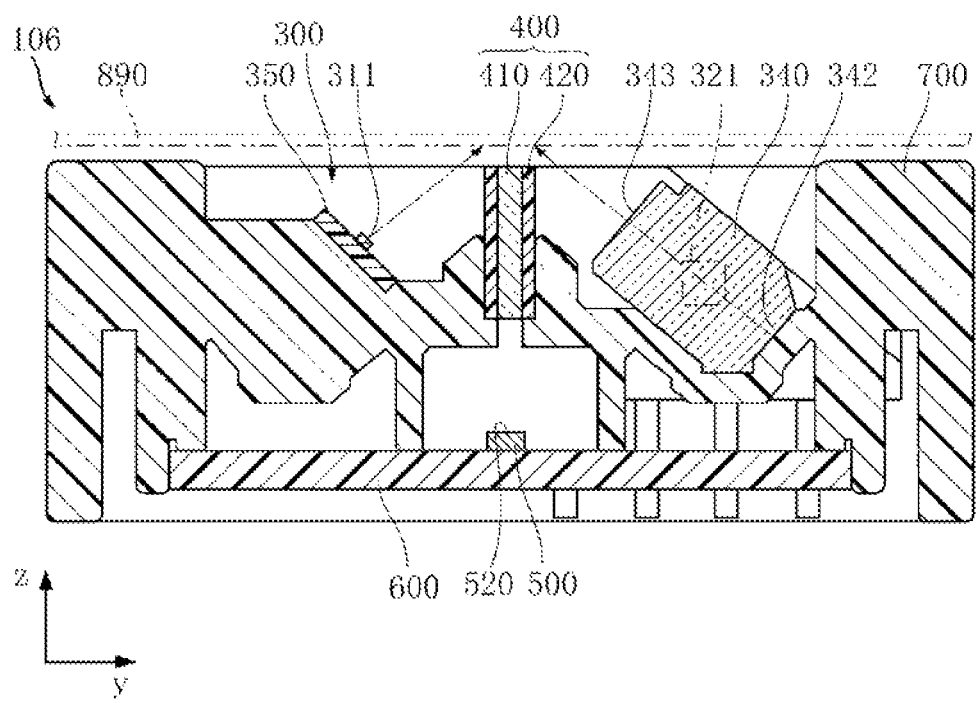
FIG. 29 is a cross-sectional view of an image sensor module in accordance with a sixth embodiment of the present disclosure.
Figure 30:
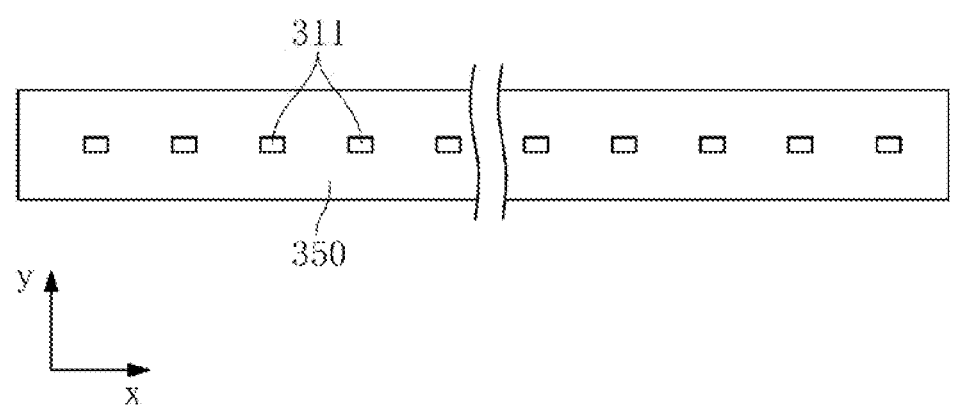
FIG. 30 is a plan view of a portion of an LED substrate and an LED chip of the image sensor module of FIG. 29.
Figure 31:
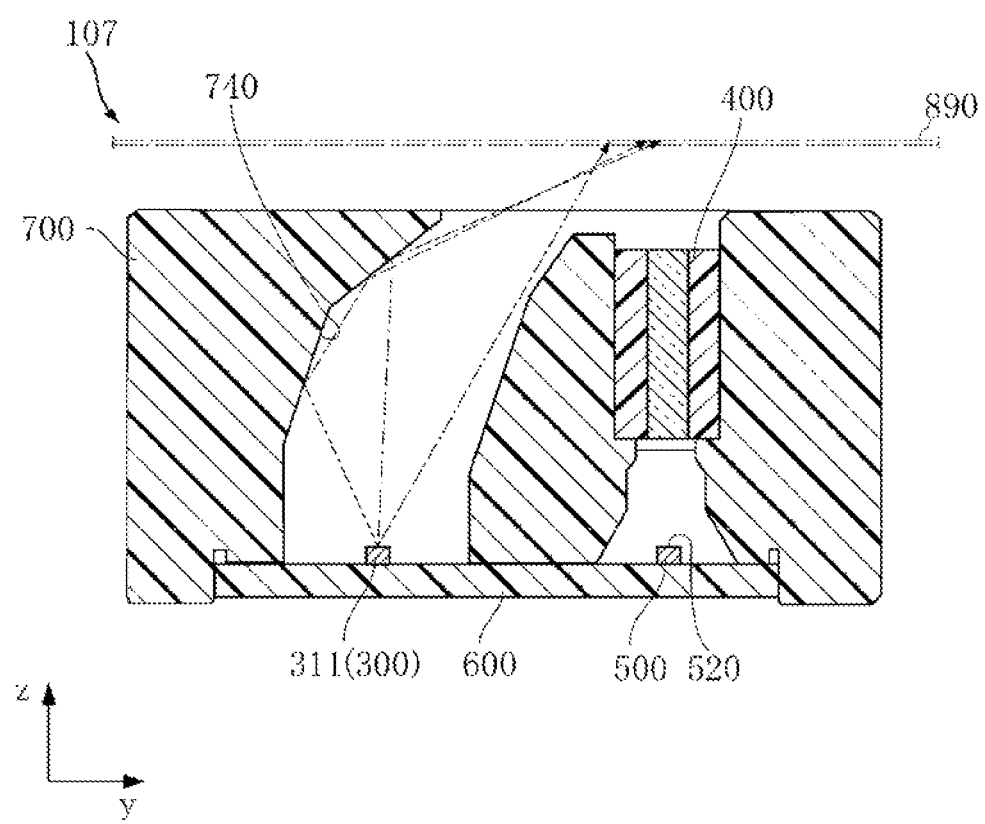
FIG. 31 is a cross-sectional view of an image sensor module in accordance with a seventh embodiment of the present disclosure.

FIGS. 29 to 31 illustrate other embodiments of an image sensor module of the present disclosure. Additionally, in these drawings, the same reference numerals as those of the former embodiment are used for the same or similar elements as those of the former embodiment.

FIG. 29 illustrates an image sensor module 106 according to the sixth embodiment of the present disclosure. A configuration of the light emitting unit 300 in the image sensor module 106 is different from that of the foregoing embodiment. In some embodiments, the light emitting unit 300 includes an LED substrate 350 in the place of the foregoing LED module 310, and a plurality of LED chips 311 mounted on the LED substrate 350. The LED substrate 350 is an insulating substrate made of, for example, a glass epoxy resin or ceramics and has a long rectangular shape extending along the main scanning direction x as illustrated in FIG. 30. The plurality of LED chips 311 emit UV light, respectively, and are arranged on the LED substrate 350 in the main scanning direction x. Also, according to this embodiment, advantageously, there is no need to secure a space for installing UV light filters in the case 700.

FIG. 31 illustrates an image sensor module 107 according to the seventh embodiment of the present disclosure. A configuration of the case 700 and the light emitting unit 300 in the image sensor module 107 is different from that of the foregoing embodiment. In some embodiments, the light emitting unit 300 includes a plurality of LED chips 311. The plurality of LED chips 311 emit UV light and are mounted in a regular line on the substrate 600 in the main scanning direction x. A guide surface 740 is formed in the case 700. The guide surface 740 appropriately reflects light from the plurality of LED chips 311 to convert it into linear light toward the read target 890. In some embodiments, it may be mentioned that the light emitting unit 300 is configured by the plurality of LED chips 311 and the guide surface 740. Further, in some embodiments, the light emitting unit 300 outputs only UV light from one side of the lens unit 400. Also, in this embodiment, advantageously, there is no need to secure a space for installing a UV filter in the case 700.

Figure 32:
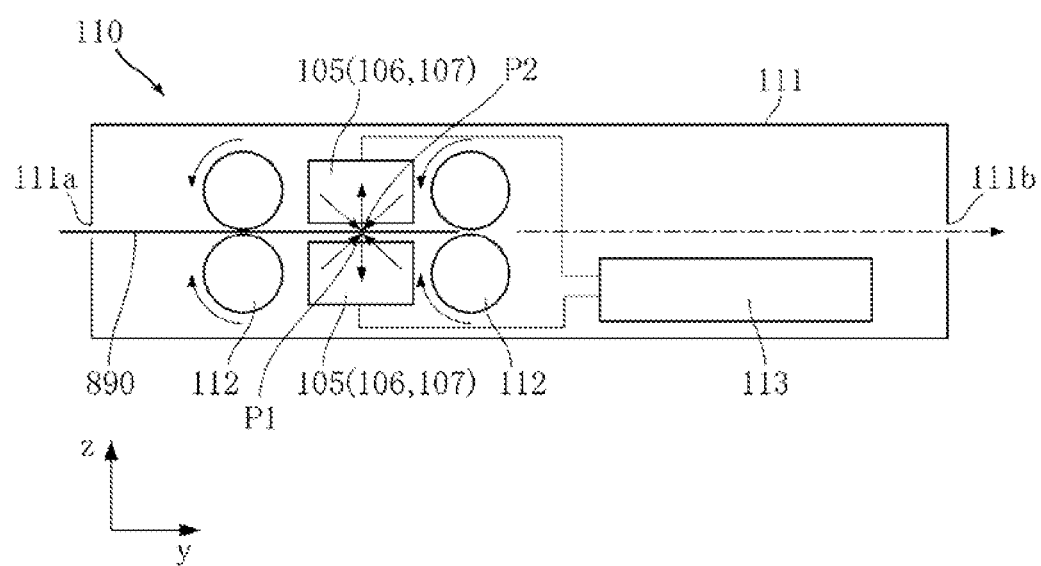
FIG. 32 is a schematic sectional view showing an example of an inspection apparatus in accordance with the present disclosure.

FIG. 32 illustrates an example of an inspection apparatus 110 of the present disclosure. The inspection apparatus 110 illustrated in FIG. 32 includes the foregoing two image sensor modules 105. Additionally, the configuration including two image sensor modules 105 is assumed, but the inspection apparatus described above is not limited thereto, and may be configured, for example, to include a single image sensor module 104 or configured to include image sensor modules 106 and 107 in the place of the image sensor module 105. The inspection apparatus 110 is a device configured to inspect whether or not a read target 890, e.g., a note printed with visible ink and invisible ink, is true or false. The invisible ink emits light having a certain wavelength upon receiving, e.g., UV light.

The inspection apparatus 110 has a case 111 configured to accommodate therein two image sensor modules 105. Besides the two image sensor modules 105, a plurality of rollers 112 and a controller 113 are accommodated in the case 111. The plurality of rollers 112 may correspond to a transfer unit. Two openings 111a and 111b are formed on the case 111. When the read target 890 is inserted through the opening 111a, the read target 890 is transferred from the left to the right along the sub-scanning direction y by the plurality of rollers 112, and thereafter, the read target 890 is discharged from the opening 111b.

The two image sensor modules 105 are installed at positions between the two rollers 112 in the sub-scanning direction y, and are disposed to face each other in the thickness direction z with a transfer path of the read target 890 placed therebetween. When viewed in the thickness direction z, the two image sensor modules 105 overlap with each other. The lower image sensor module 105 in the drawing outputs light to a position P1, and receives light from the position P1. The upper image sensor module 105 in the drawing outputs light to a position P2 and receives light from the position P2.

The inspection apparatus 110 has the controller 113. The controller 113 has, for example, a CPU, a memory and an interface, and is an example of a determination unit recited in Additions 16 to 32 to be described later. The two image sensor modules 105 are connected to the controller 113, and signals from the image sensor modules 105 are input to the controller 113. Further, the controller 113 controls light emission of the light emitting unit 300 of the image sensor module 105. Specifically, the controller 113 arbitrarily controls light emission timings of the LED modules 310 and 320 in a certain manner. In addition, when the LED module 320 includes a plurality types of LED chips for emitting light such as red light, green light, blue light, infrared light and the like, the controller 113 controls each of the LED chips to emit light according to the type of the LED chip. When signals are received from the image sensor modules 105, the controller 113 may receive respective light reception signals of the plurality of light receivers 510 as illustrated in, for example, FIGS. 27 and 28. Accordingly, the controller 113 can recognize an intensity ratio of lights transmitted through the first to the third group 511 to 513 at a certain position in the main scanning direction x. Here, the resolution at a certain position in the main scanning direction x is dependent upon a disposition density of the plurality of light receivers 510.

In the controller 113, a reference wavelength ratio R0 is stored in the memory. When UV light is output from the image sensor modules 105, a wavelength ratio Ri, which is an intensity ratio of light in a red light region, a green light region and a blue light region corresponding to the first to the third group 511 to 513, is obtained from the image sensor modules 105. The controller 113 compares the wavelength ratio Ri with the reference wavelength ratio R0. And, when a difference between the wavelength ratio Ri and the reference wavelength ratio R0 is within a certain tolerance, the controller 113 determines that the note, i.e., the read target 890, is a normal note. Additionally, when a difference between the wavelength ratio Ri and the reference wavelength ratio R0 is greater than the certain tolerance, the controller 113 determines that the note as the read target 890 is an abnormal note.

According to some embodiments, for example, visible light, other than UV light and infrared light, may be irradiated to the read target 890 at a certain timing, and a ratio of a red light component, a green light component and a blue light component of the light received from the read target 890 in each irradiation state may be recognized. Thus, when the read target 890 is, for example, a specially printed note, it is possible to realize a typical irradiation state appropriate for determining truth or falsehood of the note and recognize a light reception color in the irradiation state.

Since the two image sensor modules 105 are disposed to face to each other and overlap in the thickness direction z with the read target 890 interposed therebetween, the size of the inspection apparatus 100 in the sub-scanning direction y can be reduced. Also, there is no need to provide a roller for pressing the read target 890 with respect to each of the respective image sensor modules 105. In this sense, the thickness of the inspection apparatus 110 can be reduced.

The image sensor modules and the inspection apparatus of the present disclosure are not limited to the foregoing embodiments. Each part of the image sensor modules and the inspection apparatus of the present disclosure may be modified in their design.

[Addition 16]

An image sensor module, comprising:

a light emitting unit configured to output linear UV light extending along a main scanning direction toward a read target;

a light reception unit having a plurality of light receivers arranged along the main scanning direction; and a lens unit configured to collect light from the read target on the light reception unit; and a case accommodating therein the light emitting unit, the light reception unit and the lens unit, wherein the light reception unit includes a UV light attenuation unit configured to selectively attenuate UV light and light having a particular wavelength of a visible light region transferred toward the plurality of light receivers.

[Addition 17]

The image sensor module of Addition 16, wherein the UV light attenuation unit comprises:

a first filter configured to selectively attenuate UV light and selectively allow light having a first wavelength region included in the visible light region to be transmitted therethrough;

a second filter configured to selectively attenuate UV light and selectively allow light included in the visible light region and having a second wavelength region other than the first wavelength region to be transmitted therethrough; and a third filter configured to selectively attenuate UV light and selectively allow light included in the visible light region and having a third wavelength region other than the first and second wavelength regions to be transmitted therethrough.

[Addition 18]

The image sensor module of Addition 17, wherein the first wavelength region is a red light region, the second wavelength region is a green light region, and the third wavelength region is a blue light region.

[Addition 19]

The image sensor module of Addition 17 or 18, wherein the plurality of light receivers include light receivers belonging to a first group for receiving light which has transmitted through the first filter, light receivers belonging to a second group for receiving light which has transmitted through the second filter, and light receivers belonging to a third group for receiving light which has transmitted through the third filter.

[Addition 20]

The image sensor module of Addition 19, wherein the plurality of light receivers included in the first to the third group are arranged in a main scanning direction and disposed to be parallel in each group.

[Addition 21]

The image sensor mode of any one of Addition 16 to Addition 20, wherein the light emitting unit includes a first LED module having an LED chip for emitting UV light and a first light guide extending along the main scanning direction, and the first light guide having an incident surface to which light from the first LED module is made incident, a reflective surface reflecting light proceeding from the incident surface and an output surface outputting light proceeding from the reflective surface, as linear light extending along the main scanning direction.

[Addition 22]

The image sensor mode of Addition 21, wherein the light emitting unit includes a second LED module having one or more LED chips for emitting light other than a UV region and a second light guide extending along the main scanning direction, and the second light guide having an incident surface to which light from the second LED module is made incident, a reflective surface reflecting light proceeding from the incident surface and an output surface outputting light proceeding from the reflective surface as linear light extending along the main scanning direction.

[Addition 23]

The image sensor mode of Addition 22, wherein the first light guide and the second light guide are disposed in the mutually opposite side in the sub-scanning direction with the lens unit placed therebetween.

[Addition 24]

The image sensor mode of Addition 22 or 23, wherein the LED chip of the second LED module emits visible light.

[Addition 25]

The image sensor module of Addition 24, wherein the second LED module includes an LED chip for emitting red light, an LED chip for emitting green light and an LED chip for emitting blue light.

[Addition 26]

The image sensor module of Addition 24, wherein the second LED module includes an LED chip for emitting white light.

[Addition 27]

The image sensor mode of any one of Addition 16 to Addition 26, wherein the light emitting unit includes a plurality of LED chips for emitting UV light arranged along the main scanning direction.

[Addition 28]

The image sensor mode of any one of Addition 16 to Addition 27, wherein the light emitting unit comprises an LED chip for emitting infrared light.

[Addition 29]

An inspection apparatus, comprising: a first and a second image sensor module configured by the image sensor module as set forth in Addition 19, respectively;

a transfer unit configured to transfer the read target in a sub-scanning direction, wherein the first image sensor module outputs UV light and a plurality of light beams having wavelength regions other than a UV region and different from each other toward a first position in the read target, and the light reception unit receives light from the first position through the first or the third filter, and the second image sensor module outputs UV light and a plurality of light beams having wavelength regions other than a UV region and different from each other toward a second position in the read target, and the light reception unit receives light from the first position through the first or the third filter; and a determination unit configured to determine whether or not the read target satisfies an inspection standard by comparing a ratio of light beams received by the first image sensor module and by the second image sensor module through the first or the third filter in each wavelength region with a pre-stored reference wavelength ratio.

[Addition 30]

The inspection apparatus of Addition 29, wherein the read target has a sheet shape having a front and a rear surface separated in a thickness direction, and one of the first and the second position is positioned on the front surface side and the other thereof is positioned on the rear surface side.

[Addition 31]

The inspection apparatus of Addition 30, wherein at least portions of the first and the second image sensor module overlap with each other when viewed in the thickness direction of the read target, and disposed to face each other with the read target interposed therebetween.

[Addition 32]

The inspection apparatus of any one of Addition 29 to Addition 31, wherein printing by using visible ink and invisible ink has been performed on the read target.

Hereinafter, other embodiments of an image sensor unit and an image reading apparatus of the present disclosure will be described in detail with reference to FIGS. 33 to 43.

Figure 33:
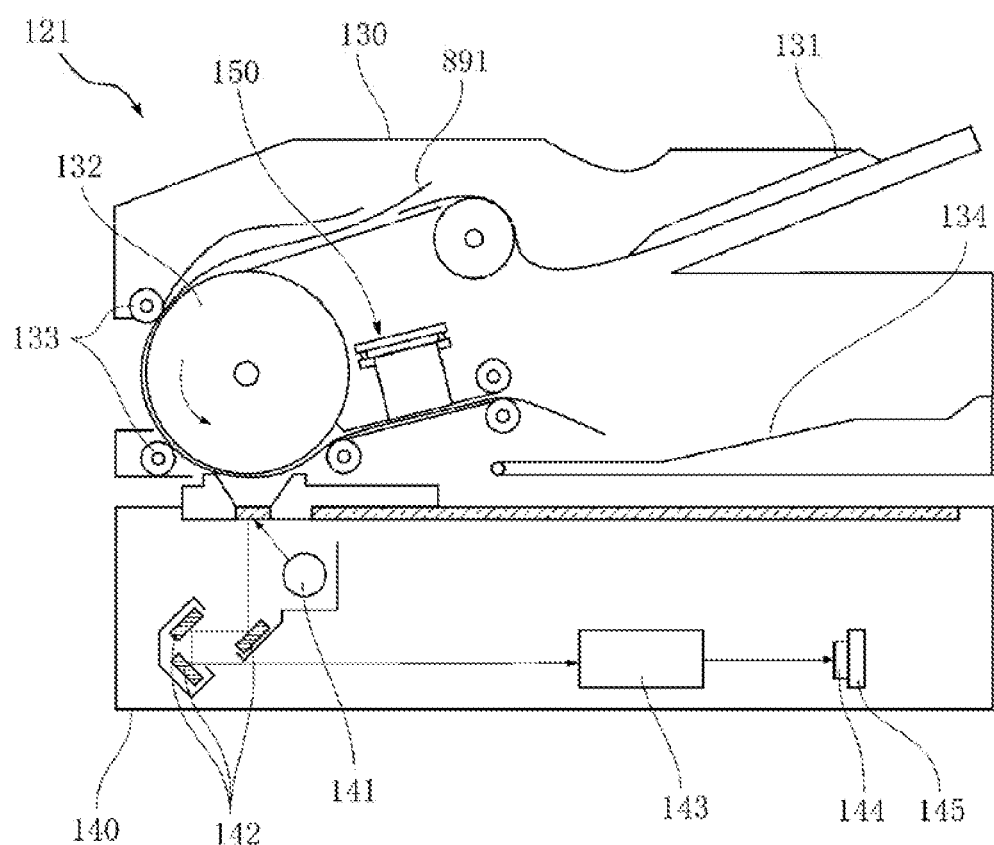
FIG. 33 is a schematic view showing an example of an image reading apparatus in accordance with the present disclosure.

FIG. 33 illustrates an example of an image reading apparatus 121 of the present disclosure. The image reading apparatus 121 illustrated in FIG. 33 is a scanner configured to read both surfaces of a document. The image reading apparatus 121 includes a transfer device 130 configured to transfer a document 891, an image sensor unit 140 configured to read a front surface of the document 891, and an image sensor unit 150 configured to read a rear surface of the document 891. Further, although not shown in FIG. 33, the image reading apparatus 121 includes a communication processing unit 160 and a controller 170. Additionally, the document 891 has a size of, for example, A3 or smaller.

The transfer device 130 has a paper feed unit 131 in which the document 891 is set, a transfer drum 132 configured to transfer the document 891 set in the paper feed unit 131, a plurality of transfer rollers 133, and a discharge unit 134 configured to discharge the document 891. The document 891 is set in the paper feed unit 131 such that the front surface thereof faces an upper side in FIG. 33. The document 891 set in the paper feed unit 131 is transferred to the discharge unit 134 by way of the transfer drum 132. When the document 891 having been transferred from an upper side of the transfer drum 132 is discharged from a lower side of the transfer drum 132, the front surface thereof faces a lower side in FIG. 33.

As illustrated in FIG. 33, the image sensor unit 140 is disposed at a lower side of the transfer device 130 in the drawing. The image sensor unit 140 includes a xenon lamp 141, a plurality of mirrors 142, a lens 143, a charge coupled device (CCD) sensor 144, and a sensor board unit 145. The plurality of mirrors 142 and the lens 143 form a reduced optical system. As described above, the front surface of the document 891 faces a lower side, so the xenon lamp 141 is disposed to illuminate the document 891 passing by an upper side thereof. Reflected light from the front surface of the document 891 forms an image on the CCD sensor 144 by the lens 143 through the plurality of mirrors 142. The CCD sensor 144 converts the image-formed light signal into an analog image signal, and transmits the same to the sensor board unit 145. The sensor board unit 145 performs certain processing on the analog image signal and outputs the same to the controller 170.

As illustrated in FIG. 33, the image sensor unit 150 is installed within a main body of the transfer device 130. The image sensor unit 150 is to read the rear surface of the document 891, so it is installed at an upper side of the document 891 discharged from a lower side of the transfer drum 132. Hereinafter, a configuration of the image sensor unit 150 will be described with reference to FIGS. 34 to 40.

The image sensor unit 150 includes a read unit 151, three signal processing units 152, twelve connection members 155 and three conductive members 154. The read unit 151 is a contact image sensor (CIS) configured to read the rear surface of the document 891, and outputs a read image as an analog signal.

The read unit 151 has a case 701, a light source unit 301, a light guide 360, a lens array 401, a plurality of light receivers 501, three IC chips 502 (502A, 502B and 502C), a read substrate 610 and three read side connectors 611A, 611B and 611C.

The case 701 is formed to extend along the main scanning direction, and accommodates therein the light source unit 301, the light guide 360, the lens array 401 and the read substrate 610.

Figure 34:
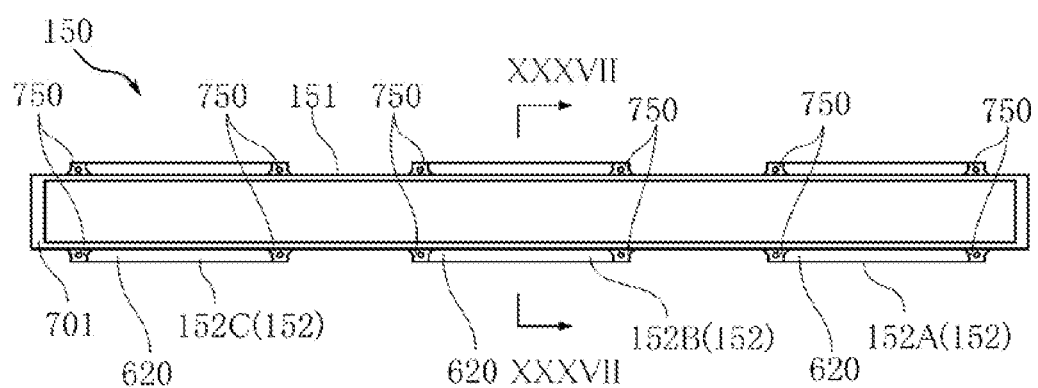
FIG. 34 is a plan view showing an example of an image sensor unit in accordance with the present disclosure.

As illustrated in FIG. 34, the case 701 has twelve screw-receiving portions 750 protruded in the sub-scanning direction. Each screw-receiving portion 750 includes a female screw hole cut with a tap.

Figure 37:
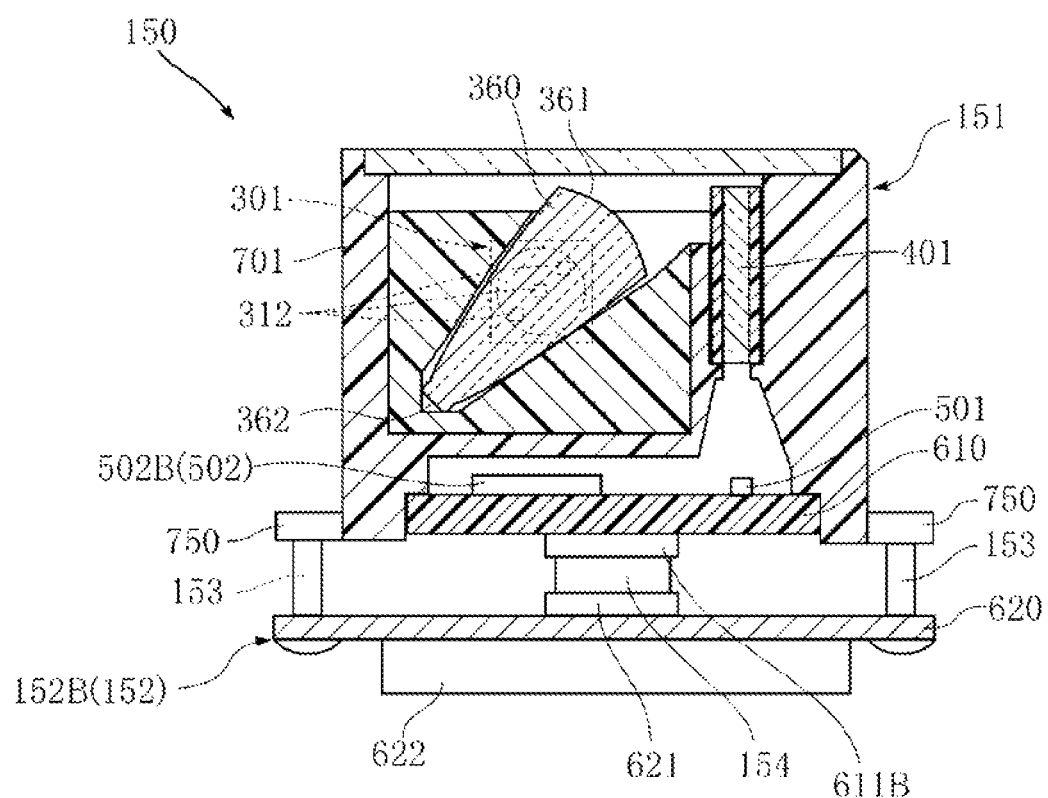
FIG. 37 is a cross-sectional view of the image sensor unit taken along line XXXVII-XXXVII shown in FIG. 34.

Although not shown in FIG. 34, the light source unit 301 is accommodated in the vicinity of a right end portion of the case 701 in FIG. 34. As illustrated in FIG. 37, the light source unit 301 has a plurality of LED chips 312. The plurality of LED chips 312 are connected to a circuit (not shown) installed on the read substrate 610. Further, specifically, the light source unit 301 has, for example, LED chips 312 of three colors of red, green and blue. Also, the light source unit 301 may have LED chips 312 for outputting infrared light.

The light guide 360, the lens array 401 and the read substrate 610 are formed to extend along the main scanning direction. One end of the light guide 360 in the main scanning direction is close to the light source unit 301. The light guide 360 is made of, for example, acryl, and configured to allow light from the light source unit 301 to protrude along the main scanning direction while reflecting the light from the light source unit 301 therein. The light guide 360 has a light output unit 361 having a band-like shape and extending along the main scanning direction and a light reflective portion 362 installed in the opposite side of the light output unit 361. A portion of light protruding through the light guide 360 is reflected by the light reflective portion 362 so as to be output from the light output unit 361 to illuminate the rear surface of the document 891. Light from the rear surface of the document 891 forms an image on the plurality of light receivers 501 via the lens array 401.

The read substrate 610 has a front surface and a rear surface, which are opposed to each other. The plurality of light receivers 501 and the three IC chips 502A, 502B and 502C are installed on the front surface side of the read substrate 610. Three read side connectors 611A, 611B and 611C are installed on the rear surface of the read substrate 610.

Figure 38:
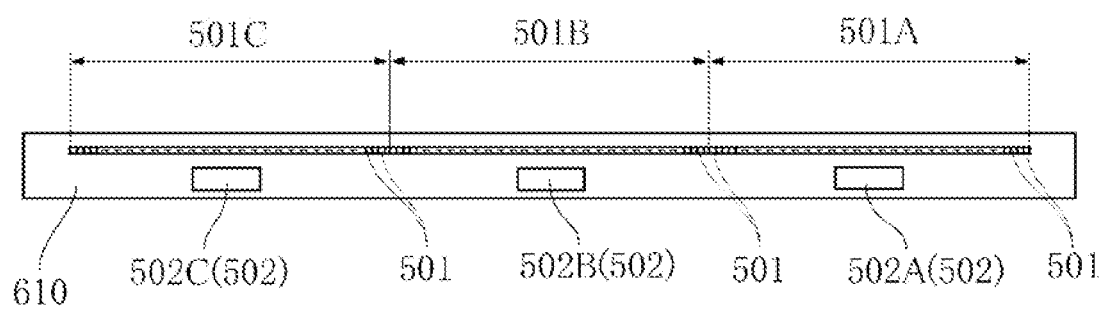
FIG. 38 is a plan view of a read substrate illustrated in FIG. 37.

The plurality of light receivers 501 are, for example, a plurality of photoelectric conversion elements mounted on the read substrate 610 such that they are arranged to correspond to the number of read pixels along the main scanning direction. As illustrated in FIG. 38, the plurality of light receivers 501 are divided into three blocks 501A, 501B and 501C. As one example, when the number of read pixels is 2592, 2592 light receivers 501 are arranged on the front surface of the read substrate 610 in the main scanning direction. For the sake of convenience, it is assumed that a light receiver 501 at the right end in FIG. 38 is a first light receiver, and the other remaining light receivers are sequentially numbered up to the $2592^{nd}$. The first to the $864^{th}$ light receiver 501 belong to the block 501A, the $865^{th}$ to the $1728^{th}$ light receiver 501 belong to the block 501B, and the $1729^{th}$ to the $2592^{nd}$ light receiver 501 belong to the block 501C.

As illustrated in FIG. 38, the three IC chips 502A, 502B and 502c are sequentially arranged from the right side of the drawing in the main scanning direction. The IC chip 502A is connected to the light receivers 501 belonging to the block 501A. The IC chip 502B is connected to the light receivers 501 belonging to the block 501B. The IC chip 502C is connected to the light receivers 501 belonging to the block 501C.

The three read side connectors 611A, 611B and 611C are arranged to be spaced from one another in the main scanning direction. The read side connector 611A is connected to the IC chip 502A, for example, through a through hole (not shown). The read side connector 611B is connected to the IC chip 502B, for example, through a through hole (not shown). The read side connector 611C is connected to the IC chip 502C, for example, through a through hole (not shown).

Figure 41:
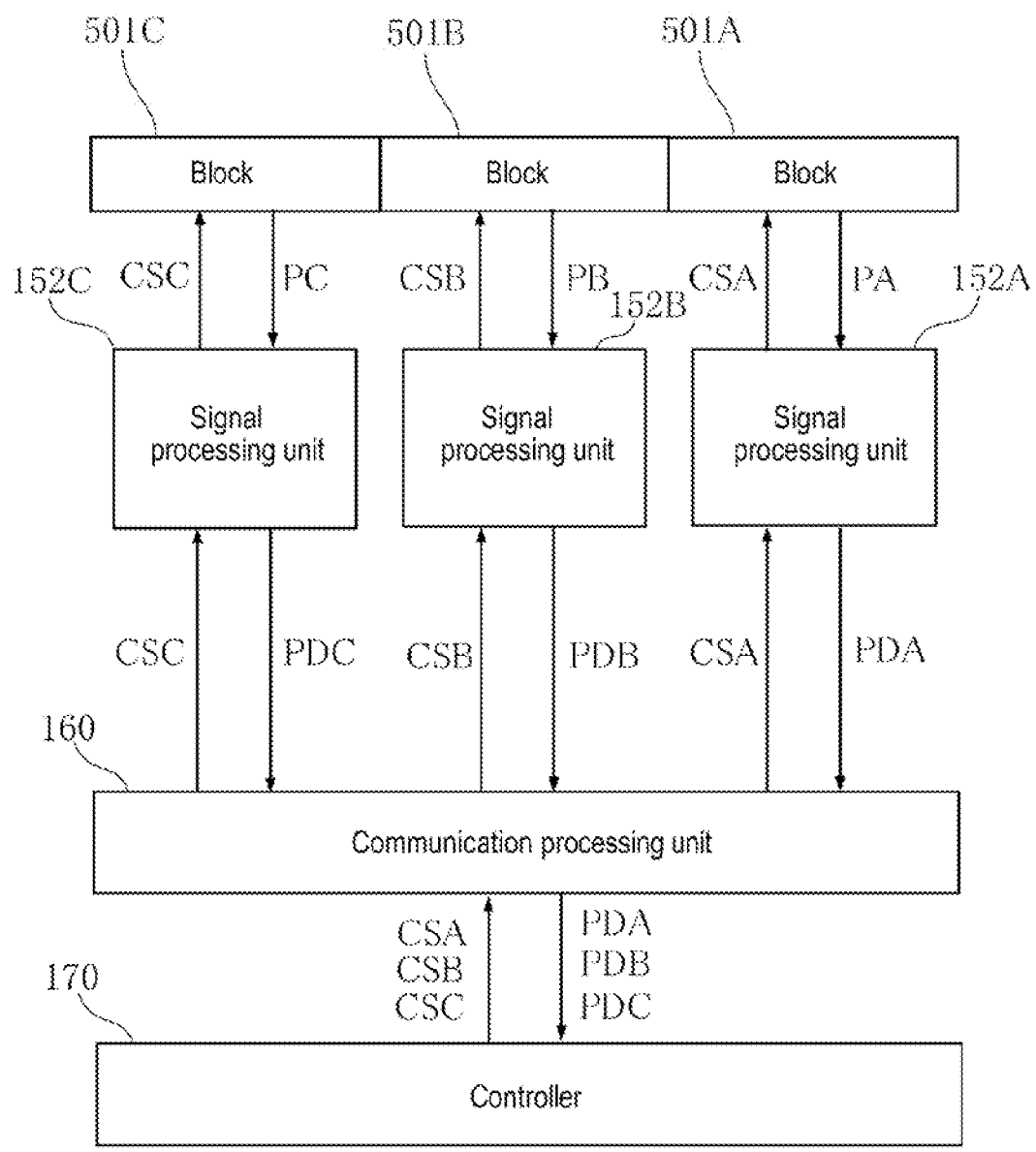
FIG. 41 is a block diagram showing an electrical configuration of the image reading apparatus illustrated in FIG. 33.

The read unit 151 is configured to output an analog signal from each of the three blocks 501A, 501B and 501C. Specifically, as illustrated in FIG. 41, the IC chip 502A outputs an analog signal PA, which indicates information starting from the first information received by the light receivers 501 belonging to the block 501A in order, from the read side connector 611A. The IC chip 502B outputs an analog signal PB, which indicates information starting from the $865^{th}$ information received by the light receivers 501 belonging to the block 501B in order, from the read side connector 611B. The IC chip 502C outputs an analog signal PC, which indicates information starting from the $1729^{th}$ information received by the light receivers 501 belonging to the block 501C in order, from the read side connector 611C.

The three signal processing units 152 receive analog signals output from the read unit 151. The three signal processing units 152 have the same configuration. Hereinafter, first, the configuration of the respective signal processing units 152 will be described with reference to FIGS. 39 and 40.

Each of the signal processing units 152 has a signal processing substrate 620, a processing unit side connector 621, a communication connector 622, a signal conversion unit 623, a signal processing circuit 624, a communication processing circuit 625, a memory 626 and a light source control circuit 627.

Figure 39:
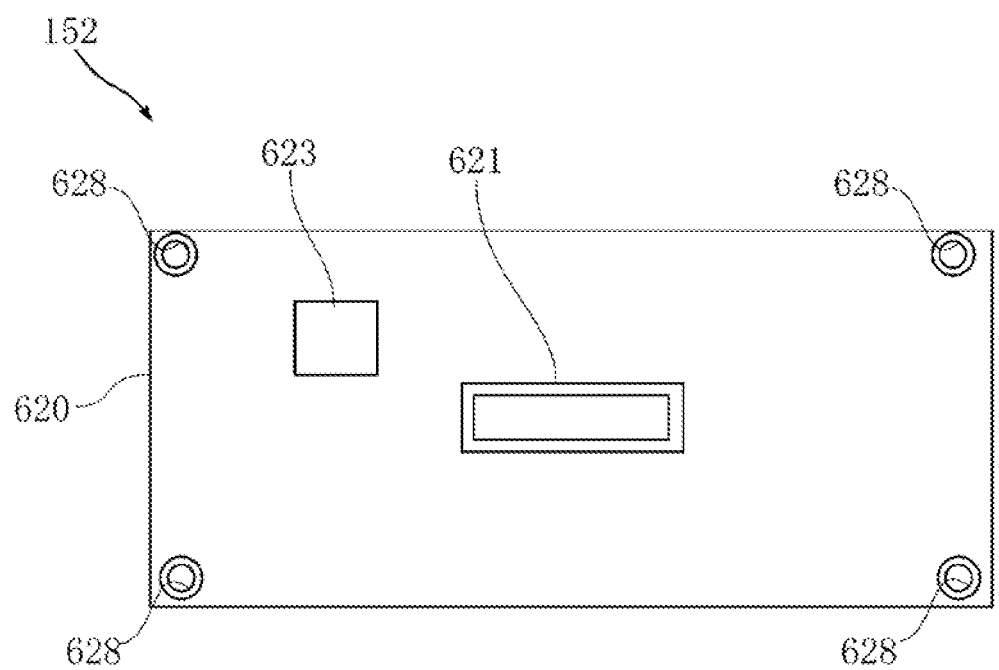
FIG. 39 is a view showing a front surface of a signal processing substrate illustrated in FIG. 37.
Figure 40:
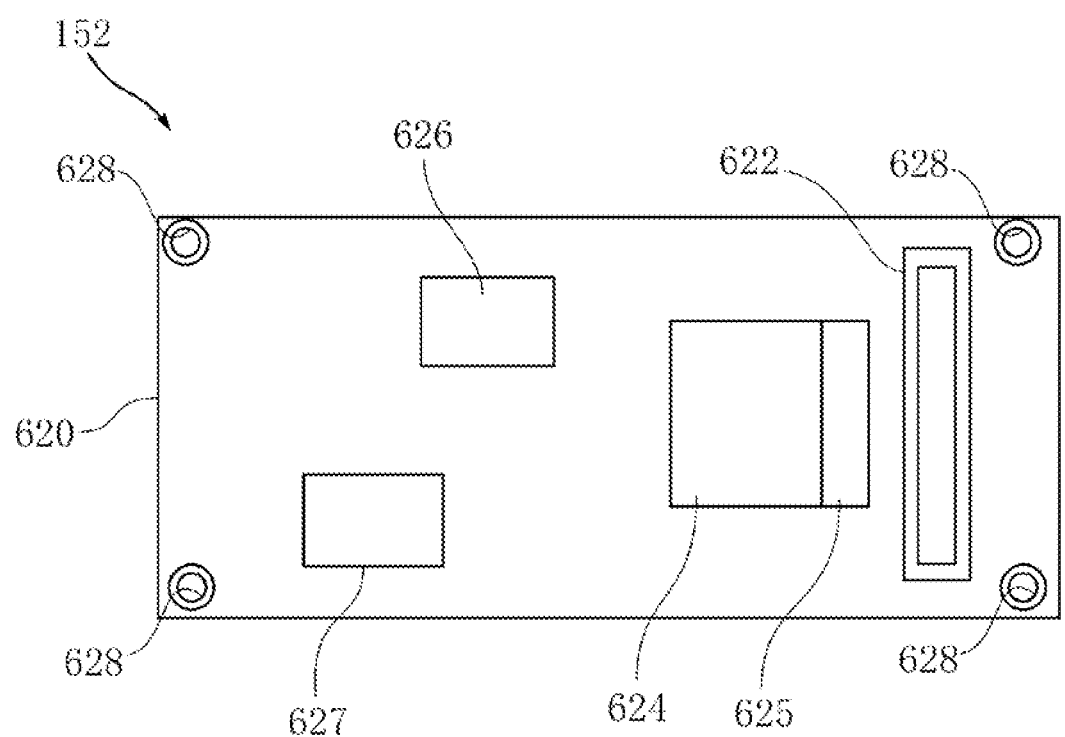
FIG. 40 is a view showing a rear surface of the signal processing substrate illustrated in FIG. 37.

Each of the signal processing units 152 has a front surface and a rear surface which face the opposite sides such that the front surface thereof is disposed to be opposed to the rear surface of the read substrate 610. FIG. 39 illustrates the front surface side of the signal processing substrate 620, and FIG. 40 illustrates the rear surface side of the signal processing substrate 620. As illustrated in FIG. 39, the processing unit side connector 621 and the signal conversion unit 623 are installed on the front surface side of the signal processing substrate 620. As illustrated in FIG. 40, the communication connector 622, the signal processing circuit 624, the communication processing circuit 625, the memory 626 and the light source control circuit 627 are installed on the rear surface side of the signal processing substrate 620.

As illustrated in FIGS. 39 and 40, the signal processing substrate 620 has a rectangular shape when viewed from the plane, and has screw holes 628 formed at four corners thereof.

Figure 35:
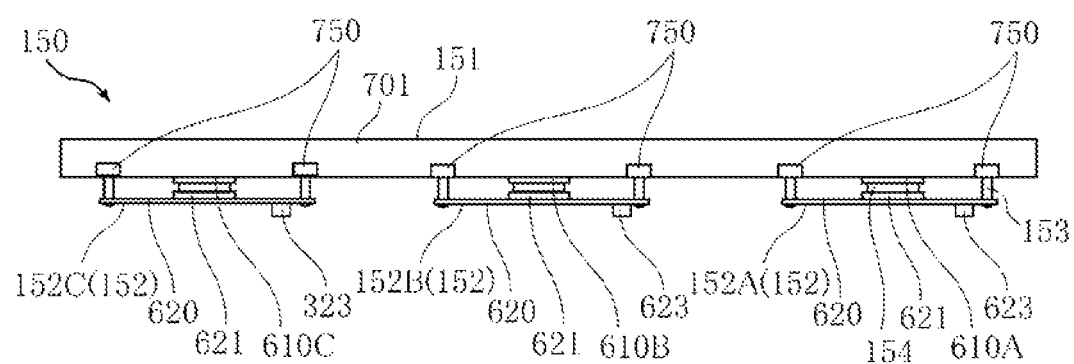
FIG. 35 is a side view of the image sensor unit illustrated in FIG. 33.
Figure 36:
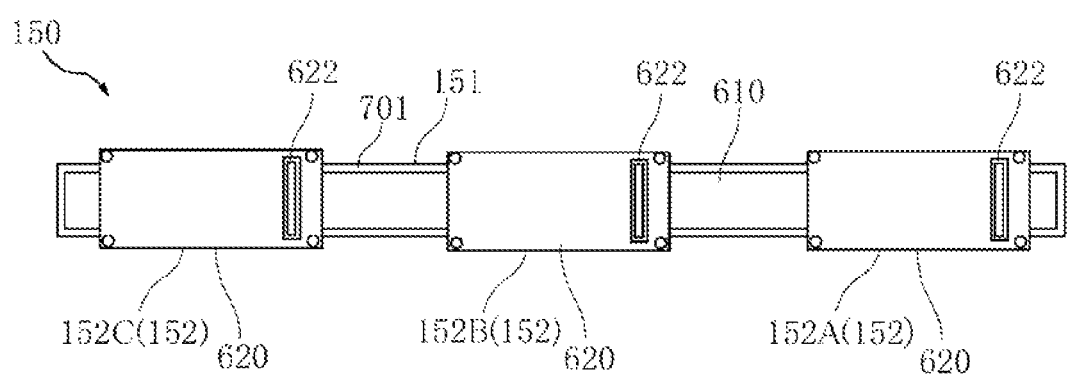
FIG. 36 is a bottom view of the image sensor unit illustrated in FIG. 33.

As illustrated in FIGS. 34 to 36, the three signal processing units 152 are arranged to be spaced apart from one another in the main scanning direction. Hereinafter, for the sake of explanation, as necessary, reference symbols A, B and C are sequentially given to the three signal processing units 152 from the right side in FIG. 34, so as to be discriminated.

As illustrated in FIG. 37, the signal processing substrate 620 is fixed to the case 701 via connection members 153. The connection members 153 may be, for example, screws or shoulder screws, and have a male screw thread-coupled to a female screw formed in the screw-receiving portion 750. The connection member 153 passes through the screw hole 628 and further, the male screw of the connection member 153 is rotated to be inserted into the screw-receiving portion 750, thus fixing the substrate processing substrate 620 to the case 701. FIG. 37 illustrates the signal processing substrate 620 of the signal processing unit 152B. Similarly, the signal processing substrates 620 of the signal processing units 152A and 152C may also be fixed to the case 701.

Further, as illustrated in FIG. 37, the processing unit side connector 621 of the signal processing unit 152B is connected to the read side connector 611B with the conductive member 154 interposed therebetween. Similarly, the processing unit side connector 621 of the signal processing unit 152A is connected to the read side connector 611A, and the processing unit side connector 621 of the signal processing unit 152C is connected to the read side connector 611C.

FIG. 41 illustrates an electrical configuration of the image reading apparatus 121. As illustrated in FIG. 41, the analog signal PA from the block 501A is transferred to the signal processing unit 152A, the analog signal PB from the block 501B is transferred to the signal processing unit 152B, and the analog signal PC from the block 501C is transferred to the signal processing unit 152C. The signal processing unit 152A transmits a digital signal PDA to the communication processing unit 160, the signal processing unit 152B transmits a digital signal PDB to the communication processing unit 160, and the signal processing unit 152C transmits a digital signal PDC to the communication processing unit 160. The communication processing unit 160 is connected to the controller 170.

The controller 170 transmits control signals CSA, CSB and CSC to the read unit 151 through the communication processing unit 160 and the signal processing units 152A, 152B and 152C. The control signal CSA is transmitted to the block 501A, the control signal CSB is transmitted to the block 501B, and the control signal CSC is transmitted to the block 501C. Each of the control signals CSA, CSB and CSC include, for example, a start pulse signal, a clock pulse signal and an enable signal. The start pulse signal is a signal for instructing the read unit 151 to start reading. The clock pulse signal is a signal for adjusting a timing of reading executed in the three blocks 501A, 501B and 501C. The enable signal is a signal for indicating transmission of the digital signals PDA, PDB and PDC, for example, from the signal processing units 152A, 152B and 152C to the communication processing unit 160.

Figure 42:
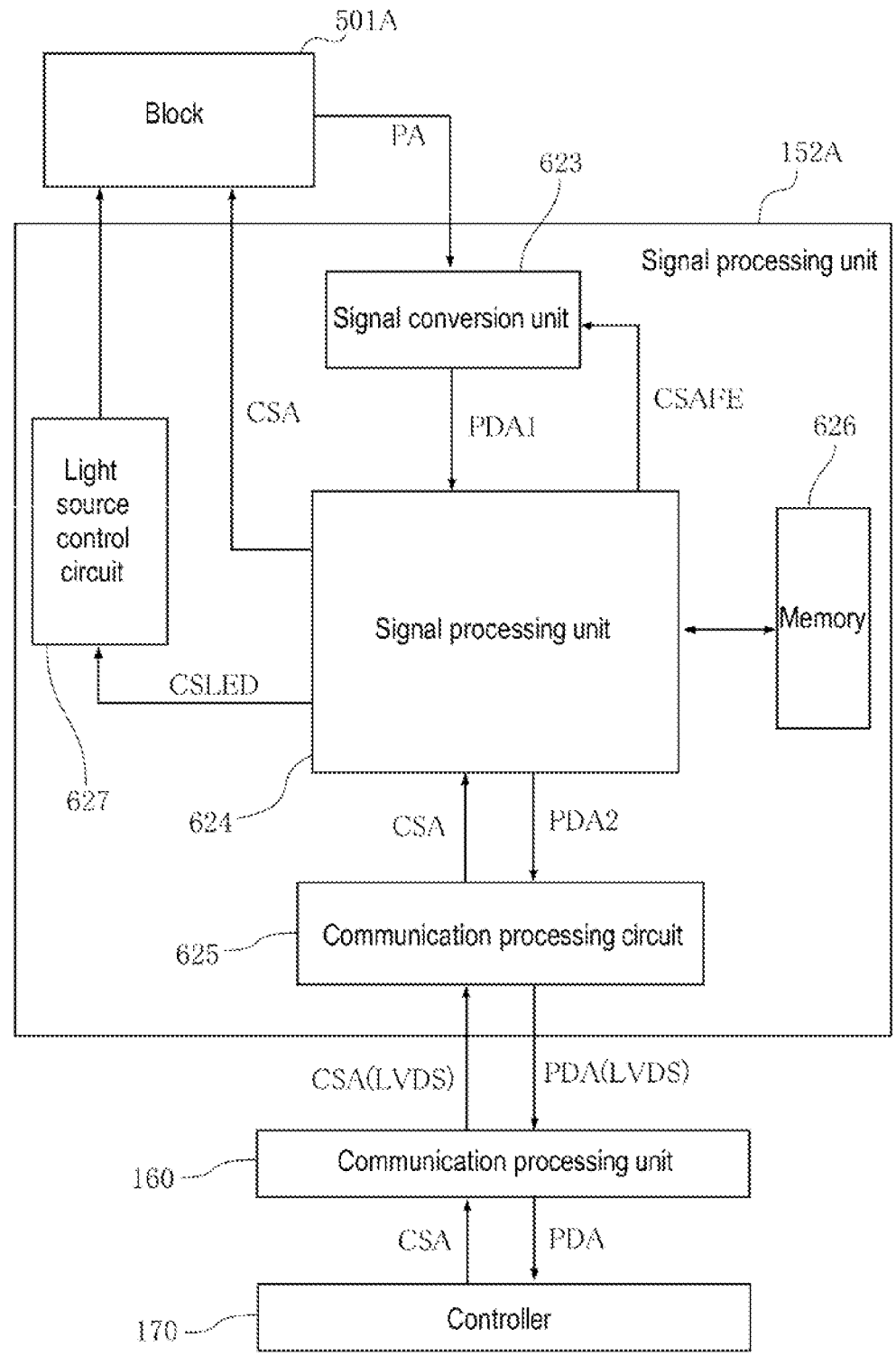
FIG. 42 is a detailed block diagram showing the electrical configuration of a signal processing unit.

FIG. 42 illustrates a more detailed electrical configuration of the signal processing unit 152A. Hereinafter, each part of the signal processing unit 152A will be described with reference to FIG. 42.

When the start pulse signal included in the control signal CSA is received, the block 501A starts reading. In the reading of the block 501A, for example, when a clock pulse signal is first received after the receiving of the start pulse signal, the block 501A obtains a light reception state of the first light receiver 501. Thereafter, whenever the clock pulse signal is received, a light reception state of the next light receiver 501 is obtained, and thus, when the $864^{th}$ clock pulse signal is received, a light reception state of the $864^{th}$ light receiver 501 is obtained. The analog signal PA corresponding to the clock pulse signal is transmitted to the signal conversion unit 623 through the read side connector 611A and the processing unit side connector 621.

Further, a period of the start pulse signal is, for example, 0.05 to 10 milliseconds, and the frequency of the block pulse signal uses 250 KHz to 20 MHz. These values are, whenever necessary, set to have a certain size according to the number of the light receivers 501, a response speed, efficiency of photoelectric conversion and the like.

The signal conversion unit 623 includes, for example, an analog front end (AFE) and a digital back end. The signal conversion unit 623 is configured to receive the analog signal PA received at the AFE and output a digital signal PDA1 at the digital back end. The signal conversion unit 623 executes correction on the analog signal PA in the AFE to allow an A/D conversion to be more accurately executed. This correction is executed according to a control signal CSAFE from the signal processing circuit 624. This correction is executed, for example, when test reading is executed by the read unit 151. In order to allow for obtaining a more accurate digital signal PDA1 based on the digital signal PDA1 received when test reading is executed, the signal processing circuit 624 sets the correction executed in the AFE and transmits the control signal CSAFE to the signal conversion unit 623.

The signal processing circuit 624 executes a shading correction on the received digital signal PDA1. Data required for executing the shading correction is stored in the memory 626, and the signal processing circuit 624 executes communication with the memory 626 as necessary. The signal processing circuit 624 transmits a shading correction-executed digital signal PDA2 to the communication processing circuit 625.

Further, the signal processing circuit 624 executes controlling of the light source control circuit 627. The light source control circuit 627 is connected to a circuit (not shown) on the read substrate 610 through the processing unit side connector 621 and the read side connector 611A. This circuit (not shown) is connected to the plurality of LED chips 312. The signal processing circuit 624 sends the control signal CSLED to the light source control circuit 627 and adjusts power of the light source control circuit 627, thus adjusting the amount of light emitted by the LED chip 312.

The communication processing circuit 625 and the communication processing unit 160 are communication units employing a low voltage differential signaling (LVDS) signal. A receiver and a transceiver are installed in each of the communication processing circuit 625 and the communication processing unit 160, and bi-directional communication is executed between the communication processing circuit 625 and the signal processing circuit 624 and between the communication processing unit 160 and the controller 170. The communication processing circuit 625 outputs the digital signal PDA2 transmitted from the signal processing circuit 624, as an LVDS signal PDA (LVDS), to the communication processing unit 160 through the communication connector 622. Also, the communication processing circuit 625 receives an LVDS signal CSA (LVDS) transmitted from the communication processing unit 160 through the communication connector 622. The communication processing circuit 625 transmits the received LVDS signal CSA (LVDS) as a control signal CSA to the signal processing circuit 624.

Further, the signal processing units 152B and 152C perform the same processing as that of the signal processing unit 152A. In this case, however, since the amount of light emitted by the LED chip 312 can be sufficiently adjusted by the single signal processing unit 152A, the light source control circuit 627 of the signal processing units 152B and 152C is not used.

The communication processing unit 160 is connected to each of the signal processing units 152A, 152B and 152C through the communication connector 622. Specifically, the communication processing unit 160 is connected with the communication processing circuit 625 of each of the signal processing units 152A, 152B and 152C such that bi-directional communication can be performed therebetween by using the LVDS signal. For example, when the LVDS signal PDA (LVDS) is transmitted from the signal processing unit 152A, the communication processing unit 160 transmits the received signal as a digital signal PDA to the controller 170. In addition, the communication processing unit 160 transmits the control signal CSA from the controller 170 as an LVDS signal CSA (LVDS) to the communication processing unit 625.

The controller 170 is connected to the communication processing unit 160 and receives the digital signals PDA, PDB and PDC transmitted from the signal processing units 152A, 152B and 152C through the communication processing unit 160. The digital signal PDA indicates the light reception states of the first to the $864^{th}$ light receiver 501, the digital signal PDB indicates the light reception states of the $865^{th}$ to the $1728^{th}$ light receiver 501, and the digital signal PDC indicates light reception states of the $1729^{th}$ to the $2592^{nd}$ light receiver 501. By connecting the digital signals PDA, PDB and PDC, the light reception states of the first to the $2592^{nd}$ light receiver 501 can be obtained.

In the example of reading in the block 501A as described above, when the first clock pulse signal is received, the light reception state of the first light receiver 501 is obtained. When the same reading method is executed, in the block 501B, when the first clock pulse signal is received, the light reception state of the 865$^{th}$ light receiver 501 is obtained, and in the block 501C, when the first clock pulse signal is received, the light reception state of the 1729$^{th}$ light receiver 501 is obtained. Thus, when the digital signal PDB is connected to the digital signal PDA, a portion corresponding to the first clock pulse signal of the digital signal PDB is connected to a portion corresponding to the 864$^{th}$ clock pulse signal of the digital signal PDA. Further, when the digital signal PDC is connected to the digital signal PDB, a portion corresponding to the first clock pulse signal of the digital signal PDC is connected to a portion corresponding to the 864$^{th}$ clock pulse signal of the digital signal PDB. Additionally, for the sake of brevity, the light reception state of the first light receiver 501 is described as being obtained when the first clock pulse signal is received. However, other configurations are possible. For example, the light reception states of the first light receiver 501 may be obtained after a certain number of clock pulse signals have been received.

Next, an operation of the image sensor unit 150 will be described.

As described above, the signal processing units 152A, 152B and 152C corresponding to the three blocks 501A, 501B and 501C, respectively, are installed in the image sensor unit 150. In the related art, a single signal processing unit corresponding to the three blocks 501A, 501B and 501C is installed. Thus, for example, when there is a need to newly add a block, the signal processing unit is required to be newly designed. In comparison, according to the configuration of the present embodiment, only a signal processing unit corresponding to an added block may be simply added and thus the necessity of newly designing the signal processing unit is reduced. In particular, when the newly added block has the light receivers 501 corresponding to the number of the blocks 501A, 501B and 501C, the signal processing unit 152 may be used as it is. Thus, according to the configuration of the image sensor unit 150, the number of blocks can be changed without requiring a time for designing the interior of the signal processing unit 152 again, and a change in the specification can be flexibly handled in comparison to the related art.

Figure 43:
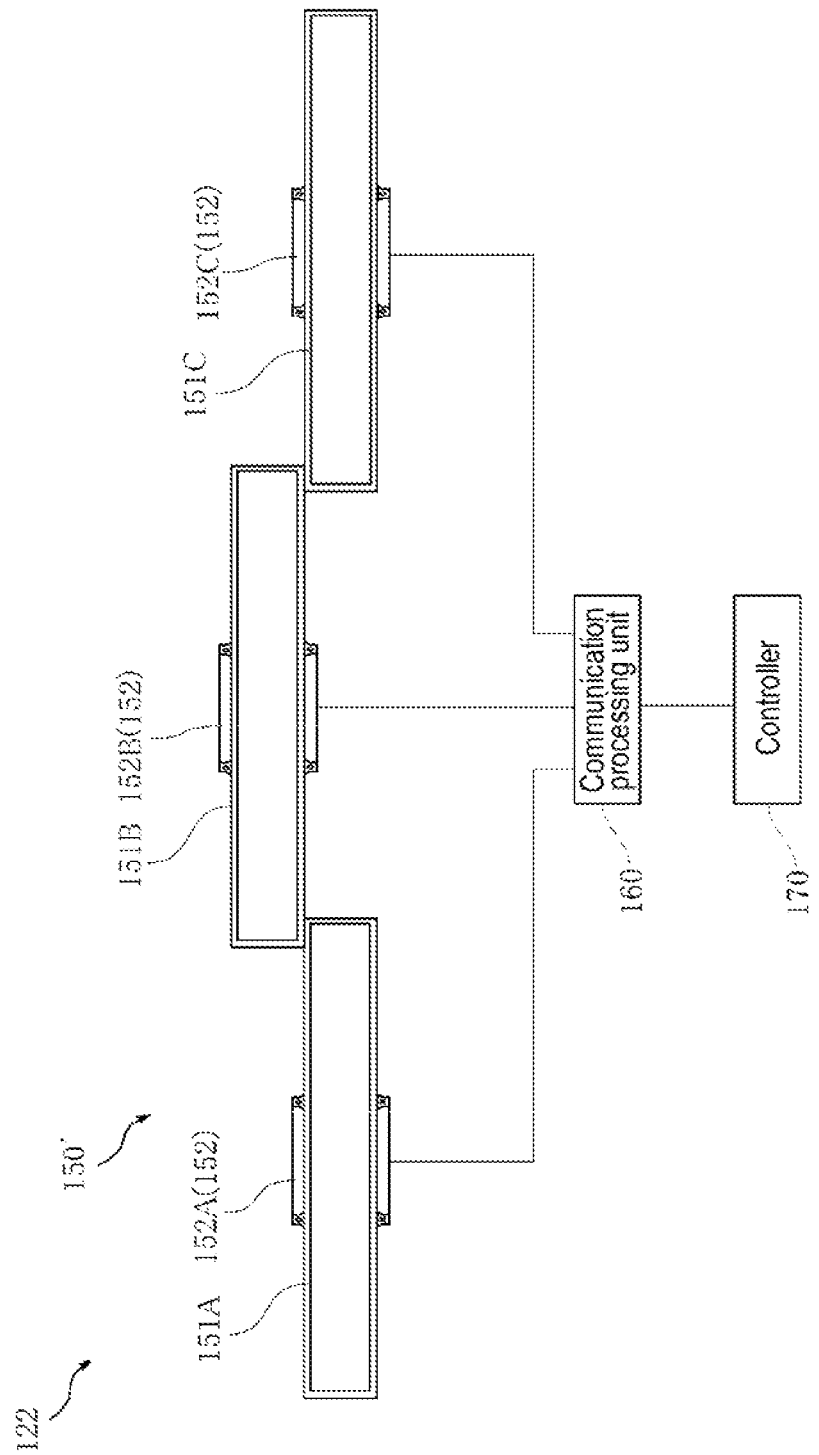
FIG. 43 is a schematic view showing another example of the image reading apparatus in accordance with the present disclosure.
Figure 44:
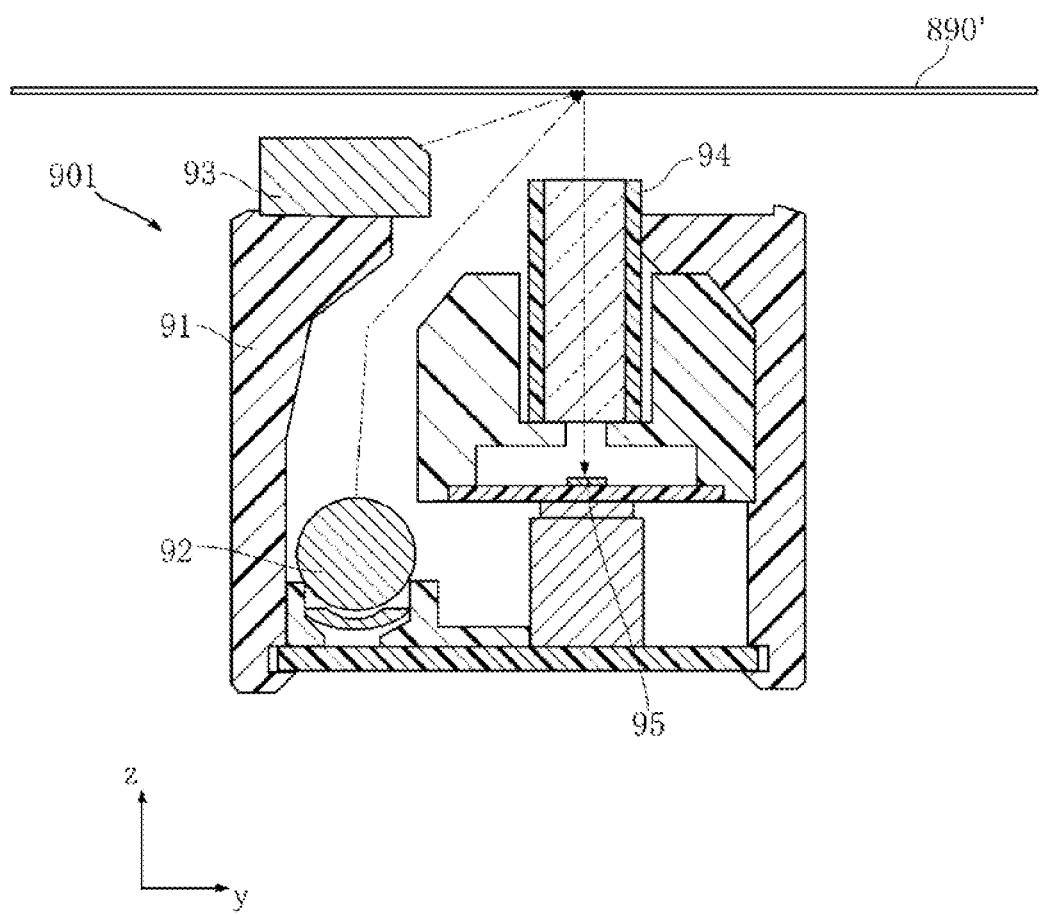
FIG. 44 is a cross-sectional view showing an example of a conventional image sensor module.
Figure 45:
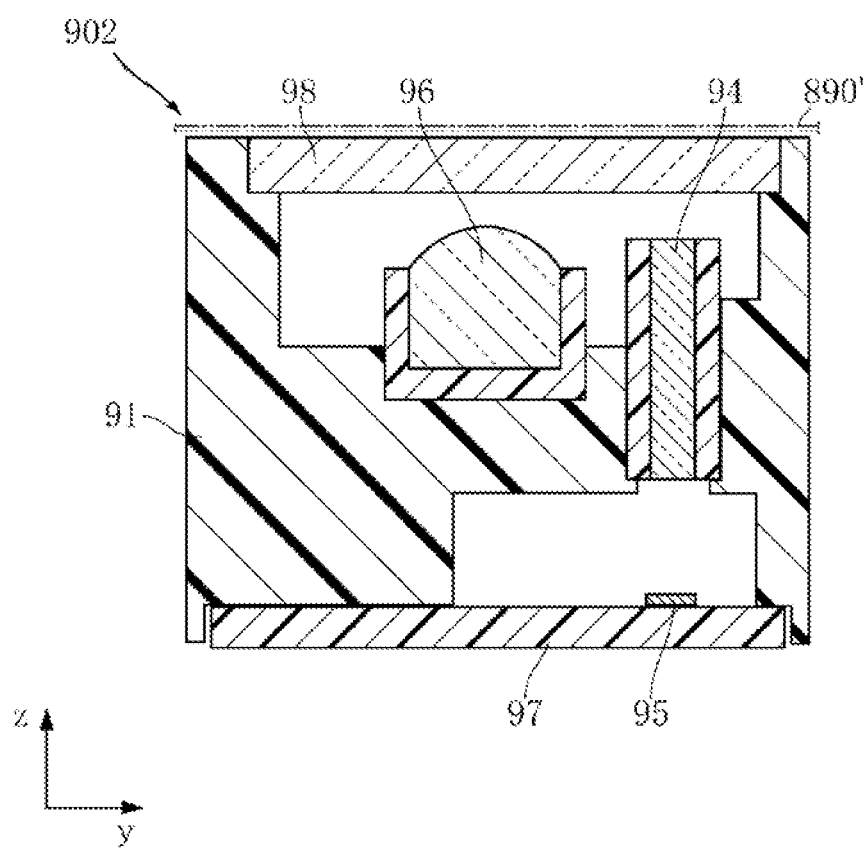
FIG. 45 is a cross-sectional view showing another example of a conventional image sensor module.

FIG. 43 illustrates another example of an image reading apparatus 122 of the present disclosure. In FIG. 43, the same reference numerals are used for the same or similar elements as those of the foregoing image reading apparatus 121. The image reading apparatus 122 illustrated in FIG. 43 is to read a large document having a size of for example, A0 or A1, and includes an image sensor unit 150', the communication processing unit 160, and the controller 170 connected to the communication processing unit 160. Also, in the present example, the three signal processing units 152 have the same configuration. Hereinafter, as necessary, reference symbols A, B and C are given to the three signal processing units 152 to correspond to the fixed image sensors 151A, 151B and 151C, so as to be discriminated.

The image sensor unit 150' includes three image sensors 151A, 151B and 151C arranged in the main scanning direction and three signal processing units 152 fixed to the three image sensors 151A, 151B and 151C, respectively. As illustrated in FIG. 43, a position of the image sensor 151B in the sub-scanning direction is different from those of the other image sensors 151A and 151C. Both end portions of the image sensor 151B in the main scanning direction overlap with one end portion of the image sensors 151A and 151C when viewed in the sub-scanning direction.

The image sensors 151A, 151B and 151C have the substantially same configuration as that of the read unit 151 in the image sensor unit 150, respectively. However, in some embodiments, the respective image sensors 151A, 151B and 151C have a single read side connector. The read side connectors of the respective image sensors 151A, 151B and 151C are arranged to be spaced apart from one another in the main scanning direction. The image sensor 151A is connected to the signal processing unit 152A through the read side connector. The image sensor 151B is connected to the signal processing unit 152E through the read side connector. The image sensor 151C is connected to the signal processing unit 152C through the read side connector. In some embodiments, the three image sensors 151A, 151B and 151C form a single read unit. As illustrated in FIG. 43, the image sensors 151A, 151B and 151C are positioned to be misaligned in the sub-scanning direction, but positions thereof in the main scanning direction are aligned, and thus the plurality of light receivers 501 thereof are arranged along the main scanning direction.

In some embodiments, the entirety of the light receivers 501 of the image sensor 151A forms the block 501A, the entirety of the light receivers 501 of the image sensor 151B forms the block 501B, and the entirety of the light receivers 501 of the image sensor 151C forms the block 501C. According to this configuration, an electrical configuration of the image reading apparatus 122 is the same as illustrated in FIG. 41.

In some embodiments, the signal processing unit 152 has the same configuration as that of the signal processing unit 152 in the image sensor unit 150. However, the signal processing unit 152 of some embodiments is designed to correspond to the number of light receivers 501 of the respective image sensors 151A, 151B and 151C.

Also, in some embodiments, the communication processing unit 160 is connected to each of the signal processing units 152A, 152B and 152C through the communication connector 622. Specifically, the communication processing unit 160 is connected to the communication processing circuit 625 of each of the signal processing units 152A, 152B and 152C such that bi-directional communication can be performed therebetween by using an LVDS signal.

In some embodiments, the position of the image sensor 151B in the sub-scanning direction deviates from those of the other image sensors 151A and 151C. Also, a portion of a document read from the both end portions of the image sensor 151B overlaps with a portion read from the end portions of the image sensors 151A and 151C. In some embodiments, the controller 170 performs correction when the digital signals PDA, PDB and PDC are connected, to thereby obtain a read image of the document.

In the image reading apparatus 122, for example, when it is required to further lengthen a read width, the same image sensor as the image sensors 151A, 151B and 151C may be additionally arranged in the main scanning direction. Here, the newly added image sensor may be connected to the same signal processing unit 152 until then, and thus there is no need to newly design the signal processing unit 152.

The image sensor unit and the image reading apparatus of the present disclosure are not limited to the foregoing embodiments. A detailed configuration of each part of the image reading apparatus of the present disclosure may be variably modified in their design. For example, in the image sensor unit 150, three signal processing units 152 are connected to the read unit 151, but two or more signal processing units may be connected thereto. Further, the light receivers 501 of the read unit 151 are divided into the three blocks 501A, 501B and 501C, but they may also be divided into a larger number of blocks. Also, when the number of blocks is large, a single signal processing unit 152 may process analog signals from a plurality of blocks.

One signal processing unit 152 is fixedly connected to each of the three image sensors 151A, 151B and 151C of the foregoing image reading apparatus 122 as described, but a plurality of signal processing units 152 may be fixed to the respective image sensors 151A, 151B and 151C.

[Addition 33]

An image sensor unit comprising:

a read unit having a plurality of light receivers arranged in a main scanning direction, wherein the plurality of light receivers are divided into a plurality of blocks, and the read unit is configured to output analog signals from each of the plurality of blocks;

a first signal processing unit configured to receive an analog signal from a first block, which is any one of the plurality of blocks; and a second signal processing unit configured to receive an analog signal from a second block, which is any one of the plurality of blocks and different from the first block.

[Addition 34]

The image sensor unit of Addition 33, wherein the read unit has a first read side connector configured to output the analog signal from the first block, and a second read side connector configured to output the analog signal from the second block, and wherein the first signal processing unit has a first processing unit side connector connected to the first read side connector, and the second signal processing unit has a second processing unit side connector connected to the second read side connector.

[Addition 35]

The image sensor unit of Addition 34, wherein the first read side connector and the second read side connector are spaced apart from each another in the main scanning direction, and the first processing unit side connector and the second processing unit side connector are spaced apart from each another in the main scanning direction.

[Addition 36]

The image sensor unit of Addition 35, wherein the read unit has a read substrate with a plurality of light receivers installed thereon and a case configured to accommodate therein the read substrate, the first signal processing unit has a first signal processing substrate fixed to the case, and the second signal processing unit has a second signal processing substrate fixed to the case and spaced apart from the first signal processing substrate in the main scanning direction.

[Addition 37]

The image sensor unit of Addition 36, wherein the read substrate has a front surface and a rear surface which face in the mutually opposite directions, the plurality of light receivers are mounted on the front surface of the read substrate, and the first read side connector and the second read side connector are installed on the rear surface side of the read substrate.

[Addition 38]

The image sensor unit of Addition 37, wherein the first signal processing substrate has a front surface and a rear surface which face in the mutually opposite directions, and the front surface of the first signal processing substrate is disposed to face the rear surface of the read substrate, the first processing unit side connector is installed on the front surface side of the first signal processing substrate, the second signal processing substrate has a front surface and a rear surface which face in the mutually opposite directions, and the surface of the second signal processing substrate is disposed to face the rear surface of the read substrate, and the second processing unit side connector is installed on the front surface side of the second signal processing substrate.

[Addition 39]

The image sensor unit of Addition 38, wherein the first signal processing unit has a first communication connector installed on the rear surface side of the first signal processing substrate, and the second signal processing unit has a second communication connector installed on the rear surface side of the second signal processing substrate.

[Addition 40]

The image sensor unit of Addition 39, wherein the first signal processing unit has a first signal conversion unit configured to convert an analog signal from the first block into a digital signal, and the second signal processing unit has a second signal conversion unit configured to convert an analog signal from the second block into a digital signal.

[Addition 41]

The image sensor unit of Addition 40, wherein the first signal processing unit has a first signal processing circuit configured to process the digital signal obtained by the first signal conversion unit, and the second signal processing unit has a second signal processing circuit configured to process the digital signal obtained by the second signal conversion unit.

[Addition 42]

The image sensor unit of Addition 41, wherein the first signal processing unit has a first communication processing circuit configured to output the digital signal processed by the first signal processing circuit through the first communication connector, and the second signal processing unit has a second communication processing circuit configured to output the digital signal processed by the second signal processing circuit through the second communication connector.

[Addition 43]

The image sensor unit of Addition 42, wherein the first signal processing circuit and the first communication processing circuit are installed on the rear surface side of the first signal processing substrate, and the second signal processing circuit and the second communication processing circuit are installed on the rear surface side of the second signal processing substrate.

[Addition 44]

An image reading apparatus, comprising:

the image sensor unit as set forth in any one of Addition 39 to Addition 43;

a communication processing unit connected with the first signal processing unit through the first communication connector and connected with the second signal processing unit through the second communication connector; and a controller connected to the communication processing unit.

[Addition 45]

An image reading apparatus, comprising:

the image sensor unit as set forth in Addition 42 or 43;

a communication processing unit configured to perform bi-directional communication with the first communication processing circuit through the first communication connector and perform bi-directional communication with the second communication processing circuit through the second communication connector; and a controller connected to the communication processing unit.

[Addition 46]

An image reading apparatus, comprising:

the image sensor unit as set forth in Addition 34 or 35;

a communication processing unit connected to the plurality of signal processing units; and a controller connected to the communication processing unit, wherein the image sensor unit has a plurality of image sensors arranged along a main scanning direction, the first read side connector is installed in a first image sensor, which is any one of the plurality of image sensors, and the second read side connector is installed in a second image sensor, which is any one of the plurality of image sensors and different from the first image sensor.

[Addition 47]

The image reading apparatus of Addition 46, wherein the first image sensor has a first read substrate on which the plurality of light receivers belonging to the first block are installed and a first case configured to accommodate therein the first read substrate, the first signal processing unit has a first signal processing substrate fixed to the first case, the second image sensor has a second read substrate on which the plurality of light receivers belonging to the second block are installed and a second case configured to accommodate therein the second read substrate, and the second signal processing unit has a second signal processing substrate fixed to the second case.

[Addition 48]

The image reading apparatus of Addition 47, wherein each of the first read substrate and the second read substrate has a front surface and a rear surface which face in the mutually opposite directions, the plurality of light receivers belonging to the first block are mounted on the front surface of the first read substrate, and the plurality of light receivers belonging to the second block are mounted on the front surface of the second read substrate, the first read side connector is installed on the rear surface side of the first read substrate, and the second read side connector is installed on the rear surface side of the second read substrate.

[Addition 49]

The image reading apparatus of Addition 48, wherein the first signal processing substrate has a front surface and a rear surface which face in the mutually opposite directions, and the front surface of the first signal processing substrate is disposed to face the rear surface of the first read substrate, the first processing unit side connector is installed on the front surface side of the first signal processing substrate, the second signal processing substrate has a front surface and a rear surface which face in the mutually opposite directions, and the front surface of the second signal processing substrate is disposed to face the rear surface of the second read substrate, and the second processing unit side connector is installed on the front surface side of the second signal processing substrate.

[Addition 50]

The image reading apparatus of Addition 49, wherein the first signal processing unit has a first communication connector installed on the rear surface side of the first signal processing substrate and is connected to the communication processing unit through the first communication connector, and the second signal processing unit has a second communication connector installed on the rear surface side of the second signal processing substrate and is connected to the communication processing unit through the second communication connector.

[Addition 51]

The image reading apparatus of Addition 50, wherein the first signal processing unit has a first signal conversion unit configured to convert an analog signal from the first block into a digital signal, and the second signal processing unit has a second signal conversion unit configured to convert an analog signal from the second block into a digital signal.

[Addition 52]

The image reading apparatus of Addition 51, wherein the first signal processing unit has a first signal processing circuit configured to process the digital signal obtained by the first signal conversion unit, and the second signal processing unit has a second signal processing circuit configured to process the digital signal obtained by the second signal conversion unit.

[Addition 53]

The image reading apparatus of Addition 52, wherein the first signal processing unit has a first communication processing circuit configured to output the digital signal processed by the first signal processing circuit to the communication processing unit through the first communication connector, and the second signal processing unit has a second communication processing circuit configured to output the digital signal processed by the second signal processing circuit to the communication processing unit through the second communication connector.

[Addition 54]

The image reading apparatus of Addition 53, wherein the first signal processing circuit and the first communication processing circuit are installed on the rear surface side of the first signal processing substrate, and the second signal processing circuit and the second communication processing circuit are installed on the rear surface side of the second signal processing substrate.

[Addition 55]

The image reading apparatus of Addition 45 or 54, wherein the communication processing unit communicates with the first communication processing circuit and the second communication processing circuit by using an LVDS signal.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An image sensor module for reading a hologram, comprising:

a sensor IC (Integrated Circuit) having a plurality of light receivers arranged along a main scanning direction;

a lens unit configured to form an image on the sensor IC with light transferred from a read target, arranged at one end of the image sensor module in a sub-scanning direction perpendicular to the main scanning direction;
a first light source unit having a first output surface extending along the main scanning direction and outputting a first linear light extending along the main scanning direction from the first output surface toward the read target and being reflected to the lens unit from the read target, the first output surface being placed at a position spaced apart from the lens unit in the sub-scanning direction; and
a second light source unit having a second output surface extending along the main scanning direction and outputting a second linear light extending along the main scanning direction from the second output surface toward the read target and being reflected to the lens unit from the read target, the second output surface being placed between the lens unit and the first output surface in the sub-scanning direction,
wherein the first output surface, the second output surface, and the lens unit are arranged in the same case to overlap in the sub-scanning direction,
wherein the first and second light source units are arranged opposite from the lens unit arranged at the one end of the image sensor module in the sub-scanning direction, and emit light in different angles to the read target with respect to the lens unit, and
wherein the first and second light source units are arranged to overlap each other in the sub-scanning direction and arranged at different heights in a thickness direction perpendicular to the main scanning direction and the sub-scanning direction.

2. The image sensor module of claim 1, wherein, in a thickness direction perpendicular to both of the main scanning direction and the sub-scanning direction, the first output surface is disposed to be closer to the read target than the second output surface is.

3. The image sensor module of claim 2, wherein, in the thickness direction, the lens unit and the first output surface overlap with each other.

4. The image sensor module of claim 2, wherein, in the thickness direction, the lens unit and the second output surface overlap with each other.

5. The image sensor module of claim 1, wherein the first light source unit includes:
a first LED (Light Emitting Diode) module having one or more first LED chips, one or more first leads on which said one or more first LED chips are mounted, and a first resin package covering portions of said one or more first leads and having a first opening from which the first LED chips are exposed; and
a first light guide extending along the main scanning direction and having a first incident surface rightly facing the first opening and a first reflective surface reflecting light which has proceeded from the first incident surface,
wherein the first output surface outputs light which has proceeded from the first reflective surface as the first linear light.

6. The image sensor module of claim 5, wherein the second light source unit includes:
a second LED module having one or more second LED chips, one or more second leads on which said one or more second LED chips are mounted, and a second resin package covering portions of said one or more second leads and having a second opening from which the second LED chips are exposed; and
a second light guide extending along the main scanning direction and having a second incident surface rightly facing the second opening and a second reflective surface reflecting light which has proceeded from the second incident surface,
wherein the second output surface outputs light which has proceeded from the second reflective surface as the second linear light.

7. The image sensor module of claim 6, wherein each of said one or more first leads have a first terminal unit protruded from the first resin package in a thickness direction at a position toward the lens unit with respect to the first opening in the sub-scanning direction, the thickness direction being a direction perpendicular to both of the main scanning direction and the sub-scanning direction.

8. The image sensor module of claim 7, further comprising:
a substrate with the sensor IC mounted thereon,
wherein each of said one or more second leads include a second terminal unit protruded from the second resin package in the thickness direction, and
wherein both of the first and the second terminal unit are connected to the substrate.

9. The image sensor module of claim 8, wherein the substrate and at least a portion of the first light guide do not overlap with each other in the sub-scanning direction.

10. The image sensor module of claim 6, wherein, in a thickness direction perpendicular to both of the main scanning direction and the sub-scanning direction, the first LED module is disposed to be closer to the read target than the second LED module is.

11. The image sensor module of claim 10, wherein, in the sub-scanning direction, the first and the second LED module overlap with each other.

12. The image sensor module of claim 10, wherein, in the thickness direction, the first and the second LED module overlap with each other.

13. The image sensor module of claim 6, wherein the first LED module is disposed at a location further to the outside of the image sensor module in the main scanning direction than the second LED module is.

14. The image sensor module of claim 6, wherein said one or more first LED chips of the first LED module include two first front surface electrode LED chips, each of said two first front surface electrode LED chips having a pair of front surface electrodes disposed on the same surface thereof, and a first front/rear surface electrode LED chip having a front surface electrode and a rear surface electrode disposed on opposite surfaces of the first front/rear surface electrode LED chip to each other,
wherein the first LED module includes two first Zener diodes configured to prevent excessive voltages from being applied to said two first front surface electrode LED chips,
wherein said two first front surface electrode LED chips are bonded to said one or more first leads with a first insulating layer interposed therebetween,
wherein the first front/rear surface electrode LED chip and said two first Zener diodes are bonded to said one or more first leads with a first conductive layer interposed therebetween, and
wherein said two first Zener diodes are disposed between said two first front surface electrode LED chips and the first front/rear surface electrode LED chip.

15. The image sensor module of claim 14, wherein the first conductive layer includes Ag.

16. The image sensor module of claim 14, wherein the first insulating layer is transparent so that EM waves is appropriately transmitted therethrough.

17. The image sensor module of claim 14, wherein a portion of the first conductive layer is interposed between said one or more first leads and a portion of the first insulating layer.

18. The image sensor module of claim 14, wherein said one or more second LED chips of the second LED module include two second front surface electrode LED chips, each of said two second front surface electrode LED chips having a pair of front surface electrodes disposed on the same surface thereof, and a second front/rear surface electrode LED chip having a front surface electrode and a rear surface electrode disposed on opposite surfaces of the second front/rear surface electrode LED chip,
　　wherein the second LED module includes two second Zener diodes configured to prevent excessive voltages from being applied to said two second front surface electrode LED chips,
　　wherein said two second front surface electrode LED chips are bonded to said one or more second leads with a second insulating layer interposed therebetween,
　　wherein the second front/rear surface electrode LED chip and said two second Zener diodes are bonded to said one or more second leads with a second conductive layer interposed therebetween, and
　　wherein said two second Zener diodes are disposed between said two second front surface electrode LED chips and the second front/rear surface electrode LED chip.

19. The image sensor module of claim 18, wherein the second conductive layer includes Ag.

20. The image sensor module of claim 18, wherein the second insulating layer is transparent so that EM waves is appropriately transmitted therethrough.

21. The image sensor module of claim 18, wherein a portion of the second conductive layer is interposed between said one or more second leads and a portion of the second insulating layer.

* * * * *